US011111354B2

(12) United States Patent
Steiner, III et al.

(10) Patent No.: US 11,111,354 B2
(45) Date of Patent: *Sep. 7, 2021

(54) SYSTEMS AND METHODS FOR PRODUCING AEROGEL MATERIALS

(71) Applicant: Aerogel Technologies, LLC, Boston, MA (US)

(72) Inventors: Stephen A. Steiner, III, Milwaukee, WI (US); Justin S. Griffin, Watertown, MA (US); Benjamin H. Wunsch, Mount Kisco, NY (US); John N. Schneider, Mahtomedi, MN (US)

(73) Assignee: Aerogel Technologies, LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,811

(22) Filed: Dec. 23, 2019

(65) Prior Publication Data
US 2020/0377685 A1  Dec. 3, 2020

Related U.S. Application Data

(63) Continuation of application No. 15/549,102, filed as application No. PCT/US2016/016823 on Feb. 5, 2016, now Pat. No. 10,563,035.

(60) Provisional application No. 62/112,241, filed on Feb. 5, 2015.

(51) Int. Cl.
*C08J 9/28* (2006.01)

(52) U.S. Cl.
CPC .......... *C08J 9/28* (2013.01); *C08J 2201/048* (2013.01); *C08J 2201/0422* (2013.01); *C08J 2201/0482* (2013.01); *C08J 2205/026* (2013.01); *C08J 2205/042* (2013.01); *C08J 2205/044* (2013.01); *C08J 2361/00* (2013.01); *C08J 2375/00* (2013.01); *C08J 2375/02* (2013.01); *C08J 2375/04* (2013.01); *C08J 2377/00* (2013.01); *C08J 2379/08* (2013.01); *C08J 2383/04* (2013.01)

(58) Field of Classification Search
CPC .. C08J 9/28; C08J 2201/0482; C08J 2375/02; C08J 2205/026; C08J 2205/042; C08J 2379/08; C08J 2375/04; C08J 2201/048; C08J 2377/00; C08J 2201/0422; C08J 2205/044; C08J 2383/04; C08J 2361/00; C08J 2375/00

See application file for complete search history.

(56) References Cited

U.S. PATENT DOCUMENTS

| 5,190,987 | A | 3/1993 | Parkinson |
| 7,771,609 | B2 | 8/2010 | Leventis et al. |
| 8,637,582 | B2 | 1/2014 | Gawryla et al. |
| 8,927,079 | B2 | 1/2015 | Leventis et al. |
| 10,563,035 | B2 | 2/2020 | Steiner, III et al. |
| 2007/0113735 | A1 | 5/2007 | Feaver et al. |
| 2009/0104401 | A1 | 4/2009 | Nakanishi et al. |
| 2010/0144904 | A1 | 6/2010 | Wang et al. |
| 2012/0152846 | A1 | 6/2012 | Leventis et al. |
| 2013/0171439 | A1 | 7/2013 | Shoseyov et al. |
| 2014/0170350 | A1 | 6/2014 | Sakamoto et al. |
| 2014/0322122 | A1 | 10/2014 | Leventis et al. |
| 2014/0350134 | A1 | 11/2014 | Rodman et al. |

FOREIGN PATENT DOCUMENTS

| EP | 1 007 197 A1 | 6/2000 |
| WO | WO 98/45032 A1 | 10/1998 |
| WO | WO 2014/189560 A1 | 11/2014 |

OTHER PUBLICATIONS

Office Communication for CN App. No. 201680016775.5 dated Mar. 4, 2020.
Partial Supplementary European Search Report for EP App. No. 16747354.5 dated Jul. 18, 2018.
Extended European Search Report for EP App. No. 16747354.5 dated Nov. 23, 2018.
Invitation to Pay Additional Fees for PCT/US16/16823 dated Apr. 19, 2016.
International Search Report and Written Opinion for PCT/US16/16823 dated Jul. 15, 2016.
International Preliminary Report on Patentability for PCT/US16/16823 dated Aug. 17, 2017.
Brinker et al., Sol-Gel Science: The Physics and Chemistry of Sol-Gel Processing. Academic Press, Inc. San Diego, CA. 1990.
Czakkel et al., Influence of drying on the morphology of resorcinol-formaldehyde-based carbon gels. Microporous and Mesoporous Materials. Nov. 28, 2005;86(1-3):124-33.
Deville, Freeze-Casting of Porous Biomaterials: Structure, Properties and Opportunities. Materials. Mar. 17, 2010;3(3):1913-27.
Deville, Freeze-Casting of Porous Ceramics: A Review of Current Achievements and Issues. Advanced Engineering Materials. Mar. 2008;10(3):155-69.
Dong et al., Polyimide-Silica Hybrid Aerogels with High Mechanical Strength for Thermal Insulation Applications. Mater Res Soc Symp Proc. Dec. 31, 2011;1306:6 pages.
Egeberg et al., Freeze Drying of Silica Gels Prepared From Siliciumethoxid. J. Phys. Colloques. 1989;50:C4-23-C4-28.
Kalinin et al., Influence of the Drying Technique on the Structure of Silica Gels. Journal of Sol-Gel Science and Technology. Jun. 1999;15(1)31-5.
Kocklenberg et al., Texture control of freeze-dried resorcinol-formaldehyde gels. Journal of Non-Crystalline Solids. Apr. 1998;225:8-13.
Mathieu et al., Freeze-dried resorcinol-formaldehyde gels. Journal of Non-Crystalline Solids. Jun. 1, 1997;212(2-3):250-61.

(Continued)

*Primary Examiner* — Kara B Boyle
(74) *Attorney, Agent, or Firm* — Wolf, Greenfield & Sacks, P.C.

(57) ABSTRACT

Systems and methods for producing aerogel materials are generally described. In certain cases, the methods do not require supercritical drying as part of the manufacturing process. In some cases, certain combinations of materials, solvents, and/or processing steps may be synergistically employed so as to enable manufacture of large (e.g., meter-scale), substantially crack free, and/or mechanically strong aerogel materials.

19 Claims, 15 Drawing Sheets

(56) References Cited

OTHER PUBLICATIONS

Pajonk et al., From sol-gel to aerogels and cryogels. Journal of Non-Crystalline Solids. May 1990;121(1-3):66-7.
Pajonk, Drying Methods Preserving the Textural Properties of Gels. J. Phys. Colloques. 1989;50:C4-13-C4-22.
Pons et al., A new route to aerogels: Monolithic silica cryogels. Journal of Non-Crystalline Solids. Feb. 1, 2012;358(3):461-9.
Qiu et al., Biomimetic superelastic graphene-based cellular monoliths. Nature Communications. Dec. 4, 2012;7 pages.
Ren et al., An Easy Way to Prepare Monolithic Inorganic Oxide Aerogels. Angewandte Chemie International Edition. Sep. 15, 2014;53(38):10147-9.
Su et al., Low-cost and fast synthesis of nanoporous silica cryogels for thermal insulation applications. Science and Technology of Advanced Materials. 2012;13:035003. 6 pages.
Tamon et al., Preparation of mesoporous carbon by freeze drying. Carbon. 1999;37(12):2049-55.
Wu et al., Three-dimensionally bonded spongy graphene material with super compressive elasticity and near-zero Poisson's ratio. Nature Communications. Jan. 20, 2015;6:9 pages.
CN 201680016775.5, Mar. 4, 2020, Office Communication.
EP 16747354.5, Jul. 18, 2018, Partial Supplementary European Search Report.
EP 16747354.5, Nov. 23, 2018, Extended European Search Report.
PCT/US16/16823, Apr. 19, 2016, Invitation to Pay Additional Fees.
PCT/US16/16823, Jul. 15, 2016, International Search Report and Written Opinion.
PCT/US16/16823, Aug. 17, 2017, International Preliminary Report on Patentability.
Office Communication for EP App. No. 16747354.5 dated Sep. 23, 2020.
Office Communication for CN App. No. 201680016775.5 dated Dec. 4, 2020.
Huang, Principles & Technology of Sol-gel. Beijing: Chemical Industry Press. Sep. 2005:61.
Office Communication for CN Application No. 201680016775.5 dated Jul. 7, 2021.
Wang, Technics and Properties of $SiO_2$ Aerogel Based Thermal Insulation Composite. Eng Sci Tech. Jul. 2010 13 pages.

SYSTEMS AND METHODS FOR PRODUCING AEROGEL MATERIALS

RELATED APPLICATIONS

This application is a continuation of U.S. patent application Ser. No. 15/549,102, filed Aug. 4, 2017, which is a U.S. National Stage patent application based on International Application No. PCT/US2016/016,823, filed Feb. 5, 2016, which claims priority under 35 U.S.C. § 119(e) to U.S. Provisional Patent Application Ser. No. 62/112,241, filed Feb. 5, 2015, each of which is incorporated herein by reference in its entirety for all purposes.

BACKGROUND

1. Field

Aspects described herein relate to systems and methods for producing aerogel materials.

2. Discussion of Related Art

Aerogels are a diverse class of low-density solid materials comprised of a porous three-dimensional network of interconnected nanostructures. Aerogels often exhibit a wide array of desirable materials properties including high specific surface area, low bulk density, high specific strength and stiffness, low thermal conductivity, and low dielectric constant, among others.

Certain aerogel compositions may combine several of these properties into the same material envelope and may thus be advantageous for applications including thermal insulation, acoustic insulation, lightweight structures, impact damping, electrodes, catalysts and catalyst supports, and sensors. Some aerogel materials possess mechanical properties that make them suitable for use as structural materials and, for example, can be used as lightweight alternatives to plastics.

SUMMARY

The present disclosure generally relates to systems and methods for producing aerogels, for example, aerogels that do not require supercritical drying as part of the manufacturing process. In some cases, certain combinations of materials, solvents, and processing steps may be synergistically employed so as to enable manufacture of large (e.g., meter-scale), substantially crack free, mechanically strong aerogel monoliths.

In some cases, aerogel materials that are not manufactured by supercritical drying with carbon dioxide may be prepared. For example, methods described herein may produce aerogel materials under atmospheric or otherwise ambient conditions. Accordingly, rigid aerogel monoliths may be prepared with dimensions not limited by a heavy-wall pressure vessel. In some embodiments, the pore fluid, or solvent, dispersed throughout the pores/channels of a gel may be frozen, or solidified, and then removed by sublimation.

For example, aerogel materials in accordance with certain aspects of the present disclosure may have superior mechanical properties compared with conventional aerogel materials, be manufactured without the use of a supercritical dryer, and have desirable thermal insulating, acoustic damping, non-flammability, and machinability properties.

The methods herein may take one of several forms, each with different advantages. In some embodiments, aerogel materials may be prepared from gel precursors in a matter of a few hours. In some embodiments, aerogel materials may be prepared cost-effectively using a slower process. In some embodiments, the resulting aerogel materials may have desirable mechanical properties, thermal insulating properties, acoustic damping properties, non-flammability, and machinability properties.

In an illustrative embodiment, a method for manufacturing aerogels is provided. The method includes replacing a fluid located within pores of a gel material with a solvent, freezing the solvent within the pores of the gel material, and sublimating the solvent to remove the solvent from the pores of the gel material to produce an aerogel material.

In another illustrative embodiment, a method for manufacturing aerogels is provided. The method includes providing a gel material having a solvent located within pores of the gel material, freezing the solvent within the pores of the gel material, and sublimating the solvent at ambient conditions to remove the solvent from the pores of the gel material to produce an aerogel material.

In yet another illustrative embodiment, a method for manufacturing an aerogel is provided. The aerogel may have at least one dimension greater than or equal to about 30 cm, a second dimension greater than or equal to about 1 cm, a compressive modulus greater than or equal to about 500 kPa, a compressive yield strength greater than or equal to about 20 kPa and/or dimensions within about 20% of its gel precursor's dimensions immediately prior to removal of the gel's pore fluid. The method may include providing a gel material having a solvent, freezing the solvent, and sublimating the solvent at about atmospheric pressure to produce an aerogel material.

In another illustrative embodiment, a method for manufacturing an aerogel is provided. The aerogel may have at least one dimension greater than or equal to about 4 cm, a second dimension greater than or equal to about 0.5 cm, a compressive modulus greater than or equal to about 500 kPa, a compressive yield strength greater than or equal to about 20 kPa and/or dimensions within about 20% of its gel precursor's dimensions immediately prior to removal of the gel's pore fluid. The method may include providing a gel material having a solvent, freezing the solvent, and sublimating the solvent at about atmospheric pressure to produce an aerogel material.

In an illustrative embodiment, a method for manufacturing an aerogel is provided. The method includes freezing a first portion of a solvent located within mesopores of a gel material by cooling the gel material to a first temperature below the freezing point of the solvent; removing the first portion of the solvent from the mesopores of the gel material by sublimation; freezing a second portion of the solvent located within micropores of the gel material by cooling the gel material to a second temperature, lower than the first temperature; and removing the second portion of the solvent from the micropores of the gel material by sublimation, to produce an aerogel material.

Advantages, novel features, and objects of the present disclosure will become apparent from the following detailed description of the present disclosure when considered in conjunction with the accompanying drawings, which are schematic and which are not intended to be drawn to scale. For purposes of clarity, not every component is labeled in every figure, nor is every component of each embodiment of the present disclosure shown where illustration is not necessary to allow those of ordinary skill in the art to understand the present disclosure.

BRIEF DESCRIPTION OF THE DRAWINGS

Various embodiments of the present disclosure will now be described, by way of example, with reference to the accompanying figures, in which.

DETAILED DESCRIPTION

Figure 1:
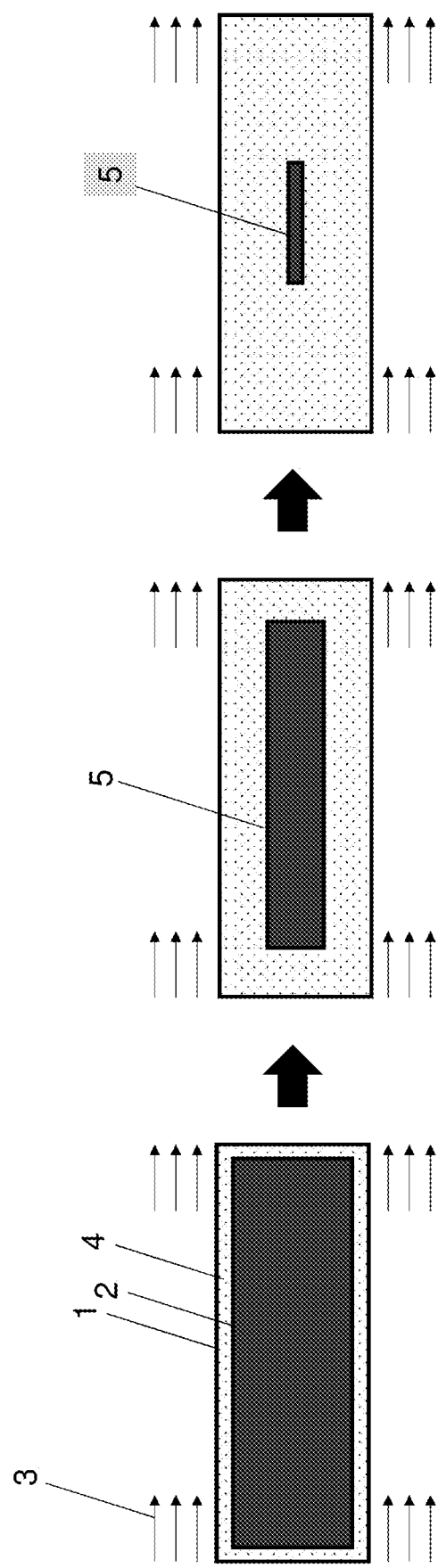
FIG. 1 depicts a schematic representation of a gel during drying in accordance with some embodiments.

The inventors have appreciated that it would be advantageous to be able to produce aerogel materials as relatively large monoliths (e.g., large, long, and/or wide panels). In some embodiments, such aerogel materials may be manufactured without requiring a step of supercritical drying. Hence, as supercritical drying typically involves conditions provided by a heavy-wall pressure vessel, for certain embodiments according to the present disclosure, use of such a pressure wall is not required.

In some embodiments, a gel may include a porous backbone and a solvent dispersed throughout the pores. The backbone may comprise any suitable material including, for example, polyurea, polyurethane, polyamide, polyimide, polymer cross-linked inorganic aerogel precursors, acid-catalyzed resorcinol-formaldehyde materials, polysaccharides, amongst others. The solvent, or pore fluid, may be exchanged with another solvent, in some cases, multiple times so as to reach a suitable level of purity. The solvent may then be suitably frozen and sublimated with little to no capillary force, resulting in an aerogel. That is, rather than removing the solvent via evaporation from a liquid state, the solvent is sublimated from a solid state (having been frozen), hence, minimizing capillary forces that may otherwise result via evaporation. For some cases, such capillary forces may be undesirable during solvent removal, in part, because the capillary forces may result in shrinkage, cracking, and/or mechanical failure of the overall aerogel monolith.

In some embodiments, sublimation of the solvent may occur at atmospheric or ambient conditions (e.g., atmospheric or ambient pressure conditions, with or without a stream of air flowing along the surface of the gel), thus, not requiring the use of a pressure vessel to remove the solvent. Because such manufacturing processes in accordance with certain embodiments of the present disclosure do not require a pressure vessel, the size of the resulting aerogel is not limited by the size of a pressure vessel chamber. Those of ordinary skill in the art would understand that ambient pressure corresponds to the pressure of the ambient environment, within the normal variations caused by elevation and/or barometric pressure fluctuations in normal operations under various weather conditions and locations of installation. Ambient pressure conditions may be distinguished from gage pressure conditions, in which the pressure (e.g., in a vacuum chamber, pressure vessel, or other enclosure in which pressure can be controlled) is described in terms of pressure relative to the ambient pressure (e.g., from a pressure measurement from a gage or sensor). One of ordinary skill in the art would be able to identify ambient pressure conditions and distinguish them from non-ambient pressure conditions. In some embodiments, sublimation of the solvent may occur without the use of a vacuum-generating pump or other vacuum-generating device. In some embodiments, sublimation of the solvent may occur without the use of a vacuum chamber, pressure vessel, or other enclosure in which pressure is controlled. In some embodiments, sublimation of the solvent may occur at elevated pressures. Those of ordinary skill in the art would understand that elevated pressure corresponds to pressures greater than ambient pressures.

In some embodiments, all or a portion (e.g., at least 50%, at least 75%, at least 90%, at least 95%, at least 99%, or more) of the sublimation is performed when the gel is exposed to pressures of at least 100 kPa, at least 100.1 kPa, at least 100.2 kPa, at least 100.5 kPa, at least 101 kPa and/or up to about 105 kPa, up to about 108.5 kPa, or more.

Generally speaking, aerogels are dry, nanoporous, nanostructured materials that exhibit a diverse array of extreme and valuable materials properties, e.g., low density, ultralow thermal conductivity, high density-normalized strength and stiffness, and high specific internal surface area, amongst others. Nanoporous refers to porous materials in which the pores are primarily nanopores, that is, pores with widths less than 1 micron. The term aerogel may refer to a substance having a certain material composition that exhibits a particular geometry. Suitable aerogel material compositions may include, for example, silica, metal and metalloid oxides, metal chalcogenides, metals and metalloids, organic polymers, biopolymers, amorphous carbon, graphitic carbon, diamond, and discrete nanoscale objects such as carbon nanotubes, boron nitride nanotubes, viruses, semiconducting quantum dots, graphene, or combinations thereof. Metalloids may include boron, silicon, germanium, arsenic, antimony, tellurium, and polonium. Metals may include lithium, sodium, potassium, rubidium, cesium, francium, beryllium, magnesium, calcium, strontium, barium, radium, aluminum, scandium, titanium, vanadium, chromium, manganese, iron, cobalt, nickel, copper, zinc, gallium, yttrium, zirconium, niobium, molybdenum, technetium, ruthenium, rhodium, palladium, silver, cadmium, indium, tin, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth, actinium, thorium, protactinium, uranium, neptunium, plutonium, americium, curium, berkelium, californium, einsteinium, fermium, mendelevium, nobelium, lawrencium, and the transactinide metals.

Additionally, a number of aerogel nanocomposite configurations may be prepared, for instance, materials that integrate organic polymers and silica into a single network (e.g., ormosils, organically modified silica/silicate materials, etc.), materials in which two or more separate networks of different composition are interpenetrating (e.g., a metal oxide network interpenetrated with a resorcinol-formaldehyde polymer network, a metal or metalloid oxide network interpenetrated with a polyurea network), core-shell nanocomposites in which a polymer conformally coats the interior contour surfaces of an oxide network (e.g., x-aerogels, cross-linked aerogels, etc.), aerogels in which nanoparticles of a varying composition are dispersed (e.g., metal-nanoparticle-doped carbon aerogels, gold-nanoparticle-doped silica aerogels), and more. As provided herein, aerogel materials may be considered as any solid-phase material that is primarily mesoporous (i.e., contains pores between 2-50 nm in diameter), comprising at least a 50% void space by volume in which the solid-phase component comprises a 3D nanostructured solid network. Accordingly, any material that meets this description may be considered as an aerogel material.

A number of potential applications of aerogel materials involve the materials being in monolithic or panel form, for example, as opposed to particles, powders, or fiber-reinforced blankets. Manufacturing of aerogel monoliths/panels with dimensions large enough to be useful for various applications (e.g., applications in aviation, automotive, marine, construction, etc.) using supercritical drying is often cumbersome and expensive, in large part, due to the following requirements: 1) large, expensive, specialized equipment, 2) size-limited throughput-stifling batch processes, and 3) copious amounts of carbon dioxide and/or flammable solvents and energy. In fact, monoliths with lengths and widths greater than about 1 m×4 m of many aerogel materials, particularly aerogels with bulk densities ranging from 0.05 g/cc to 0.3 g/cc, have not previously been possible to manufacture due to the unavailability of supercritical dryers large enough to accommodate manufacturing of such parts and the extreme costs associated with supercritically drying such large monoliths. Making large aerogel monoliths can be further complicated by shrinkage of the gel part during production. Production of large aerogel monoliths also frequently requires a mold, as the wet gel may not be strong enough to support its own weight or may be too cumbersome to practically handle until after it is dry. When a gel is subjected to a drying process that involves significant shrinkage of the gel due to the drying process, the shrinkage may also be coupled to stiction of the gel part to the mold, which may result in significant cracking, warping, tapering, and other distortion of the final aerogel part. In some embodiments of the present disclosure, drying of aerogel monoliths may be performed without shrinkage that would damage the gel as it is dried as described below, and may be performed at ambient pressures, enabling drying of very large aerogel monoliths, e.g., greater than about 1 m×4 m, while preventing cracking, warping, tapering, and other distortion of the very large aerogel monolith. Monoliths may be stiff or flexible. For example, traditional fiber-reinforced aerogel blankets, such as fiber-reinforced silica aerogel blankets manufactured by Aspen Aerogels, are not considered monolithic because they are a composite of aerogel material and fiber and the aerogel material throughout is highly fractured and pulverized and depends on the fiber reinforcement to be held together as a macroscopic article. However, monoliths that are flexible, such as some polyimide aerogels, may be produced. Fiber-reinforced monoliths may be produced as well, for example, a flexible polyimide aerogel that is reinforced with fibrous batting, or a non-flexible polyurea aerogel panel that is reinforced by aligned fibers. A stiff monolith may be distinguished from a flexible monolith in that a flexible monolith may be bent within the elastic deformation regime and exhibit a radius of curvature of about 0-1 mm, about 0-10 mm, about 0-25 mm, about 0-50 mm, or about 0-100 mm, while a stiff monolith when bent within the elastic deformation regime may exhibit a radius of curvature of greater than about 100 mm, or remain substantially flat.

Depending on composition, aerogel materials may exhibit certain properties, such as transparency, high-temperature stability, hydrophobicity, electrical conductivity, and/or non-flammability. Such properties may make aerogel materials desirable for various applications.

In general, aerogel materials may be made from precursors, such as gels. As provided herein, a gel may be a colloidal system in which a nanoporous, nanostructured solid network spans the volume occupied by a liquid medium. Accordingly, gels may have two components: a sponge-like solid skeleton that gives the gel its solid-like cohesiveness, and liquid that permeates the pores of that skeleton.

Gels of different compositions may be synthesized through a number of methods, which may include a sol-gel process. The sol-gel process involves the production of sol, or colloidal suspension of very small solid particles in a continuous liquid medium, where nanostructures (e.g., nanoparticles, nanotubes, nanoplatelettes, graphene, nanophase oligomers or polymer aggregates) form the solid particles dispersed in the liquid medium. The sol-gel process also involves causing the nanostructures in the sol to interconnect (e.g., through covalent or ionic bonding, polymerization, physisorption, or other mechanisms) to form a 3D network, forming a gel.

In the case of the production of a silica gel suitable for production of a silica aerogel, this can be accomplished by hydrolyzing a silicon alkoxide with water in the presence of a basic or acidic catalyst in a suitable volume of a solvent in which the water, silicon alkoxide, and catalyst are mutually soluble (such as an alcohol), which results in the formation of microporous (i.e., contains pores <2 nm in average diameter) silica nanoparticles dispersed in the liquid that subsequently interconnect into a contiguous mesoporous (i.e., contains average pore sizes of between 2-50 nm in diameter) network that spans the volume of the liquid.

Aerogels may be fabricated by removing the liquid from a gel in a way that preserves both the porosity and integrity of the gel's intricate nanostructured solid network. For most gel materials, if the liquid in the gel is evaporated, capillary stresses will arise as the vapor-liquid interface recedes into or from the gel, causing the gel's solid network to shrink or pull inwards on itself, and collapse. The resulting material is a dry, comparatively dense, low-porosity (generally <10% by volume) material that is often referred to as a xerogel material, or solid formed from the gel by drying with unhindered shrinkage. However, the liquid in the gel may be heated and pressurized past its critical point, a specific temperature and pressure at which the liquid will transform into a semi-liquid/semi-gas, or supercritical fluid, that exhibits little surface tension, if at all. Below the critical point, the liquid is in equilibrium with a vapor phase. As the system is heated and pressurized towards its critical point, molecules in the liquid develop an increasing amount of kinetic energy, moving past each other at an increasing rate until eventually their kinetic energy exceeds the intermolecular adhesion forces that give the liquid its cohesion. Simultaneously, the pressure in the vapor also increases, bringing molecules on average closer together until the density of the vapor becomes nearly and/or substantially as dense as the liquid phase. As the system reaches the critical point, the liquid and vapor phases become substantially indistinguishable and merge into a single phase that exhibits a density and thermal conductivity comparable to a liquid, yet is also able to expand and compress in a manner similar to a gas. Although technically a gas, the term supercritical fluid may refer to fluids near and/or past their critical point as such fluids, due to their density and kinetic energy and exhibiting liquid-like properties that are not typically exhibited by ideal gases, for example, the ability to dissolve other substances. Since phase boundaries do not typically exist past the critical point, a supercritical fluid exhibits no surface tension and thus exerts no capillary forces, and can be removed from a gel without causing the gel's solid skeleton to collapse by isothermal depressurization of the fluid. After fluid removal, the resulting dry, low-density, high-porosity material becomes an aerogel.

The critical point of most substances typically lies at relatively high temperatures and pressures, thus, supercritical drying generally involves heating gels to elevated temperatures and pressures and hence is performed in a pressure vessel. For example, if a gel contains ethanol as its pore fluid, the ethanol can be supercritically extracted from the gel by placing the gel in a pressure vessel containing additional ethanol, slowly heating the vessel past the critical temperature of ethanol (241° C.), and allowing the autogenic vapor pressure of the ethanol to pressurize the system past the critical pressure of ethanol (60.6 atm). At these conditions, the vessel can then be quasi-isothermally depressurized so that the ethanol diffuses out of the pores of the gel without recondensing into a liquid. Likewise, if a gel contains a different solvent in its pores, the vessel may be heated and pressurized past the critical point of that solvent.

Most organic solvents used to make gels are dangerously flammable and potentially explosive at their critical points, hence, it may be desirable to first exchange the pore fluid of the gel with a safer, non-flammable solvent that can be supercritically extracted instead. For example, liquid carbon dioxide may be used as a substitute for organic solvents to supercritically dry aerogels. Carbon dioxide has the advantages of being miscible with many organic solvents, being non-flammable, and having a relatively low (31.1° C., 72.8 atm) critical point. Since carbon dioxide does not exist in liquid form at ambient conditions, solvent exchange of a gel's pore fluid with liquid carbon dioxide may be done by placing the gel inside a pressure vessel, pressurizing the vessel to the vapor pressure of carbon dioxide, and then siphoning or pumping liquid carbon dioxide into the vessel. Once the original pore fluid of the gel has been adequately replaced by liquid carbon dioxide, the gel can be heated and pressurized past the critical point of carbon dioxide and the carbon dioxide may be supercritically extracted by isothermal depressurization. In some cases, supercritical carbon dioxide may also be flowed over a gel to remove solvent from its pores.

In practice, sequential diffusive exchanges with liquid carbon dioxide can remove most, but not all, of the original organic solvent from the pores of the gel. Flowing supercritical carbon dioxide over a gel may also locally result in a mixture of carbon dioxide and the original organic solvent in the gel. Accordingly, the resulting carbon-dioxide-rich mixture will have a small mass fraction of organic solvent in it and accordingly a mass-fraction-dependent critical point that is higher than that of pure carbon dioxide. As a result, conservatively higher process temperatures and pressures may be used when supercritically drying with carbon dioxide, in order to ensure sufficient removal of the pore fluid from the gel and to speed diffusion of fluid out of the tortuous nanoporous network of the gel. Because supercritical drying typically involves relatively high pressures, heavy-wall (usually stainless steel or another corrosion-resistant alloy) pressure vessels may be used to contain the process fluid and gel precursor materials. Accordingly, the dimensions of a monolithic aerogel (that is, solid continuous shaped form as opposed to particles or rolled fiber-reinforced composite blanket) made by supercritical drying are limited to the inner dimensions of the supercritical dryer equipment used to make it. Even for a rolled blanket gel precursor, the dimensions of the roll are limited to the diameter and height of the pressure vessel. Additionally, as noted above, supercritical drying often requires copious amounts of carbon dioxide and energy, solvent recycling, and substantial infrastructure, which can result in a process that is time consuming and costly.

Certain embodiments of the present disclosure address the concerns raised above, for example, by providing systems and methods for making aerogels that avoid supercritical drying. Since capillary stresses are the source of collapse when the solvent in a gel is evaporated, carefully balancing the modulus of the gel backbone against the magnitude of capillary stress incurred in principle would allow for solvent to be removed from a gel without causing substantial collapse. Additionally, when a gel shrinks from capillary collapse, for many gel formulations, functional groups lining the struts of the gel backbone (e.g., often hydroxyl or other polar groups) may have a tendency to stick to each other by hydrogen bonding or may react to form a covalent bond (e.g., in the case of hydroxyls to form an oxygen bridge by water condensation), causing irreversible shrinkage of the gel material. In the case of a silica gel, hydroxyl groups line the backbone of the gel. Since collapse due to capillary stresses is a response of the solid-phase material to the liquid-vapor interface receding into the overall material, such capillary stresses during drying may be reduced by a number of ways. For instance, the pore fluid in the gel may be replaced with a low-surface-tension solvent (e.g., pentane, hexane, heptane, etc.) that will exert a minimal or otherwise reduced amount of capillary force on the gel backbone as the liquid-vapor interface recedes into the gel. Simultaneously, to prevent irreversible collapse of the gel backbone, surface groups lining the gel's backbone may be replaced with sterically-hindered, hydrophobic functional groups so that the struts of the gel do not stick to each other when the gel shrinks. In the case of silica, surface hydroxyl groups may be reacted with a reactive hydrophobic substance, or hydrophobe, such as trimethylchlorosilane, hexamethyldisilazane, or hexamethyldisiloxane to make sterically-hindering, hydrophobic trimethylsilyl functional groups. In some cases, for example hexamethyldisiloxane, a substance may serve as both a hydrophobe and low-surface-tension solvent. The combination of the above techniques may significantly reduce or minimize shrinkage upon evaporation of solvent, and may permit reversal of shrinkage that does happen to occur, allowing for subcritical, ambient-pressure drying of aerogels.

Subcritical evaporative drying may have a tendency to result in shrinkage and cracking of gels, limiting the technique to particles, small monoliths, and fiber-reinforced blankets infiltrated with substantially cracked and pulverized aerogel. Also, while subcritical evaporative drying may work well for silica aerogel materials, in some cases, subcritical evaporative drying may be difficult to employ for other compositions. For aerogels with very high moduli, for example mechanically strong organic aerogels and x-aerogels, subcritical evaporative drying from low-surface-tension solvents such as pentane may result in shrinkage, cracking, warping, pulverization, densification, and other geometric distortions of monoliths, and may further involve dangerous quantities of flammable, high-vapor-pressure solvents. Also, subcritical evaporative drying may result in some permanent deformation even after reversal of shrinkage, meaning the resulting materials may tend to have lower porosity (<80-90% vs. 90-99+%), lower internal surface area, and higher density.

Much commercial focus of aerogels has been on silica aerogels, at least in part, due to their ultralow thermal conductivity (<20 mW/m-K), which makes them valuable for thermal insulation applications and, to a lesser extent, their transparency, which makes them valuable in energy-efficient fenestration applications such as daylighting panels (i.e., skylights). Electrically-conductive carbon aerogels may be used as electrodes for supercapacitors, at least in part, due to their combination of electrical conductivity and high internal surface area. Other advantageous material properties of aerogels are their high density-normalized strength and stiffness, which may be useful for applications demanding large parts and mechanical integrity such as lightweight plastics replacements, machinable parts for automotive, aerospace, and consumer electronics applications, and structural superinsulating panels for construction.

Analogous to how supercritical drying substantially limits the formation of phase boundaries by circumnavigating the critical point of a fluid, freeze drying (or lyophilization) substantially limits phase boundary formation during drying by circumnavigating the triple point of a fluid, the temperature and pressure at which a fluid's solid, liquid, and vapor phases are able to coexist in equilibrium. In freeze drying, the liquid in a porous material may be removed by first freezing, and then sublimating the frozen solid away.

In some cases, freeze drying may be used as a method of drying gels to produce cryogels. Additionally, freeze casting, in which a slurry of a solvent and discrete particles is molded and then freeze dried to produce an aerogel or aerogel-like material, may be used to make aerogels having a number of different compositions, including alumina aerogels and graphene aerogels. In some cases, aerogels, such as oxide aerogels, may be produced through freeze drying to produce small particles or powders. The production of monoliths by freeze drying is challenging and tends to result in small particles or powders. Obtaining monolithic oxide aerogels by freeze drying may be particularly challenging, and may be due to the relative intolerance of low-strength oxide gels to the stresses induced by freeze drying (e.g., freeze drying from water), which may limit the production of large monolithic aerogels of such compositions. For instance, small fractured aerogel chunks may be produced from cylindrical silica gels (e.g., 6.0×0.5 cm) by freeze drying from tert-butanol under a vacuum of approximately 0.1 torr at 60° C. for 24 h, resulting in dense (0.3-0.5 g/cc) materials. In another example, small (e.g., 0.09 cc to 0.95 cc) fragile silica aerogel monoliths may be produced using freeze drying under a vacuum of approximately 0.037 torr, which may yield aerogel materials having densities ranging between 0.12-0.2 g/cc. In such examples, when water is used as the solvent that is freeze dried, small particle powders would typically arise.

In some cases, inorganic oxide aerogels (e.g., silica, alumina, iron oxide, or nickel oxide aerogels) may be prepared via sol-gel synthesis, exchanged into low surface tension, highly volatile solvents, i.e., acetonitrile and tert-butanol, and dried under vacuum. Gels are synthesized in ethanol and solvent exchanged into mixtures of approximately 50 v/v %, approximately 80 v/v %, and approximately 100 v/v % tert-butanol or acetonitrile and ethanol for 24 h, and then are aged in ethanol for 48 h. After solvent exchange, samples may be placed in a vacuum chamber under a vacuum of approximately 80 kPa to 100 kPa at 50° C. The sample is heated, not cooled. The process may give small aerogel monoliths, e.g., a diameter of approximately 2.5 cm and a thickness of 1-5 mm, that are shrunk considerably compared to their gel precursor, e.g., about 50% by diameter.

Freeze drying of organic aerogels under vacuum may be applied to monolithic resorcinol-formaldehyde aerogels up to 50 cc in volume from water. While a meso- and microporous structure may result from the freeze drying process, when subject to freeze drying, such materials may be prone to the occurrence of microstructural damage and macroscopic damage that results in formation of macropores and macroscopic defects that would not otherwise exist.

In some cases, freeze casting may be a technique used in formation of materials including cellulose aerogels, graphene aerogels, and carbon nanotube aerogels. For example, in such a process, nanoscale particles may be dispersed in a solvent (e.g., water) that is subsequently frozen. The nanoparticles, excluded from the crystals of solvent as it solidifies, concentrate, and form a contiguous network. The frozen interstitial liquid may then be removed by sublimation under vacuum, leaving a highly porous structure, which can then be sintered or crosslinked. Freezing rate and direction can be used to control the morphology of the porous structure. The resulting materials may have substantial macroporous character resulting from artifacts arising from freezing of the solvent.

In accordance with aspects of the present disclosure, existing methods of producing aerogels have been limited to very small monoliths (e.g., less than a few centimeters maximum dimension), particles, and powders, and may still result in substantial shrinkage of and/or microstructural damage to the overall material. This may partially have to do with freeze drying generally involving expansion or contraction of the gel's pore fluid during freezing (non-degassed tert-butanol expands by 5% upon freezing, and water expands 10%) which can impart damage to the gel's micro- and macrostructure.

While small aerogel monoliths may be attainable by freeze drying in some cases, the inventors have recognized that the substantial dimensional and microstructural changes that result may preclude scaling up of freeze drying of such materials to panels with dimensions that are often needed for industrial applications. The inventors have also appreciated that gel compositions to which freeze drying and freeze casting methods have been applied often are lacking in key material features that would otherwise enable them to survive freeze drying without damage. These key material features are described in more detail below, and include, but are not limited to, low compressive yield strength, low compressive modulus, and compositions that are not prone to cracking.

The inventors have further recognized that freeze drying of aerogels, previously done exclusively under vacuum conditions, have required specialized equipment (e.g., vacuum chamber), that undermine key benefits of avoiding supercritical drying, such as not needing expensive pressure vessels and not limiting part dimensions to the size of the pressure vessel.

In accordance with certain embodiments of the present disclosure, certain combinations of material compositions, solvent preparation steps, pore fluid exchange steps, freezing steps, and frozen-solvent removal steps may provide for the production of large (i.e., ranging from centimeters to several meters) monolithic panels of aerogel materials (and other porous materials) with thermal insulating, acoustic damping, high-surface-area, weight-saving, and/or machinability benefits without requiring supercritical drying or subcritical evaporative drying. These processes are advantageous as they leverage and integrate, for the first time, a number of key insights regarding the nature of aerogels and drying of porous materials to enable dimensional scaling of aerogels and preservation of materials properties in ways that have previously not been attainable without supercritical drying.

Such processes also provide, according to certain embodiments, several benefits over supercritical drying including, for example, eliminating size limitations and reducing manufacturing and infrastructure costs.

First, there has not previously been a recognition of the importance of creating material precursors with suitable bulk modulus and yield strength to facilitate a freeze-drying process that results in monolithic, large-dimension panels with desirable ranges of moduli and strength.

Second, it has not previously been appreciated what types of aerogel precursor materials could meet the desired mechanical criteria.

Third, it has not been previously appreciated which solvents would be compatible with such materials for freeze drying (in part since such materials were not previously identified) and what benefits and disadvantages different solvents would have.

Fourth, it has not been previously appreciated to what extent solvents suitable for freeze-drying of large monolithic panels should be free of gases and liquid-phase impurities to prevent collapse of the gel material during drying.

Fifth, it has not been appreciated previously that frozen solvents can be removed from gel materials at atmospheric pressure in a way that minimizes or otherwise limits shrinkage of the gel precursor and results in monolithic, large-dimension panels.

Sixth, it has not been appreciated previously, for the aforementioned reasons and others, that aerogel materials with bulk densities, internal surface areas, thermal conductivities, and mechanical properties comparable to supercritically dried versions of the same material can be produced as large monoliths outside of supercritical drying.

Seventh, it has not been appreciated previously how quickly different solvents can be removed from the pores of large monolithic aerogels of different compositions by freeze drying.

Eighth, it has not been appreciated previously that materials that do not survive supercritical drying by carbon dioxide and/or are thermally unstable at the temperatures required for supercritical drying from organic solvents can be manufactured if freeze dried according to the methods herein.

Ninth, it has not been appreciated previously what temperatures and gas flow rates maximize or otherwise promote removal of frozen solvent from gel precursors at atmospheric pressure.

Tenth, it has not been appreciated previously that processes and equipment used to prepare materials for supercritical drying from carbon dioxide could be adapted for freeze drying of materials from dry ice, and that doing so could enable manufacture of materials that would otherwise be deleteriously affected by supercritical drying from carbon dioxide.

Eleventh, it has not been appreciated previously that the Gibbs-Thompson effect results in a pore-diameter dependence on freezing point depression of the pore fluid in a gel, and that while the bulk of the pore fluid may be frozen at a temperature equal to or near the freezing point of the unconfined bulk liquid, pore fluid in the smallest pores in the gel may not be frozen at the same temperature due to the Gibbs-Thompson effect preventing effective freeze drying to produce monolithic, substantially crack-free aerogels.

Twelfth, it has not been appreciated previously that subcooling a gel to temperatures substantially below the freezing point of the bulk form of the solvent in its pores may be required to freeze substantially all of the solvent in the pores of the gel, which is important to avoid the appearance of liquid-vapor interfaces during freeze drying, which can cause capillary stress and collapse of the pores of the gel, and that subcooling gels prior to freeze drying may reduce or prevent shrinkage of the gel during freeze drying.

Without wishing to be bound to any particular theory, porous materials such as aerogels contain a distribution of pore diameters, some classified as microporous (<2 nm in diameter), some classified as mesoporous (between 2-50 nm in diameter), and some classified as macroporous (greater than 50 nm in diameter). When a liquid is spatially confined, for example, trapped in the pore of a gel, its freezing point may be depressed by the Gibbs-Thompson effect, in some cases up to 30° C. or more. In general, according to the Gibbs-Thompson effect, the freezing point depression of the liquid is inversely related to the size of the pore. That is, for a liquid trapped within a small pore to be frozen, a temperature substantially below the freezing point of the bulk liquid may be required to freeze the trapped liquid.

As an example, liquid in a 100-nm pore may exhibit a freezing point depression of 3.6° C. compared to the bulk, while liquid in a 10-nm pore may exhibit a freezing point depression of 35.6° C. Other freezing point depressions for these and other pore widths may be possible and may depend on the composition of the liquid in the pore. Accordingly, while most of the pore fluid in a gel may be frozen at a given temperature close to or at the freezing point of the bulk liquid, liquid trapped in the smallest pores in the material may not be. Thus it has not been appreciated that shrinkage and/or cracking of aerogel materials with respect to their gel precursors during or after freeze drying may be attributed to residual unfrozen or melted pore fluid remaining in small pores of the gel due to a freezing point depression dependence on pore diameter. This pore fluid then does not sublimate but evaporates and exerts capillary stresses on the gel backbone resulting in shrinkage and/or cracking of the gel. In fact, many aerogel materials exhibit multimodal pore diameter distributions and contain a significant fraction of both micropores and mesopores and, in some cases, macropores. By freezing a gel precursor suitably far below the freezing point of the bulk form of its pore fluid, this residual pore fluid may be frozen and properly sublimated without causing deleterious capillary stress.

Accordingly, in some cases, a staged freezing and sublimation process may be employed to remove the solvent, or pore fluid (e.g., substance dispersed throughout the macropores, mesopores, and micropores of the gel). For example, a first portion of the solvent located within the mesopores of the gel may be frozen or solidified by subjecting the gel to a temperature below the freezing point (e.g., between 5-30 degrees C. below the nominal freezing point) of the bulk solvent. Though, not all of the solvent may be frozen at this temperature. For example, a second portion of the solvent located within the micropores of the gel may require an even lower temperature to be frozen or solidified. Nevertheless, the frozen or solidified first portion of the solvent may be substantially removed by sublimation, which may be accelerated by passing a gas (e.g., air) over/around the gel. Then, the second portion of the solvent located within the micropores of the gel may be frozen by subjecting the gel to a temperature even further below the freezing point (e.g., between 30-60 degrees C. below the nominal freezing point) of the solvent. At this point, all, or nearly the entirety, of the remaining solvent may be frozen. The remaining frozen or solidified second portion of the solvent may then be substantially removed by further sublimation, which may also be accelerated by passing a gas (e.g., air) over/around the gel. Such a staged process of freezing and sublimating the solvent for removal from the gel may give rise to a minimal or otherwise reduced amount of capillary stresses on the walls/backbone of the gel, resulting in an intact, mechanically strong aerogel. Freezing may be considered accomplished when a portion of solvent expected to freeze at a temperature has equilibrated to that temperature. For example, if solvent in the pores of a gel is expected to freeze at a temperature, the gel may be considered frozen by placing the gel in a refrigerator at that temperature and allowing the gel to equilibrate to that temperature over a period of time. The amount of time required for a pore of solvent to freeze may be determined by heat transfer calculations.

In some cases, smaller pores (e.g., micropores) may only be accessed by diffusion through larger pores (e.g., macropores, mesopores). Accordingly, in some cases, frozen pore fluid in larger pores may be removed before pore fluid in smaller pores. In some cases, sublimation of the frozen pore fluid from larger pores may be done without causing significant shrinking or cracking regardless of whether or not pore fluid in underlying smaller pores is frozen. Thus to maximize the rate of sublimation of solvent from a gel, the bulk of a gel's pore fluid may be sublimated at a relatively high temperature and then the partially-dried gel may then be cooled to a lower temperature at which the remaining pore fluid, which exhibits a greater freezing point depression than the pore fluid in the larger pores, freezes and may be removed by sublimation. In some cases removal of frozen pore fluid in smaller pores (e.g., micropores) may be aided by application of a reduced pressure to the gel.

The pore fluid in a gel may be frozen or solidified in one step by lowering the temperature of the gel to the temperature required to freeze or solidify the pore fluid in the smaller pores below the freezing point (e.g., between 30-60 degrees C. below the nominal freezing point) of the solvent. The frozen pore fluid may be removed at this lower temperature, or at a higher temperature by increasing the temperature of the gel or by passing a gas at a higher temperature over the surfaces of the gel. In some embodiments, the gas is flowed over exposed gel surfaces. The exposed gel surfaces are understood by those of ordinary skill in the art to be the macroscopic geometric surfaces of gel, which may be measured by measuring a macroscopic length and width of the gel with a macroscopic measuring tool, e.g., a ruler, and multiplying the length and width.

Thus, the temperature of the gel material may be changed at various stages of drying to maximize or promote the rate of removal of frozen pore fluid and facilitate sublimation of pore fluid from the smallest pores rather than evaporation. Unfrozen pore fluid may also be frozen by changing the pressure around the gel at different stages of drying. This problem and the solutions described herein had not been previously identified.

Thirteenth, it has not been appreciated previously that gels with solid backbones with suitably high compressive modulus, tensile modulus, compressive yield strength, tensile yield strength, and/or fracture toughness may have an increased resistance to dimensional changes resulting from the freezing of solvent in their pores, which may inhibit the formation of crystallites that would otherwise form in a gel with a weaker solid backbone. For example, the mechanical properties of the solid backbone of a gel may be reasonably assessed and may be proportional or identical to the mechanical properties of an aerogel that is supercritically dried from the gel in a way that retains as much of the volume of the original gel as possible.

Accordingly, the processes described herein are inventive and enable production of materials that were previously unable to be manufactured due to the limitations of supercritical drying.

Porous materials that do not rigorously meet the general definition of aerogel proposed herein can also be made. For example, materials that primarily contain pores greater than 50 nm in diameter, even microns, can be made, e.g., acid-catalyzed resorcinol-formaldehyde polymer gels. Porous biological materials and specimens such as tissue scaffolds, collagen, cells, and other biological materials and specimens may also be dried according to the methods herein. Materials that are less than 50% porous may also be made, e.g., relatively dense porous polyurethane nanostructured networks. Porous materials that are not nanostructured may also be made, e.g., polymer foams. Non-monolithic materials, e.g., powders and fiber-reinforced blankets, may also be made. Accordingly, the methods herein are not limited specifically to aerogels but are more widely applicable to porous materials of a wide variety as well.

Mechanically strong aerogel precursors may be particularly suited for drying by methods described herein. These include polymer-crosslinked oxides (the dried form of which are called cross-linked aerogels or x-aerogels, the wet form of which are called x-aerogel precursors or polymer-crosslinked gels), in which the interior contour surfaces of a network comprising metal oxide and/or metalloid oxide are coated with a polymer. In some embodiments, this polymer coating is a conformal coating. Conformal refers to covering a surface by matching its shape and contours, although possibly varying in thickness over that surface, and may not fully cover the surface. In some embodiments, conformal coatings may vary at least about 1%, at least about 5%, at least about 10%, at least about 20%, at least about 50%, at least about 100%, at least about 200%, at least about 400%, at least about 1000%, at least about 2000%, or more in thickness over the surface it covers. In some embodiments, a conformal coating covers at least about 10%, at least about 20%, at least about 50%, at least about 60%, at least about 70%, at least about 80%, at least about 90%, at least about 95%, or all of the surface. In some embodiments, a conformal coating comprises a surface layer. In some embodiments, this coating comprises a covalent bond to the oxide. In some embodiments, this coating comprises one or more surface layers. In some embodiments, the polymer comprises a polymer derived from an isocyanate. In some embodiments, the polymer comprises a polymer derived from an epoxide. In some embodiments, the polymer comprises a polymer derived from an amine. In some embodiments, the polymer comprises a polymer derived from a carboxylic acid. In some embodiments, the polymer comprises a polymer derived from an alcohol, a polyol, or other similar substance. In some embodiments, the polymer comprises a polymer derived from a cyclopentadiene. In some embodiments, the polymer comprises a polymer derived from a polystyrene, a polyacrylate, a polyvinyl, a polyacrylonitrile. In some embodiments, the oxide network is functionalized with a reactive functional group on its skeleton. In some embodiments, the reactive functional group comprises a hydroxyl, an amine, an isocyanate, a carboxylic acid, an acid halide, an epoxide, an ester, a vinyl. In some embodiments, the reactive functional group comprises an alkyl chain, an aromatic group. In some embodiments, a functional group on the oxide network forms a bond with the polymer.

In accordance with aspects of the present disclosure, suitable gel materials may be selected for freeze drying. The pore fluid in the gel may be exchanged for a suitable solvent. The pore fluid in the gel may then be degassed. The pore fluid in the gel may then be frozen. The frozen pore fluid may then be removed by sublimation.

In some embodiments, suitable gel materials include gels with a solid phase comprising a polyurea, a polyurethane, a polyisocyanate, a polyisocyanurate, a polyimide, a polyamide, a polybenzoxazine, a polyacrylonitrile, a polyetheretherketone, a polyetherketoneketone, a polybenzoxazole, a phenolic polymer, a resorcinol-formaldehyde polymer, a melamine-formaldehyde polymer, a resorcinol-melamine-formaldehyde polymer, a furfural-formaldehyde polymer, an acetic-acid-based polymer, a polymer-crosslinked oxide, a silica-polysaccharide polymer, a silica-pectin polymer, a polysaccharide, amorphous carbon, graphitic carbon, graphene, diamond, boron nitride, an alginate, a chitin, a chitosan, a pectin, a gelatin, a gelan, a gum, a cellulose, a virus, a biopolymer, an ormosil, an organic-inorganic hybrid material, a rubber, a polybutadiene, a poly(methyl pentene), a polypentene, a polybutene, a polyethylene, a polypropylene, a carbon nanotube, a boron nitride nanotube, graphene, two-dimensional boron nitride. In some embodiments, suitable gel materials may be reinforced with a fiber, a fibrous batting, aligned fibers, chopped fibers, or another suitable material. In some of these embodiments, the fiber comprises silica, glass, carbon, a polymer, poly(acrylonitrile), oxidized poly(acrylonitrile), poly(p-phenylene-2,6-benzobisoxazole) (e.g., Zylon®), poly(paraphenylene terephthalamide) (e.g., Kevlar®), ultrahigh molecular weight polyethylene (e.g., Spectra® or Dyneema®), poly(hydroquinone diimidazopyridine) (e.g., M5), polyamide (e.g., Nylon®), natural cellulose, synthetic cellulose, silk, viscose (such as Rayon®), a biologically-derived fiber, a biologically-inspired fiber, a ceramic, alumina, silica, zirconia, yttria-stabilized zirconia, hafnia, boron, metal/metalloid carbide (e.g., silicon carbide), metal/metalloid nitride (e.g., boron nitride), nanotubes, carbon nanotubes, carbon nanofibers, boron nitride nanotubes, oxide nanotubes.

In some embodiments, the solid phase of the gel includes a polyurea, and the polyurea of a gel is derived from the reaction of an isocyanate with water, in which amines are formed in situ. In some embodiments, the polyurea is derived from the reaction of an isocyanate with an amine. In some embodiments, the polyurea comprises an aromatic group. In some embodiments, the polyurea comprises isocyanurate. In some embodiments, the polyurea comprises flame retardant moieties, e.g., bromides, bromates, phosphates. In some embodiments, the polyurea aerogel exhibits a thermal conductivity less than about 20 mW/m-K. Thermal conductivity may be measured as follows. Thermal conductivity may be measured using an apparatus in which an aerogel sample (the mass, thickness, length, and width of which have been carefully measured as explained the procedure for measuring bulk density) is placed in series with a standard reference material (NIST SRM 1453 EPS board) of precisely known thermal conductivity, density, and thickness, between a hot surface and a cold surface. The hot side of the system comprises an aluminum block (4"×4"×1") with three cartridge heaters embedded in it. The cartridge heaters are controlled by an Omega CN7800 temperature controller operating in on/off mode. The set-point feedback temperature for the controller is measured at the center of the top surface of the aluminum block (at the interface between the block and the aerogel sample) by a type-K thermocouple (referred to as TC_H). A second identical thermocouple is placed directly beside this thermocouple (referred to as TC_1). The aerogel sample is placed on top of the aluminum block, such that the thermocouples are near its center. A third identical thermocouple (TC 2) is placed directly above the others at the interface between the aerogel sample and the reference material. The reference material is then placed on top of the aerogel sample covering the thermocouple. A third identical thermocouple (TC_3) is placed on top of the reference material, in line with the other three thermocouples. Atop this stack of materials is placed a 6" diameter stainless steel cup filled with ice water, providing an isothermal cold surface. Power is supplied to the heaters and regulated by the temperature controller such that the hot side of the system is kept at a constant temperature of 37.5° C. After ensuring all components are properly in place, the system is turned on and allowed to reach a state of equilibrium, which takes about 1 hour. At that time, temperatures at TC_1, TC_2, and TC_3 are recorded. This recording is repeated every 15 minutes for one hour. From each set of temperature measurements (one set being the three temperatures measured at the same time), the unknown thermal conductivity can be calculated as follows. By assuming one-dimensional conduction (i.e., neglecting edge losses and conduction perpendicular to the line on which TC_1, TC_2, and TC_3 sit) we can state that the heat flux through each material is defined by the difference in temperature across that material divided by the thermal resistance per unit area of the material (where thermal resistance per unit area is defined by $R''=t/k$, where t is thickness in meters and k is thermal conductivity in W/m-K). By setting the heat flux through the aerogel equal to the heat flux through the reference material, the thermal conductivity of the aerogel can be solved for (the only unknown in the equation). This calculation is performed for each temperature set, and the mean value is reported as the sample thermal conductivity. It is noted that the thermocouples used have been individually calibrated against a platinum RTD, and assigned unique corrections for zero-offset and slope, such that the measurement uncertainty is ±0.25° C. rather than ±2.2° C.

In some embodiments, the polyurethane of a gel is formed with a catalyst such as DABCO, dibutyltin dilaurate, a polyurethane catalyst, a tin catalyst. In some embodiments, the polyurethane comprises an aromatic group. In some embodiments, the polyurethane comprises isocyanurate. In some embodiments, the polyurethane comprises flame retardant moieties, e.g., bromides, bromates, phosphates. In some embodiments, the polyurethane aerogel exhibits a thermal conductivity less than about 20 mW/m-K.

In some embodiments, the polyimide of a gel is derived from the reaction of an amine with an anhydride. In some embodiments, the polyimide comprises an aromatic tri-amine. In some embodiments, a poly(amic acid) precursor is formed. In some embodiments, the polyimide is crosslinked by a crosslinker, e.g., a reactive molecule that connects polyimide oligomers together. In some embodiments, the polyimide comprises an inorganic crosslinker. In some embodiments, the crosslinker comprises an isocyanate, an amine, an anhydride, an alkylene oxide, an acyl chloride In some embodiments, the isocyanate comprises an aliphatic polyisocyanate, an alicyclic polyisocyanate, an aromatic polyisocyanate. In some embodiments, the amine comprises an aliphatic polyamine, an alicyclic polyamine, an aromatic polyamine. In some embodiments, the acyl chloride comprises bezene tricarbonyl chloride. In further embodiments, the inorganic crosslinker comprises a silicate, a silsesquioxane. In some embodiments, the polyimide is derived from the reaction of an isocyanate with an anhydride. In some embodiments, the isocyanate is a triisocyanate.

In some embodiments, an isocyanate is used to make the solid phase of a gel material. In some preferred embodiments, the isocyanate comprises hexamethylenediisocyanate, Desmodur® N3200, Desmodur N3300, Desmodur N100, Desmodur N3400, Desmodur RE, Desmodur RC, tris(isocyanatophenyl)methane, Mondur® MR, Mondur MRS, a methylene diphenyl diisocyanate, diphenylmethane 2,2'-, 2,4'- and/or 4,4'-diisocyanate (MDI), naphthylene 1,5-diisocyanate (NDI), a toluene diisocyanate, toluene 2,4- and/or 2,6-diisocyanate (TDI), 3,3'-dimethylbiphenyl diisocyanate, 1,2-diphenylethane diisocyanate and/or p-phenylene diisocyanate (PPDI), trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and dicyclohexylmethane 4,4'-, 2,4'- and/or 2,2'-diisocyanate.

In some embodiments, a silane is used to make the solid phase of a gel material. In some preferred embodiments, the silane comprises tetramethoxysilane, tetraethoxysilane, a tetraalkoxysilane, methyltrimethoxysilane, a trialkoxysilane, 3-aminopropyltriethoxysilane, 3-isocyanatopropyltriethoxysilane, a polysiloxane, a polydimethylsiloxane, a chlorosilane, dichlorodimethylsilane, trichloromethylsilane, dimethyldimethoxysilane, or another suitable silane.

In some embodiments, an amine is used to make the solid phase of a gel material. In some embodiments, the solid phase of the gel material comprises a polyisocyanate, a polyurea, a polyurethane, a polyisocyanurate, polyimide, a polyamide, a polybenzoxazine. In some preferred embodiments, the amine comprises 4,4'-oxydianiline, 3,4'-oxydianiline, 3,3'-oxydianiline, p-phenylenediamine, m-phenylenediamine, o-phenylenediamine, diaminobenzanilide, 3,5-diaminobenzoic acid, 3,3'-diaminodiphenylsulfone, 4,4'-diaminodiphenyl sulfones, 1,3-bis(4-aminophenoxy) benzene, 1,3-bis(3-aminophenoxy)benzene, 1,4-bis(4-aminophenoxy)benzene, 1,4-bis(3-aminophenoxy)benzene, 2,2-bis[4-(4-aminophenoxy)phenyl-]hexafluoropropane, 2,2-bis(3-aminophenyl)-1,1,1,3,3,3-hexafluoropropane, 4,4'-isopropylidenedianiline, 1-(4-aminophenoxy)-3-(3-aminophenoxy)benzene, 1-(4-aminophenoxy)-4-(3-aminophenoxy)benzene, bis[4-(4-aminophenoxy)phenyl]sulfones, 2,2-bis[4-(3-aminophenoxy)phenyl]sulfones, bis(4-[4-aminophenoxy]phenyl)ether, 2,2'-bis(4-aminophenyl)-hexafluoropropane, (6F-diamine), 2,2'-bis(4-phenoxyaniline)isopropylidene, m-phenylenediamine, p-phenylenediamine, 1,2-diaminobenzene, 4,4'-diaminodiphenylmethane, 2,2-bis(4-aminophenyl)propane, 4,4'diaminodiphenylpropane, 4,4'-diaminodiphenylsulfide, 4,4'-diaminodiphenylsulfone, 3,4'-diaminodiphenyl ether, 4,4'-diaminodiphenyl ether, 2,6-diaminopyridine, bis(3-aminophenyl)diethyl silane, 4,4'-diaminodiphenyldiethyl silane, benzidine, dichlorobenzidine, 3,3'-dimethoxvbenzidine, 4,4'-diaminobenzophenone, N,N-bis(4-aminophenyl)-n-butylamine, N,N-bis(4-aminophenyl)methylamine, 1,5-diaminonaphthalene, 3,3'-dimethyl-4,4'-diaminobiphenyl, 4-aminophenyl-3-aminobenzoate, N,N-bis(4-aminophenyl) aniline, bis(p-β-amino-t-butylphenyl)ether, p-bis-2-(2-methyl-4-aminopentyl)benzene, p-bis(1,1-dimethyl-5-aminopentyl)benzene, 1,3-bis(4-aminophenoxy)benzene, m-xylenediamine, p-xylenediamine, 4,4'-diaminodiphenyl ether phosphine oxide, 4,4'-diaminodiphenyl N-methyl amine, 4,4'-diaminodiphenyl N-phenyl amine, amino-terminal polydimethylsiloxanes, amino-terminal polypropyleneoxides, amino-terminal polybutyleneoxides, 4,4'-methylene-bis(2-methylcyclohexylamine), 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-methylene-bis-benzeneamine, 2,2'-bis[4-(4-aminophenoxy)phenyl] propane, 2,2'-dimethylbenzidine, bisaniline-p-xylidene, 4,4'-bis(4-aminophenoxy) biphenyl, 3,3'-bis(4-aminophenoxy)biphenyl, 4,4'-(1,4-phenylenediisopropylidene)bisaniline, 4,4'-(1,3-phenylenediisopropylidene) bisaniline.

In some embodiments, an anhydride is used to make the solid phase of a gel material. In some embodiments, the solid phase of the gel comprises a polyimide, a polyamide. In some preferred embodiments, the anhydride comprises hydroquinone dianhydride, 3,3',4,4'-biphenyl tetracarboxylic dianhydride, pyromellitic dianhydride, 3,3',4,4'-benzophenone tetracarboxylic dianhydride, 4,4'-oxydiphthalic anhydride, 3,3',4,4'-diphenylsulfonet etracarboxylic dianhydride, 4,4'-(4,4'-isopropylidenediphenoxy)bis(phthalic anhydride), 2,2-bis(3,4-dicarboxyphenyl)propane dianhydride, 4,4'-(hexafluoroisopropylidene)diphthalic anhydride, bis(3,4-dicarboxyphenyl) sulfoxide dianhydride, a polysiloxane-containing dianhydride, 2,2',3,3'-biphenyltetracarboxylic dianhydride, 2,3,2',3'-benzophenonetetraearboxylic dianhydride, 3,3',4,4'-benzophenonetetraearboxylic dianhydride, naphthalene-2,3,6,7-tetracarboxylic dianhydride, naphthalene-1,4,5,8-tetracarboxylidei anhydride, 4,4'-oxydiphthalic dianhydride, 3,3',4,4'-biphenylsulfonate tetracarboxylic dianhydride, 3,4,9,10-perylene tetracarboxylic dianhydride, bis(3,4-dicarboxyphenyl)sulfide dianhydride, bis(3,4-dicarboxyphenyl)methane dianhydride, 2,2-bis(3,4-dicarboxyphenyl)propane dianhydride, 2,2-bis(3,4-dicarboxyphenyl) hexafluoropropane dianhydride, 2,6-dichloronaphthalene-1,4,5,8-tetracarboxylic dianhydride, 2,7-dichloronapthalene-1,4,5,8-tetracarboxylic dianhydride, 2,3,6,7-tetrachloronaphthalene-1,4,5,8-tetracarboxylic dianhydride, phenanthrene-7,8,9,10-tetracarboxylic dianhydride, pyrazine-2,3,5,6-tetracarboxylic dianhydride, benzene-1,2,3,4-tetracarboxylic dianhydride, and/or thiophene-2,3,4,5-tetracarboxylic dianhydride.

In some embodiments, a crosslinking agent is used to make the solid phase of a gel material. In some embodiments, the solid phase of the gel comprises a polyisocyanate, a polyurea, a polyurethane, a polyisocyanurate, a polyimide, a polyamide, a polybenzoxazine. In some preferred embodiments, the solid phase of the gel comprises a polyisocyanate, a polyurea, a polyurethane, a polyisocyanurate. In some preferred embodiments, the crosslinking agent comprises a triamine, an aliphatic triamine, an aromatic triamine, tris(aminophenyl)methane, 1,3,5-tri(4-aminophenoxy)benzene, a silica cage structure decorated with three or more amines, octa(aminophenyl)silsesquioxane, octa(aminophenyl)silsesquioxane as a mixture of isomers having the ratio meta:ortho:para of 60:30:10, p-octa(aminophenyl) silsesquioxane, glutaraldehyde, 1-ethyl-3-(3-dimethylaminopropyl) carbodiimide, N-hydroxysuccinimide, bisphenol-A diglycidyl ether.

In some embodiments, a carboxylic acid is used to make the solid phase of a gel material. In some embodiments, the solid phase of the gel comprises a polyamide, a polybenzoxazole. In some preferred embodiments, the carboxylic acid comprises trimesic acid, oxalic acid, malonic acid, succinic acid, glutaric acid, adipic acid, pimelic acid, suberic acid, azelaic acid, sebacic acid, pyridine-2,4-dicarboxylic acid, terephthalic acid, or another suitable carboxylic acid.

In some embodiments, a polyol is used to make the solid phase of a gel material. In some embodiments, the solid phase of the gel comprises a polyisocyanate, a polyurea, a polyurethane, a polyisocyanurate, a polyimide, a polyamide, a polybenzoxazine. In some preferred embodiments, the polyol comprises resorcinol, phloroglucinol, bisphenol A, tris(hydroxyphenyl)ethane, sulfonyldiphenol, dihydroxybenzophenone, a polyether alcohol, ethylene glycol, propylene glycol, or another suitable polyol.

In some embodiments, a catalyst is used to make the solid phase of a gel. In some embodiments, the solid phase of the gel comprises a polyisocyanate, a polyurea, a polyurethane, a polyisocyanurate, a polyimide, a polyamide, a polybenzoxazine. In general, the catalyst does not remain in the final aerogel material. In some embodiments, the catalyst is used in conjunction with an isocyanate to facilitate polyisocyanate, polyurea, polyurethane, and/or polyisocyanurate formation in any suitable solvent used to produce polyisocyanate, polyurea, polyurethane, and/or polyisocyanurate gels. In some preferred embodiments, the catalyst is selected from the group consisting of primary, secondary, and tertiary amines; triazine derivatives; organometallic compounds; metal chelates; quaternary ammonium salts; ammonium hydroxides; and alkali metal and alkaline earth metal hydroxides, alkoxides and carboxylates. In some embodiments, a tertiary amine is used as a gelling catalyst or trimerization catalyst. In some preferred embodiments, the tertiary amine comprises N,N-dimethylbenzylamine, N,N'-dimethylpiperazine, N,N-dimethylcyclohexylamine, N,N',N''-tris(dialkylaminoalkyl)-s-hexahydrotriazines, for example N,N',N''-tris(dimethylaminopropyl)-s-hexahydrotriazine, tris(dimethylaminomethyl)phenol, bis(2-dimethylaminoethyl) ether, N,N,N,N,N-pentamethyldiethylenetriamine, methylimidazole, dimethylimidazole, dimethylbenzylamine, 1,6-diazabicyclo[5.4.0]undec-7-ene, triethylamine, triethylenediamine (IUPAC: 1,4-diazabicyclo[2.2.2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine and diisopropanolamine. In some embodiments, an organometallic compound is used as a gelling catalyst. In some preferred embodiments, the organometallic compound comprises tin 2-ethylhexanoate, dibutyltin dilaurate, a metal ion ethylhexanoate, zinc acetylacetonate, a metal acetoacetonate.

In some embodiments, a monomer that polymerizes by radical-mediated polymerization is used to make the solid phase of a gel. In some embodiments, the monomer comprises acrylonitrile, methyl(methacrylate), styrene, 1,3-divinylbenzene, 1,3,5-trivinylbenzene, or any suitable monomer that polymerizes by radical-mediated polymerization.

In some embodiments, a radical initiator is used to make the solid phase of a gel. In some embodiments, the radical initiator comprises azobisisobutyronitrile (AIBN), (4,4'-(diazene-1,2-diyl)bis-(4-cyano-N-(3-triethoxysilyl)propyl) pentanamide) (Si-AIBN), a peroxide initiator, an organic peroxide initiator, an azo initiator, a halogen initiator, or any suitable initiator compound.

In some embodiments, solvents used to make polyisocyanate materials are used to make a gel material. In some embodiments, the solid phase of the gel comprises a polyisocyanate, a polyurea, a polyurethane, a polyisocyanurate, a polyimide, a polyamide, a polybenzoxazine. In some preferred embodiments, the solvent comprises a ketone, an aldehyde, an alkyl alkanoate, an amide such as formamide and N-methylpyrrolidone, a sulfoxide such as dimethyl sulfoxide, aliphatic halogenated hydrocarbons, cycloaliphatic halogenated hydrocarbons, halogenated aromatic compounds, and/or fluorinated ethers.

In some embodiments, an aldehyde and/or ketone solvent is used to make a gel material. In some embodiments, the solid phase of the gel comprises a polyisocyanate, a polyurea, a polyurethane, a polyisocyanurate, a polyimide, a polyamide, a polybenzoxazine. In some preferred embodiments, the solvent comprises acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methacrolein, crotonaldehyde, furfural, acrolein dimer, methacrolein dimer, 1,2,3,6-tetrahydrobenzaldehyde, 6-methyl-3-cyclohexenealdehyde, cyanacetaldehyde, ethyl glyoxylate, benzaldehyde, acetone, diethyl ketone, methyl ethyl ketone, methyl isobutyl ketone, methyl n-butyl ketone, ethyl isopropyl ketone, 2-acetylfuran, 2-methoxy-4-methylpentan-2-one, cyclohexanone, and/or acetophenone.

In some embodiments, an alkyl alkanoate solvent is used to make a gel material. In some preferred embodiments, the solvent comprises methyl formate, methyl acetate, ethyl formate, butyl acetate, and/or ethyl acetate.

In some embodiments, an acetal solvent is used to make a gel material. In some preferred embodiments, the solvent comprises diethoxymethane, dimethoxymethane, and/or 1,3-dioxolane.

In some embodiments, a dialkyl ether, cyclic ether solvent is used to make a gel material. In some preferred embodiments, the solvent comprises methyl ethyl ether, diethyl ether, methyl propyl ether, methyl isopropyl ether, propyl ethyl ether, ethyl isopropyl ether, dipropyl ether, propyl isopropyl ether, diisopropyl ether, methyl butyl ether, methyl isobutyl ether, methyl t-butyl ether, ethyl n-butyl ether, ethyl isobutyl ether and/or ethyl t-butyl ether. Preferred cyclic ethers are especially tetrahydrofuran, dioxane, and/or tetrahydropyran.

In some embodiments, a hydrocarbon solvent is used to make a gel material. In some preferred embodiments, the solvent comprises ethane, propane, n-butane, isobutane, n-pentane, isopentane, cyclopentane, neopentane, hexane, and/or cyclohexane.

In some embodiments, a fluorocarbon solvent is used to make a gel material. In some preferred embodiments, the solvent comprises difluoromethane, 1,2-difluoroethane, 1,1,1,4,4,4-hexafluorobutane, pentafluoroethane, 1,1,1,2-tetrafluoroethane, 1,1,2,2-tetrafluoroethane, pentafluorobutane and its isomers, tetrafluoropropane and its isomers, and/or pentafluoropropane and its isomers. Substantially fluorinated or perfluorinated (cyclo)alkanes having 2 to 10 carbon atoms can also be used.

In some embodiments, a chlorofluorocarbon solvent is used to make a gel material. In some preferred embodiments, the solvent comprises chlorodifluoromethane, 1,1-dichloro-2,2,2-trifluoroethane, 1,1-dichloro-1-fluoroethane, 1-chloro-1,1-difluoroethane, 1-chloro-2-fluoroethane, 1,1,1,2-tetrafluoro-2-chloroethane, trichlorofluoromethane, dichlorodifluoromethane, trichlorotrifluoroethane, tetrafluorodichloroethane, 1- and 2-chloropropane, dichloromethane, monochlorobenzene, and/or dichlorobenzene.

In some embodiments, a fluorine-containing ether solvent is used to make a gel material. In some preferred embodiments, the solvent comprises bis-(trifluoromethyl) ether, trifluoromethyl difluoromethyl ether, methyl fluoromethyl ether, methyl trifluoromethyl ether, bis-(difluoromethyl) ether, fluoromethyl difluoromethyl ether, methyl difluoromethyl ether, bis-(fluoromethyl) ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2,2-trifluoroethyl difluoromethyl ether, 1,1-difluoroethyl methyl ether, 1,1,1,3,3,3-hexafluoroprop-2-yl fluoromethyl ether. In some preferred embodiments, the solvent comprises 1-methoxyheptafluoropropane (e.g., Novec 7000), methoxynonafluorobutane (e.g., Novec 7100), ethoxynonafluorobutane (e.g., Novec 7200), 3-methoxy-4-trifluoromethyldecafluoropentane (e.g., Novec 7300), 2-trifluoromethyl-3-ethoxydodecafluorohexane (e.g., Novec 7500), 1,1,1,2,3,3-hexafluoro-4-(1,1,2,3,3,3-hexafluoropropoxy)-pentane (e.g., Novec 7600), 2,3,3,4,4-pentafluorotetrahydro-5-methoxy-2,5-bis[1,2,2,2-tetrafluoro-1-(trifluoromethyl)ethyl]-furan (Novec 7700), a fluorinated ketone such as $CF_3CF_2C(=O)CF(CF_3)_2$ dodecafluoro-2-methyl-pentan-3-one (e.g., Novec 1230/649), tetradecafluoro-2-methylhexan-3-one/tetradecafluoro-2,4-dimethylpentan-3-one (e.g., Novec 774), a fluorinated ether, tetradecafluorohexane/perfluoropentane/perfluorobutane (e.g., Fluorinert FC-72), a fluorinated hydrocarbon such as 2,3-dihydrodecafluoropentane (e.g., Vertrel® XF), or any other appropriate organic solvent that includes fluorine.

In some embodiments, an aerogel material is produced. Aerogel materials may be composed of any suitable composition. In some embodiments, suitable compositions include aerogels comprising a polyurea, a polyurethane, a polyisocyanate, a polyisocyanurate, a polyimide, a polyamide, a polyaramid, a polybenzoxazine, a polyetheretherketone, a polyetherketoneketone, a polybenzoxazole, a poly(acrylonitrile), a phenolic polymer, a resorcinol-formaldehyde polymer, a melamine-formaldehyde polymer, a resorcinol-melamine-formaldehyde polymer, a furfural-formaldehyde polymer, an acetic-acid-based polymer, a polymer-crosslinked oxide, a silica-polysaccharide polymer, a silica-pectin polymer, a polysaccharide, amorphous carbon, graphitic carbon, graphene, diamond, boron nitride, an alginate, a chitin, a chitosan, a pectin, a gelatin, a gelan, a gum, a cellulose, a virus, a biopolymer, an ormosil, an organic-inorganic hybrid material, a rubber, a polybutadiene, a poly(methyl pentene), a polypentene, a polybutene, a polyethylene, a polypropylene, a carbon nanotube, a boron nitride nanotube, graphene, two-dimensional boron nitride. In some embodiments, the aerogel comprises at least about 50 wt %, at least about 60 wt %, at least about 70 wt %, at least about 80 wt %, at least about 90 wt %, at least about 95 wt %, at least about 99 wt %, at least about 99.9 wt %, or all polyisocyanate, polyurea, polyurethane, polyisocyanurate, polyimide, polyamide, polyaramid, polybenzoxazine, poly(acrylonitrile), resorcinol-formaldehyde, silica, or combinations thereof. In some embodiments, the aerogel comprises at least about 50 wt %, at least about 60 wt %, at least about 70 wt %, at least about 80 wt %, at least about 90 wt %, at least about 95 wt %, at least about 99 wt %, at least about 99.9 wt %, or all polyisocyanate, polyurea, polyurethane, polyisocyanurate, polyimide, polyamide, polyaramid, polybenzoxazine, poly(acrylonitrile), resorcinol-formaldehyde polymer, silica, or combinations thereof. In some embodiments, the aerogel comprises at least about 50 wt %, at least about 60 wt %, at least about 70 wt %, at least about 80 wt %, at least about 90 wt %, at least about 95 wt %, at least about 99 wt %, at least about 99.9 wt %, or all polyurea, polyurethane, polyisocyanate, polyisocyanurate, polyimide, polyamide, polyaramid, polybenzoxazine, polyetheretherketone, polyetherketoneketone, polybenzoxazole, phenolic polymer, resorcinol-formaldehyde polymer, melamine-formaldehyde polymer, resorcinol-melamine-formaldehyde polymer, furfural-formaldehyde polymer, acetic-acid-based polymer, polymer-crosslinked oxide, silica-polysaccharide polymer, silica-pectin polymer, polysaccharide, amorphous carbon, graphitic carbon, graphene, diamond, boron nitride, alginate, chitin, chitosan, pectin, gelatin, gelan, gum, cellulose, virus, biopolymer, ormosil, organic-inorganic hybrid material, rubber, polybutadiene, poly(methyl pentene), polypentene, polybutene, polyethylene, polypropylene, carbon nanotubes, boron nitride nanotubes, graphene, two-dimensional boron nitride, or combinations thereof.

In some embodiments, a dried or substantially-dried aerogel material (dried by any appropriate method) has a compressive modulus proportional to its gel precursor's compressive modulus. The aerogel material's compressive modulus may serve as a meaningful indicator of whether its gel precursor has a compressive modulus high enough such that freeze-drying of the gel precursor may result in a monolithic aerogel.

Compressive modulus and yield strength may be measured using the method outlined in ASTM D1621-10 "Standard Test Method for Compressive Properties of Rigid Cellular Plastics" followed as written with the exception that specimens are compressed with a crosshead displacement rate of 1.3 mm/s (as prescribed in ASTM D695) rather than 2.5 mm/s. In some cases, the compressive modulus of the aerogel material may be measured after freeze drying and removal of the solvent has occurred. In some cases, the compressive modulus of the aerogel material may be measured after supercritical drying and removal of the solvent or pore fluid has occurred. That is, the mechanical properties (e.g., compressive modulus, yield strength, etc.) of the aerogel material may refer to the mechanical properties of the backbone of the gel, absent the solvent or pore fluid.

In some embodiments, a dried or substantially-dried aerogel material (dried by any appropriate method) has a compressive yield strength proportional to its gel precursor's compressive yield strength and the aerogel material's compressive yield strength may serve as a meaningful indicator if its gel precursor has a compressive yield strength high enough such that freeze drying of the gel precursor may result in a monolithic aerogel.

In some embodiments, a dried or substantially-dried aerogel material (dried by any appropriate method) has a bulk density proportional to its gel precursor's bulk density and the aerogel material's bulk density may serve as a meaningful indicator of whether its gel precursor has a bulk density appropriate such that freeze drying of the gel precursor may result in a monolithic aerogel. One of ordinary skill in the art would know how to determine the bulk density of a material by dimensional analysis. For example, bulk density may be measured by first carefully machining a specimen into a regular shape, e.g., a block or a rod. The length, width, and thickness (or length and diameter) may be measured using digital calipers (accuracy ±0.001"). These measurements may then be used to calculate the specimen volume by, in the case of a block, multiplying length*width*height, or in the case of a disc, multiplying the length times the radius squared times pi. Mass may be measured using a digital analytical balance with a precision of 0.001 g. Bulk density may then be calculated as density=mass/volume.

The resulting aerogel may exhibit any suitable bulk density. In some embodiments, the bulk density may be between about 0.001 g/cc and 0.9 g/cc, between about 0.01 g/cc and about 0.6 g/cc, between about 0.04 g/cc and 0.55 g/cc. In some preferred embodiments, the bulk density may be between about 0.05 g/cc and about 0.3 g/cc. In some embodiments, aerogel materials that, when supercritically dried, exhibit densities above about 0.3 g/cc, may not be dried by freeze drying without densification that is greater than about 50%. In some embodiments, aerogel materials that, when supercritically dried, exhibit densities below about 0.05 g/cc, may not be dried by freeze drying without densification that is greater than about 50%.

The resulting aerogel may exhibit any suitable elasticity. In some embodiments, aerogel materials that exhibit high elasticity may be produced. Elasticity may refer to the degree of strain a material may undergo without retaining permanent deformation, e.g., its elastic deformation regime. In some embodiments, materials that exhibit a high degree of elasticity, e.g., greater than about 10%, greater than about 20%, greater than about 30%, greater than about 40%, greater than about 50%, greater than about 60%, greater than about 70%, greater than about 80%, or more, may be produced. In some embodiments, materials that exhibit a high degree of elasticity and exhibit bulk densities less than about 0.05 g/cc or greater than about 0.3 g/cc may be produced.

The resulting aerogel may exhibit any suitable skeletal density. One of ordinary skill in the art would appreciate that skeletal density refers to density of the solid component of the aerogel as opposed to the bulk density of the aerogel, which includes the volume of its pores. Skeletal density may be measured by measuring the skeletal volume of specimen using a pycnometer, for example, a Micromeritics AccuPyc II 1340 Gas Pycnometer, employing helium as the working gas. Specimens may be dried under a flow of nitrogen or helium prior to measurement to remove moisture or other solvent from the pores of the aerogel. Skeletal volume measurements may be taken by averaging 100 measurements. Mass may be measured using a digital analytical balance with a precision of 0.001 g. Skeletal density may be calculated as skeletal density=mass/skeletal volume. In some embodiments, the skeletal density of the aerogel is between about 1 g/cc about 1.1 g/cc, between about 1 g/cc and 1.2 g/cc, between about 1 g/cc and 1.3 g/cc, between about 1 g/cc and 1.4 g/cc, between about 1 g/cc and 1.5 g/cc, between about 1 g/cc and 1.6 g/cc, between about 1 g/cc and 1.7 g/cc, between about 1 g/cc and 1.8 g/cc, between about 1 g/cc and 1.9 g/cc, between about 1.1 g/cc and 1.3 g/cc, between about 1.1 g/cc and 1.4 g/cc, between about 1.8 g/cc and 2.1 g/cc, between about 1.8 g/cc and 2.2 g/cc, between about 3 g/cc and 4 g/cc, between about 4 g/cc and 5 g/cc.

The resulting aerogel may exhibit any suitable compressive modulus. In some preferred embodiments, the compressive modulus of the resulting aerogel is greater than 100 kPa, greater than 500 kPa, greater than 1 MPa, greater than 10 MPa, greater than 50 MPa, greater than 100 MPa; or less than 100 MPa, less than 50 MPa, less than 10 MPa, less than 1 MPa, less than 500 kPa, less than 100 kPa. Combinations of the above noted ranges, or values outside of these ranges, are possible for the compressive modulus of the resulting aerogel.

The resulting aerogel may exhibit any suitable compressive yield strength. In some preferred embodiments, the compressive yield strength of the resulting aerogel is greater than 20 kPa, greater than 40 kPa, greater than 100 kPa, greater than 500 kPa, greater than 1 MPa, greater than 5 MPa, greater than 10 MPa, greater than 50 MPa, greater than 100 MPa, greater than 500 MPa; or less than 500 MPa, less than 100 MPa, less than 50 MPa, less than 10 MPa, less than 5 MPa, less than 1 MPa, less than 500 kPa, less than 100 kPa, or less than 50 kPa. Combinations of the above noted ranges, or values outside of these ranges, are possible for the compressive yield strength of the resulting aerogel.

The resulting aerogel may exhibit any suitable compressive ultimate strength. In some preferred embodiments, the compressive ultimate strength of the resulting aerogel is greater than 1 MPa, greater than 10 MPa, greater than 50 MPa, greater than 100 MPa, greater than 500 MPa, greater than 1000 MPa; or less than 1000 MPa, less than 500 MPa, less than 100 MPa, less than 50 MPa, less than 10 MPa, less than 5 MPa, or less than 1 MPa. Combinations of the above noted ranges, or values outside of these ranges, are possible for the compressive ultimate strength of the resulting aerogel.

The resulting aerogel may exhibit any suitable thermal conductivity. In some preferred embodiments, the thermal conductivity of the resulting aerogel is less than about 60 mW/m-K, less than about 50 mW/m-K, less than about 40 mW/m-K, less than about 30 mW/m-K, less than about 20 mW/m-K, between about 15 and 20 mW/m-K, between about 15 and 30 mW/m-K, between about 15 and 40 mW/m-K.

The resulting aerogel may exhibit any suitable transparency. In some preferred embodiments, the transparent aerogel allows at least about 50%, at least about 60%, at least about 70%, at least about 80%, at least about 90%, at least about 95%, or more transmission of light per cm of aerogel thickness over the range of wavelengths of 480 nm to 750 nm. Other degrees of transparency over other ranges of wavelengths are also suitable.

In some preferred embodiments, the resulting aerogel is not friable. In some preferred embodiments, a monolithic aerogel (as understood by those of skill in the art) is produced. In some preferred embodiments, a substantially crack-free aerogel is produced. A crack generally refers to a separation, gap, or line in the material comprising a specimen. Cracks may be determined by observation of a sample. Cracks on the interior of a sample may be recognized by cutting a cross section of a specimen and counting cracks on the inside of the sample. Cracks may be recognized with or without the aid of a microscope. A crack may be located within the volume or on the outer edges of a specimen. Crack density may be calculated by considering the number of cracks in a specimen divided by volume of the specimen. A substantially crack-free aerogel is an aerogel that has fewer than or equal to one crack per cubic centimeter of the aerogel. In some embodiments, the substantially crack-free aerogel has fewer than or equal to one crack per 10 cubic centimeters, fewer than or equal to one crack per 100 cubic centimeters. Cracks may form after the gel forms and may result from a drying process. Cracks may range from microns to cm in length, may be less than microns in length, or may be more than cm in length. In some embodiments, the substantially crack-free aerogel may include an aerogel that does not contain cracks greater than the critical flaw size of the material that the aerogel is made of. In some embodiments, the substantially crack-free aerogel does not contain cracks greater than or equal to 1 cm long, greater than or equal to 1 mm long, greater than or equal to 1 μm long.

In some embodiments, the resulting aerogel is not brittle. Those of ordinary skill in the art would understand a material to not be brittle if a load is applied to a specimen of the material and it undergoes plastic deformation before experiencing failure. A non-brittle material is a material that is not brittle.

In some embodiments, the resulting aerogel has a maximum operating temperature. The maximum operating temperature of an aerogel is the temperature at which the material undergoes deleterious chemical, mechanical, phase, and/or density changes that cause the aerogel to lose mechanical integrity and/or most of its porosity. In some embodiments, the maximum operating temperature is determined by placing the aerogel in an oven at a temperature under a suitable atmosphere, allowing the aerogel to equilibrate to the temperature of the oven, and observing if the aerogel breaks into multiple pieces or densifies to a degree that it loses most of its porosity due to heating. Suitable atmospheres for determining maximum operating temperature include those atmospheres under which the aerogel is expected to operate. Suitable atmospheres for determining maximum operating temperature may include air, nitrogen, argon, vacuum, or any other suitable atmosphere.

The resulting aerogel may exhibit any suitable dimensions compared to the original gel precursor. One of ordinary skill in the art would appreciate that articles such as aerogels exist in a three-dimensional space and have three orthogonal dimensions, length, width, and height, at the three dimensions are orthogonal to each other. The term thickness may also refer to one of these dimensions, e.g., height. In some preferred embodiments, the dimensions of the aerogel are within about 1%, within 2%, within 5%, within 10%, within 20%, or within 50% of the original gel precursor. In some embodiments, at least one or at least two dimensions of the aerogel have lengths that are within about 1%, within 2%, within 5%, within 10%, within 20%, or within 50% of the length of the corresponding dimension of the gel precursor. Dimensions of a gel precursor may be measured by selecting two points on the gel precursor and measuring the distance between them with a measuring tool. Dimensions of an aerogel may be measured by selecting two points on the aerogel and measuring the distance between them with a measuring tool. Dimensions of an aerogel that may be compared with the corresponding dimensions of its gel precursor may include length, width, and height of the aerogel and gel precursor. Dimensions of the aerogel outside of these ranges may be possible.

The resulting aerogel may exhibit any suitable volume compared to the original gel precursor. In some preferred embodiments, the volume of the aerogel is within about 1%, within 2%, within 5%, within 10%, within 20%, within 50% of the original gel precursor.

The resulting aerogel may exhibit any suitable internal surface area. In some preferred embodiments, the internal surface area of the aerogel is within 1%, within 5%, within 10%, within 20%, within 50% of the internal surface area of an aerogel supercritically dried from the same gel precursor. In some embodiments, the internal surface area of the aerogel is greater than about 50 $m^2/g$, greater than about 100 $m^2/g$, greater than about 200 $m^2/g$, greater than about 300 $m^2/g$, greater than about 400 $m^2/g$, greater than about 500 $m^2/g$, greater than about 600 $m^2/g$, greater than about 700 $m^2/g$, greater than about 800 $m^2/g$, greater than about 1000 $m^2/g$, greater than about 2000 $m^2/g$, greater than about 3000 $m^2/g$, less than about 4000 $m^2/g$. In some preferred embodiments, the internal surface area of the aerogel is between about 50 $m^2/g$ and about 800 $m^2/g$. Values of the internal surface area of the aerogel outside of these ranges may be possible. One of ordinary skill in the art would know how to determine the internal surface area of an aerogel, for example, using nitrogen adsorption porosimetry. A surface area derived from the Brunauer-Emmett-Teller (BET) model may be used. For example, nitrogen sorption porosimetry may be performed using a Micromeritics Tristar II 3020 surface area and porosity analyzer. Before porosimetry analysis, specimens may be subjected to vacuum of ~100 torr for 24 hours to remove adsorbed water or other solvents from the pores of the specimens. The porosimeter may provide an adsorption isotherm and desorption isotherm, which comprise the amount of analyte gas adsorbed or desorbed as a function of partial pressure. Specific surface area may be calculated from the adsorption isotherm using the Brunauer-Emmett-Teller (BET) method over ranges typically employed in measuring surface area. Pore width, pore area distribution, and mean pore size may be calculated from the nitrogen desorption isotherm using the Barrett-Joyner-Halenda (BJH) method over ranges typically employed in measuring pore width and pore area distribution. Average pore width, e.g., mean pore size, (assuming cylindrical pores) may be calculated using pore width=4* (total specific volume)/(specific surface area) where total specific volume and specific surface area may also be calculated using BJH analysis of the desorption isotherm.

In some embodiments, the aerogel may comprise a carbonizable, or pyrolyzable, polymer. Carbonizable polymers are polymers that, when pyrolyzed under an inert atmosphere, leave a carbonaceous residue, amorphous carbon, graphitic carbon, or in some cases, a metal or metalloid or a metal or metalloid carbide. A carbonizable aerogel comprises a carbonizable polymer. A carbonized derivative of an aerogel may include a carbonized aerogel, e.g., a carbon aerogel, a metal or metalloid aerogel. Carbonization may be performed by placing a carbonizable aerogel in an inert atmosphere, e.g., under nitrogen or argon gas, and heating the aerogel to temperatures at which the aerogel carbonizes, e.g., at least about 300° C., at least about 400° C., at least about 500° C., at least about 600° C., at least about 700° C., at least about 800° C., at least about 900° C., at least about 1000° C., at least about 1100° C., at least about 1500° C., at least about 2000° C., at least about 2200° C., at least about 2500° C., at least about 3000° C. In some preferred embodiments, the temperature used to carbonize, or pyrolyze, the aerogel is between about 400° C. and 1100° C. In some embodiments, the carbonizable aerogel comprises an aromatic polymer, a phenolic polymer, a resorcinol-formaldehyde polymer, a silica/aromatic polymer hybrid, a metal and/or metalloid oxide/polymer hybrid, a biopolymer. In some preferred embodiments, the carbonizable aerogel comprises an aromatic polymer. In some embodiments, a carbonized aerogel is a carbonized derivative of an aerogel.

In some embodiments, the pore fluid in the gel may be replaced with a desired solvent (e.g., tert-butanol). In general, pore fluid refers to the liquid, vapor, gas, or fluid contained within the pores of a gel and may include a solvent. In some embodiments, when the pore fluid in a gel is replaced with a solvent, the pore fluid in the gel already contains a solvent. In some embodiments, solvents have desirable properties relative to room temperature. Those of ordinary skill in the art would understand room temperature to be temperatures within the range of about 20-25° C., In some embodiments, preferred solvents include those that have a triple point near room temperature (e.g., about –60 to 60° C.) and that have a relatively high vapor pressure at ambient conditions (e.g., greater than about 0.01 torr, greater than about 0.1 torr, greater than about 1 torr, greater than about 10 torr, greater than about 20 torr, greater than about 30 torr, greater than about 40 torr, greater than about 50 torr, greater than about 60 torr, greater than about 70 torr, greater than about 80 torr, greater than about 90 torr, or greater than about 100 torr).

Ambient conditions may include ambient pressure conditions and ambient temperature conditions including temperatures near room temperature, e.g., about 0-50° C. In some embodiments, the bulk form of the solvent has a freezing point below or near room temperature (e.g., about 25° C., 10-35° C., 0-50° C.) at ambient pressure conditions. In some preferred embodiments, the solvent undergoes a low change in density when it is frozen. In some preferred embodiments, the solvent undergoes a change in density within less than about $3\times10^{-4}$ g/cc, less than about $4\times10^{-4}$ g/cc, less than about $8\times10^{-4}$ g/cc, less than about $1\times10^{-3}$ g/cc, or less than about $2\times10^{-3}$ g/cc when frozen. Table 1 lists some properties of solvents used in freeze drying in some embodiments. In some preferred embodiments, the solvent includes tert-butanol, water, neopentanol, cyclohexanol, cyclohexanone, and/or carbon dioxide. In some embodiments, the gel is soaked in a fraction of the desired excess solvent volume, the pore fluid in the gel and the solvent are allowed to mix, the concentrations of species in the resulting mixture reaches approximately equilibrium, another fraction of new excess solvent is provided, and the process is repeated until the desired quantity of excess solvent has been used. In some embodiments, an excess of solvent equivalent to at least approximately 2 times, at least approximately 5 times, at least approximately 10 times, at least approximately 20 times, at least approximately 50 times, at least approximately 100 times, or less than approximately 2 times the volume of the gel is used to displace the gel's pore fluid. However, in the most preferred embodiments, a volume of excess solvent suitable enough to bring, by diffusive exchange, the purity of the solvent in the pores of the gel to levels that minimize shrinkage of the gel during freeze drying is used. In some of these embodiments, the volume of excess solvent is at least approximately 20 times, at least approximately 50 times the volume of the gel.

TABLE 1

List of properties of solvents for freeze drying in accordance with some embodiments.

| Solvent | Mol. Wt | Melting Point @ Atmospheric Pressure | Triple Point | Vapor Pressure @ Freezing Point [Torr] | Density change @ Freezing Point [g/cm$^3$] | Enthalpy of Fusion kJ/mol | Enthalpy of Sublimation kJ/mol |
|---|---|---|---|---|---|---|---|
| Tert-butanol | 74.12 [A] | 298.3 ± 0.7 [A] | 299 [A] | 44 [C] | −3.4E−4 [B] | 6.7 [A] | 51.3 [A] |
| Acetonitrile | 41.05 [A] | 228.1 ± 1 [A] | 229.32 [A] | 1.5 [C] | N/A | 8.2 [A] | N/A |
| Neopentanol | 88.15 [A] | 323-32 [A] | N/A | N/A | N/A | 3.5 [A] | N/A |
| Cyclohexanol | 100.16 [A] | 296 ± 0.5 [A] | 297-299 [A] | 0.14 [C] | N/A | 1.7 [A] | 60.7 [A] |
| Cyclohexanone | 98.14 [A] | 243 ± 10 [A] | 242-245 [A] | 0.04 [C] | N/A | 1.3 [A] | 49.3 [A] |
| Water | 18.02 [A] | 273 | 273 | 4.3 [C] | −7.5E−2 [B] | 6.0 [D] | 51.1 [E] |
| Carbon Dioxide | 44.00 [A] | N/A | 216.58 [A] | 42,800 | N/A | 8.7 [F] | 26 [A] |

References:

[A]: NIST Webbook (http://webbook.nist.gov/chemistry/)

[B]: Tamon, H., Ishizaka, H. Yamamoto, T., Suzuki, T., "Preparation of Mesoporous Carbon by Freeze Drying," Carbon, 37, pp. 2049-2055, 1999.

[C]: NIST Webbook (http://webbook.nist.gov/chemistry/) - Antoine Parameters

[D]: CRC Handbook of Chemistry and Physics 62$^{nd}$ Edition

[E]: D. M. Murphy and T. Koop, Review of the vapour pressures of ice and supercooled water for atmospheric applications, Q. J. R. Meteorol. Soc. 131 (2005) 1539-1565.

[F]: Dortmund Data Bank

REFERENCES

A: NIST Webbook (http://webbook.nist.gov/chemistry/)
B: Tamon, H., Ishizaka, H. Yamamoto, T., Suzuki, T., "Preparation of Mesoporous Carbon by Freeze Drying," Carbon, 37, pp. 2049-2055, 1999.
C: NIST Webbook (http://webbook.nist.gov/chemistry/)—Antoine Parameters
D: CRC Handbook of Chemistry and Physics 62$^{nd}$ Edition
E: D. M. Murphy and T. Koop, Review of the vapour pressures of ice and supercooled water for atmospheric applications, Q. J. R. Meteorol. Soc. 131 (2005) 1539-1565.
F: Dortmund Data Bank In some embodiments, the purity of the pore fluid in the gel after solvent exchange is within 2 v/v %, within 1 v/v %, within 0.1 v/v %, within. 5 v/v %, within 0.01 v/v %, within 0.005 v/v %, within 0.001 v/v % of the purity of the original solvent prior to contact with the gel. Values of the purity of the pore fluid in the gel after solvent exchange outside of these ranges may be possible.

The pore fluid may be exchanged with any suitable solvent. In some embodiments, the pore fluid in the gel is exchanged for an alcohol. In further embodiments, the pore fluid in the gel is exchanged for methanol, ethanol, isopropanol, n-propanol, n-butanol, sec-butanol, tert-butanol, a pentanol, 2-methoxyethanol, amyl alcohol, cyclohexanol. In some embodiments, the pore fluid in the gel is exchanged for C1-C6 alcohols. In some embodiments, the alcohol meets the purity specifications of ACS Reagent Grade. In some of these embodiments, only one alcohol is used. In some embodiments, the pore fluid in the gel is exchanged for other appropriate solvents/substances, such as for example, acetone, acetonitrile, water, cyclohexanone, dimethylsulfoxide, N-methylpyrolidone, N,N'-dimethylformamide, dimethylacetamide, carbon dioxide, amongst others. In some of these embodiments, the solvent meets the purity specifications of ACS Reagent Grade. In some of these embodiments, only one solvent is used. In some embodiments, the pore fluid in the gel is exchanged with water. In some embodiments, the water is deionized, distilled. In some of these embodiments, the water meets of the purity specifications of Analytical Reagent Grade. In some embodiments, the pore fluid is exchanged for liquid carbon dioxide. In some of these embodiments, the carbon dioxide is Industrial Grade. In some embodiments, the carbon dioxide is Ultrahigh-Purity Grade.

In some embodiments, the pore fluid in the gel and/or the solvent used to replace the pore fluid in the gel is/are degassed. In some of these embodiments, the pore fluid/solvent is/are degassed by bubbling an inert gas in, through, or around the pore fluid/solvent. In some embodiments, the pore fluid/solvent is/are degassed by providing a reduced pressure over the pore fluid/solvent. In some embodiments, the pore fluid/solvent is/are degassed by providing an elevated temperature. In some embodiments, the pore fluid/solvent is/are degassed for at least approximately 1 min, at least approximately 2 min, at least approximately 10 min, at least approximately 30 min, at least approximately 1 h, at least approximately 2 h, at least approximately 4 h, at least approximately 12 h, at least approximately 24 h, at least approximately 48 h, at least approximately 72 h, or any other appropriate time period.

In some embodiments, the gel is frozen. In some of these embodiments, the gel is frozen by reducing the temperature of the gel at or below the freezing point of the gel's pore fluid. In some embodiments, the gel is frozen by freezing greater than about 50%, greater than about 60%, greater than about 70%, greater than about 80%, greater than about 90%, greater than about 95%, greater than about 99%, greater than about 99.9% of the volume of solvent in its pores. The solvent in the pores of a gel may be frozen by placing the gel in a chamber that is at the temperature at which the solvent freezes and allowing the gel to equilibrate with the temperature inside the chamber for a suitable amount of time. Suitable amounts of time may be determined by experimentation or by standard heat transfer equations. The percentage of solvent in the pores of a gel that is frozen may be determined by heat transfer equations. Porous media, e.g., gels, may exhibit a freezing point depression effect in which the temperature at which liquid confined in a pore freezes may be a function of the size of the pore. This freezing point depression may be inversely related to the width of the pore. For example, the liquid in a mesopore may freeze at a higher temperature than a micropore. In some embodiments, the gel may be cooled well below the bulk freezing point of the solvent in its pores to ensure adequate freezing in the smallest pores of the gel network. In some embodiments, the gel is frozen at a temperature substantially below the freezing point of the bulk form of the liquid in the pores of the gel, e.g., greater than about 20° C., greater than about 25° C., greater than about 30° C., greater than about 35° C. below the melting point of the bulk form of the liquid in the pores of the gels. A gel may be considered frozen after its temperature has equilibrated throughout to the temperature at which it is being frozen. In some embodiments, the gel is frozen before freeze drying. Those of ordinary skill in the art would understand how to determine if the gel is frozen using heat transfer equations.

However, a higher sublimation rate may be achieved at higher temperatures during drying than the temperature used to freeze the gel. As with the freezing point, a similar depression of melting point may occur when confined in small pores. However, the extent of melting point depression may be less than the extent of freezing point depression for many pore sizes. The result may be a freezing-melting hysteresis where melting may occur at a higher temperature than freezing for a given pore size. In some embodiments, this effect may be leveraged to maximize drying temperature while minimizing the quantity of liquid-filled pores by subcooling the gel to a temperature below the temperature used to freeze it. In some embodiments the gel may first be frozen at a first temperature, e.g., 0° C., and further subcooled to a second lower temperature, e.g., −10° C., to freeze additional pores of smaller diameters. For example, a hysteresis may exist between the freezing point and melting point of the solvent in the pores of the gel. In some embodiments, it may be advantageous to subcool the gel to a temperature that does not result in cracking of the gel, for example. In some embodiments, the temperature used to subcool the gel is within about 0° C.–5° C., within about 0° C.–10° C., within about 0° C.–15° C., within about 0° C.–20° C., or within about 0° C.–25° C. below the first freezing temperature. In some embodiments, temperatures below about 25° C. the first temperature may result in cracking of the gel. Once frozen, the solvent in the pores of the gel may be heated to a temperature higher than the temperature used to freeze it without melting. This temperature at which sublimation occurs may be at least about 0° C.–5° C., at least about 0° C.–10° C., at least about 0° C.–15° C., at least about 0° C.–20° C., or at least about 0° C.–25° C. higher the temperature used to freeze the solvent in the pores of the gel. Sublimation of frozen solvent may occur more quickly at higher temperatures and thus it may be desirable to perform sublimation at as high of a temperature as possible without causing frozen solvent in the pores of the gel to melt. Sublimation of the frozen solvent in the pores may then be performed at any suitable higher temperature above the temperature used to freeze the gel, e.g., by flowing a gas at 0° C. over the surfaces of the gel, at which many of the smaller pores that may have initially been liquid at this temperature prior to subcooling remain frozen, and thus will not collapse during drying. In some embodiments, a freezing step, cooling step, or sublimation step is performed after another freezing step, cooling step, or sublimation step. In some embodiments, a gel is maintained at the temperature, pressure, and humidity conditions that existed at the end of its last freezing step, cooling step, or sublimation step for a period of time. In some embodiments, this period of time is at least about 1-60 min, at least 1-24 hours, at least 1-4 days, or more.

In some of these embodiments, the pore fluid of the gel comprises liquid carbon dioxide and the gel is frozen by depressurizing the atmosphere above the gel. In some of these embodiments, the gel is under the vapor pressure of carbon dioxide at its respective temperature. In some embodiments, depressurization is done at a rate of at least 1 psi/min, at least 5 psi/min, at least 10 psi/min, at least 50 psi/min, at least 100 psi/min, at least 200 psi/min, at least 500 psi/min, at least 750 psi/min, or any other appropriate depressurization rate. In some embodiments, the depressurization is rapid. In some embodiments, depressurization results in a substantially amorphous solid phase of carbon dioxide. In some embodiments, depressurization results in solid phase carbon dioxide crystallite sizes that are very small, e.g., less than about 100 nm, less than about 50 nm, less than about 10 nm, less than about 5 nm. In some embodiments, a solid phase that is substantially amorphous or contains small crystallite sizes is advantageous as it does not disrupt the pore structure of the gel and enables production of aerogel materials with substantially similar or superior materials properties to supercritically dried aerogels. In some embodiments, the gel containing frozen carbon dioxide is exposed to conditions under which the carbon dioxide will sublimate. In some preferred embodiments, the gel containing frozen carbon dioxide is exposed to substantially ambient conditions, e.g., atmospheric pressure and room temperature. In some preferred embodiments, substantially all of the frozen carbon dioxide sublimates and results in an aerogel material. In some preferred embodiments, at least about 50%, at least about 75%, at least about 90%, at least about 95%, at least about 99%, or more of the frozen carbon dioxide sublimates. In some preferred embodiments, the carbon dioxide sublimates under substantially dry conditions, i.e., in an atmosphere that contains little or no water vapor. In some embodiments, the atmosphere comprises dry air. In some embodiments, the atmosphere comprises helium, nitrogen, argon, carbon dioxide, and/or another inert gas. In some embodiments, the dew point of the surrounding atmosphere is less than about 25° C., less than about 10° C., less than about 0° C., less than about −10° C., less than about −25° C., less than about −50° C., less than about −75° C., or any suitable dew point. Values of dew point of the atmosphere surrounding the gel during sublimation of the carbon dioxide outside of these ranges may be possible. In some embodiments, a dry gas is used. In some embodiments, a dry gas comprises a gas that is substantially free of moisture or humidity, e.g., the dew point of the surrounding atmosphere is less than about 25° C., less than about 10° C., less than about 0° C., less than about −10° C., less than about −25° C., less than about −50° C., less than about −75° C., or any suitable dew point. In some embodiments, the percentage of moisture in the gas is at least less than about 1%, at least less than about 0.5%, at least less than about 0.1%, at least less than about 0.05%, at least less than about 0.01%, or less. In some embodiments, the amount of pore fluid in a gel may be determined by its mass, and the amount of pore fluid removed from a gel may be determined by measuring its mass over a period of time. A sample may be considered dry, or containing approximately 0% frozen or liquid solvent in its pores, when its mass does not change within 1% from measurement to measurement over a period of 12 h.

In some embodiments, the pore fluid of the gel comprises an organic solvent. In some embodiments, the gel is frozen with a mechanical refrigeration unit. In some embodiments, the gel is frozen with a solid-state cooling device (e.g., a Peltier cooler). In some embodiments, the gel is frozen by exposure to cold air. In some embodiments, the gel is frozen by exposure to cold gas. In some embodiments, the gel is frozen by exposure to cryogenic liquid. In some embodiments, the gel is sealed with a protective membrane to prevent evaporative loss of pore fluid from the gel.

In some embodiments, the frozen gel is dried by sublimation of its frozen pore fluid. FIG. 1 depicts a schematic of a gel material 1 being dried, including a dried aerogel material portion 4 and a pore fluid 2 located throughout the portion of the gel material 1 not yet dried 2. The pore fluid 2 is removed from the gel and carried away by flow or vacuum 3. As pore fluid is removed, the frozen pore fluid front 5 recedes into the gel exposing more of the porous structure. The frozen pore fluid front 5 recedes until the frozen pore fluid is removed, leaving the aerogel material 4 behind.

In some embodiments, the frozen pore fluid comprises carbon dioxide and is sublimated by exposure to the atmosphere. In some embodiments, the frozen pore fluid comprises an organic solvent and is sublimated by exposure to the atmosphere. In some embodiments, the frozen pore fluid comprises an organic solvent and is sublimated by exposure to dry gas. It is advantageous, according to certain embodiments, to sublimate the frozen pore fluid under ambient atmospheric pressure, however frozen pore fluid may also be sublimated under vacuum in some embodiments. In some embodiments, the frozen pore fluid comprises an organic solvent and is sublimated under a vacuum. In further embodiments, the vacuum is less than about 100 torr, less than about 10 torr, less than about 1 torr, less than about 0.1 torr, less than about $1 \times 10^{-2}$ torr, less than about $1 \times 10^{-3}$ torr, less than about $1 \times 10^{-4}$ torr, less than about $1 \times 10^{-5}$ torr, less than about $1 \times 10^{-6}$ torr, or any other appropriate pressure.

Figure 2:
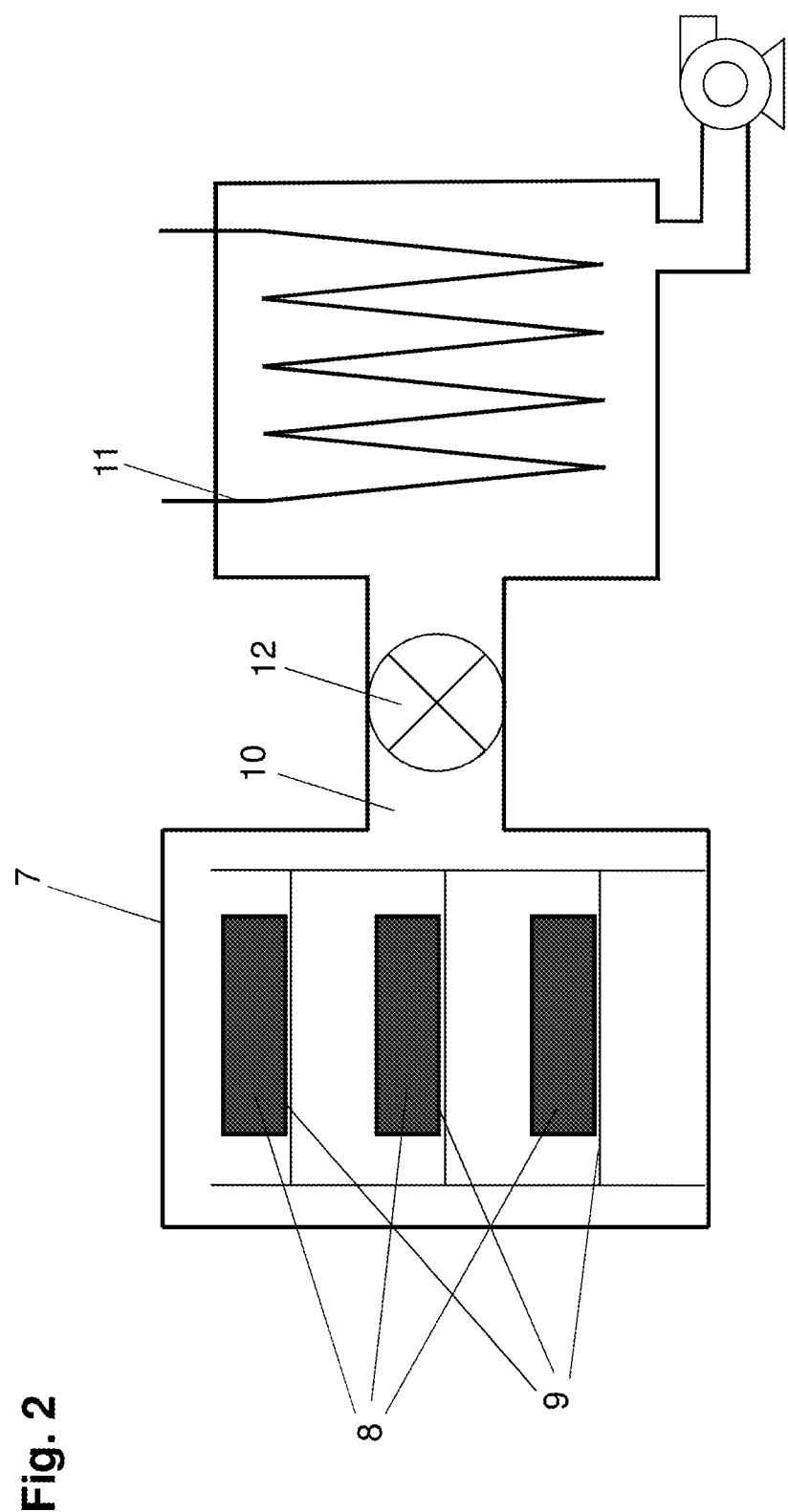
FIG. 2 depicts a schematic of a system for drying gels in accordance with some embodiments.

FIG. 2 depicts a system for removing pore fluid from a gel using vacuum comprising a vacuum chamber 7 with gels 8 supported by shelves 9, a large aperture connection 10 to a cold trap 11 cooled by a refrigerant such as liquid nitrogen, etc., and a butterfly or gate valve 12 allowing isolation of gels from the cold trap. In some embodiments, the frozen pore fluid is sublimated at atmospheric pressure. In further embodiments, a flow of gas is provided to assist sublimating of the solvent.

Figure 3:
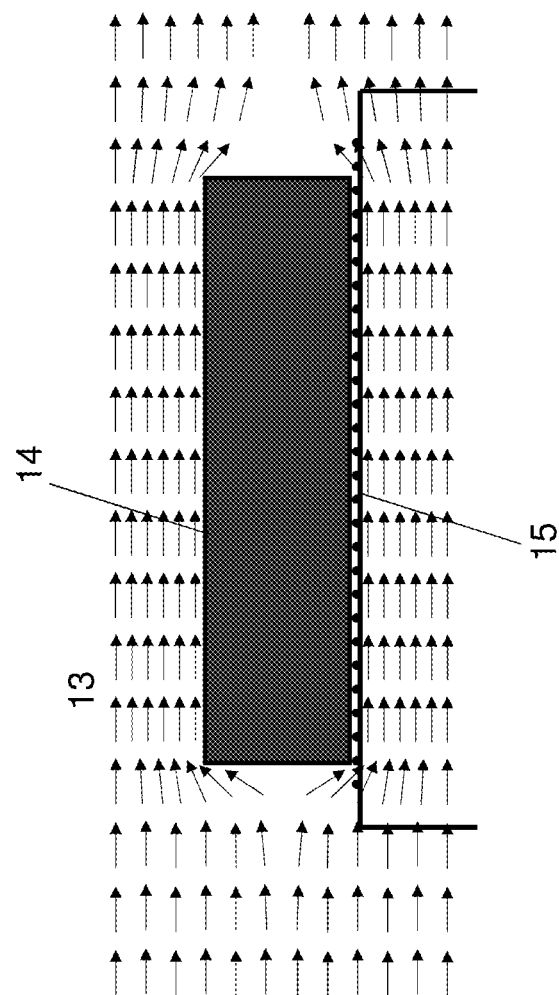
FIG. 3 depicts a gas flowing around a gel in accordance with some embodiments.

FIG. 3 depicts a flow of gas 13 flowing around a gel 14 on a porous platform 15 that thermally isolates the gel with respect to conduction. In some embodiments, the gas comprises helium, nitrogen, argon, and/or carbon dioxide. In some embodiments, the gas comprises an inert gas. In some of these embodiments, the inert gas comprises helium, nitrogen, argon, and/or carbon dioxide. In some embodiments, the inert gas comprises a noble gas.

Figure 4:
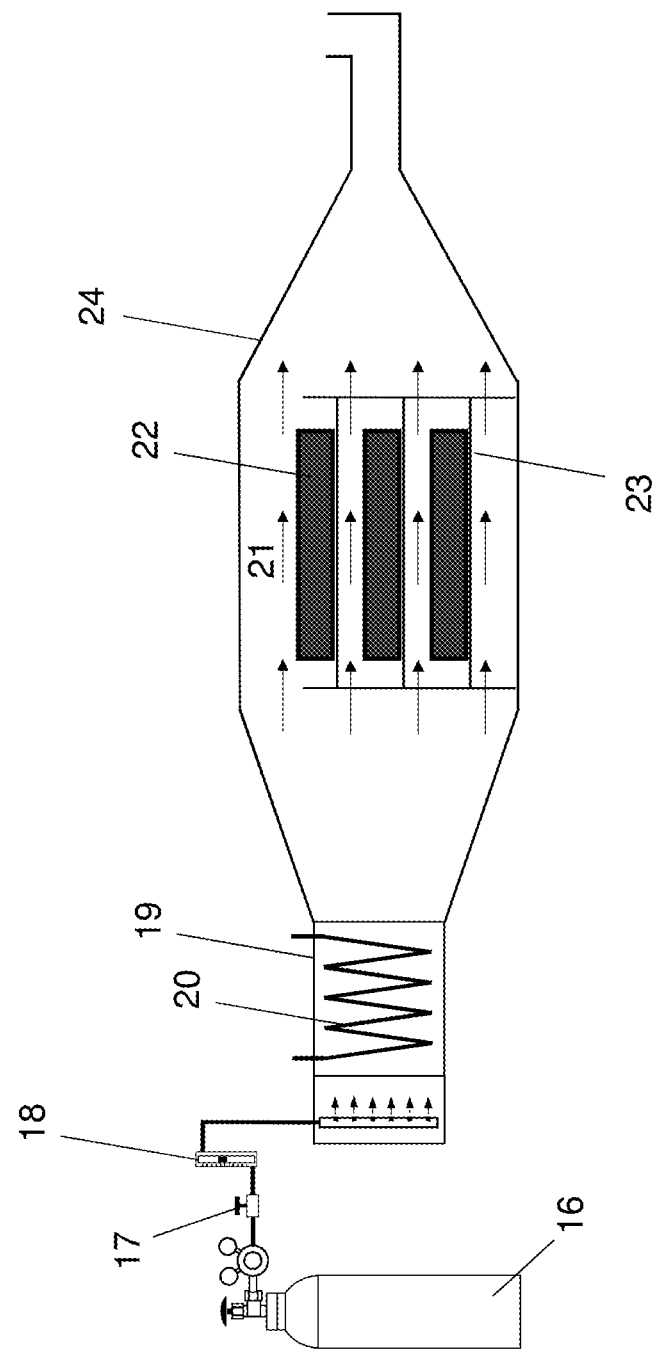
FIG. 4 depicts a schematic of a system for drying gels in accordance with some embodiments.

FIG. 4 depicts a system for removing frozen pore fluid from a gel using a gas comprising a regulated high pressure gas bottle 16 supplying a flow of gas, the flow rate measured and set using a needle valve 17 and rotameter or mass flow controller 18, respectively, distributed through a manifold into a chamber 19 before passing through a liquid-cooled finned heat exchanger 20, the cooled gas then flowing over and around 21 frozen gels 22 on a rack 23 that allows gas to flow over all sides of the gels and thermally isolates the gels from the walls of the drying chamber 24. In some embodiments, the gas comprises air. In further embodiments, the air is dry. In some embodiments, the air is dried with a desiccant. In other embodiments, the air is dried by mechanical methods known in the art. In other embodiments, a supply of dry air is provided.

Figure 5:
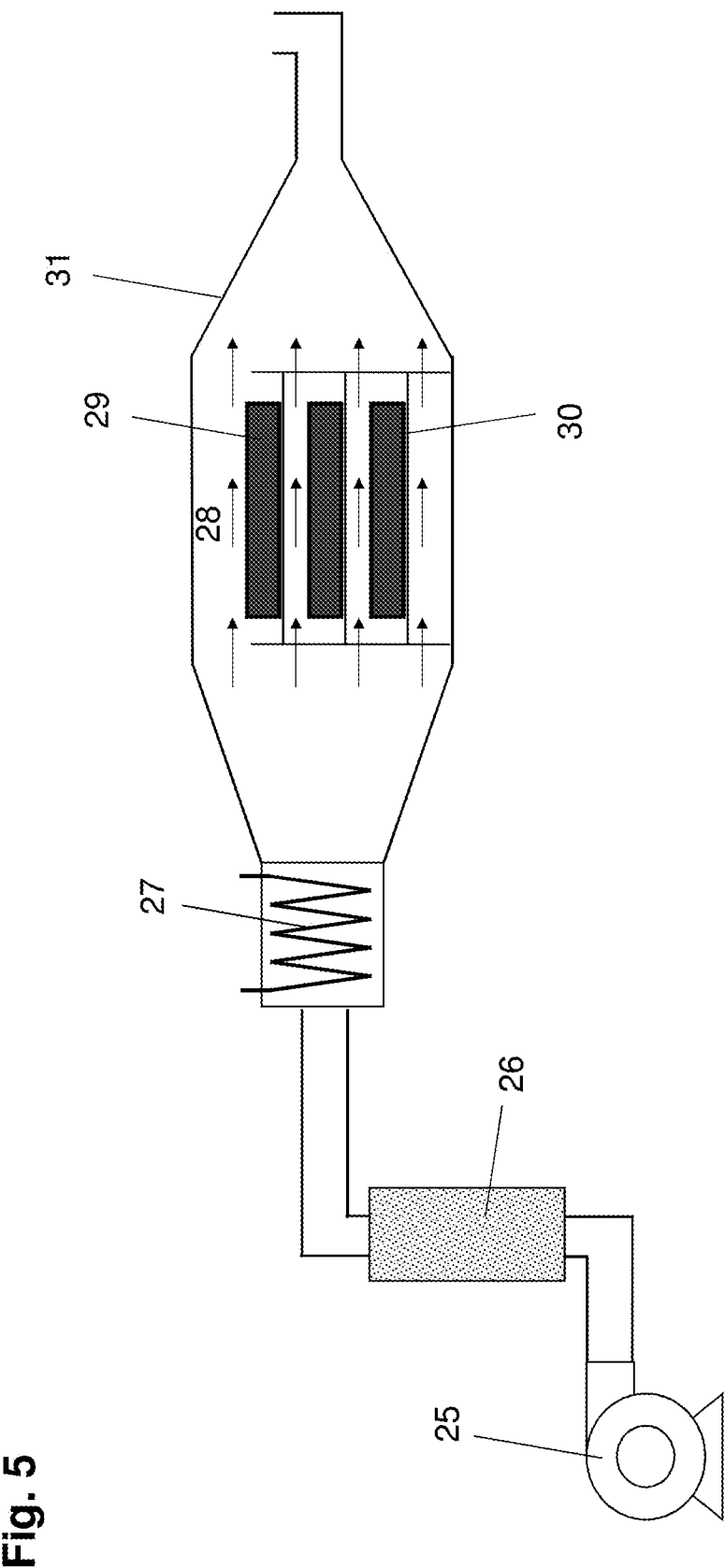
FIG. 5 depicts a schematic of a system for drying gels in accordance with some embodiments.

FIG. 5 depicts a system for removing pore fluid from a gel using air comprising a variable speed blower 25 that pushes ambient air through an inline desiccator 26 and a heat exchanger 27 to dehumidify and then cool the air to the desired process temperature, the cooled, dried air then flowing over and around 28 frozen gels 29 on a rack 30 that allows air to flow over all sides of the gels and thermally isolates them from the walls of the drying chamber 31.

In some embodiments, a gas is flowed over surfaces of the gel. In some embodiments, the gas comprises air. In further embodiments, the air is dry. In some embodiments, the air is dried with a desiccant. In other embodiments, the air is dried by mechanical methods known in the art. In other embodiments, a supply of dry air is provided.

In some embodiments, the flow rate of the gas is at least 10, at least 100, at least 1000, or at least 10000 standard liters per minute (SLM) per square meter of exposed gel envelope surface area. In some embodiments, the frozen pore fluid is removed at a rate of at least 10, at least 50, at least 100, at least 150, at least 200, at least 500, or at least 1000 grams per hour per square meter of exposed gel envelope surface area. In some embodiments, the rate at which frozen pore fluid is removed from the gel is independent of the length and width of the gel. In some embodiments, the rate at which frozen pore fluid is removed from the gel is a function of the gel thickness.

During freeze drying (e.g., atmospheric pressure sublimation drying of an organic solvent) the transport of solvent vapor from the solid-vapor interface to the exterior surfaces of the gel may be driven by a vapor pressure gradient. A vapor pressure gradient may include two points in space in which a concentration or pressure of solvent vapor exists at one point and a concentration or pressure of solvent vapor lower than the concentration or pressure at the first point, including zero pressure, exists at the second point. It may therefore be desirable to ensure that solvent vapor, once it reaches the surface, is quickly removed to enable efficient drying. This may be achieved by continuously flowing dry, inert gas free of solvent vapor over the surfaces of the gel. In some embodiments, a gel may be dried in a chamber. The drying rate, e.g., the rate at which frozen solvent is removed from the pores of the gel, may be improved by use of fans that circulate gas and vapor throughout the chamber, either by impinging on the gel or blowing across it. This can ensure that vapor is quickly removed from the exterior surfaces of the gel and that gas and vapor within the drying chamber is well mixed, thus reducing (e.g., minimizing) the convective mass transfer resistance at the surfaces of the gel. The flow rate of inert gas may only need to be high enough to keep the average vapor concentration in the chamber from increasing. In some embodiments, the use of mixing fans has been shown to promote more spatially uniform drying across the surfaces of a gel, e.g., a gel part with one or more dimensions greater than about 30 cm.

Figure 6:
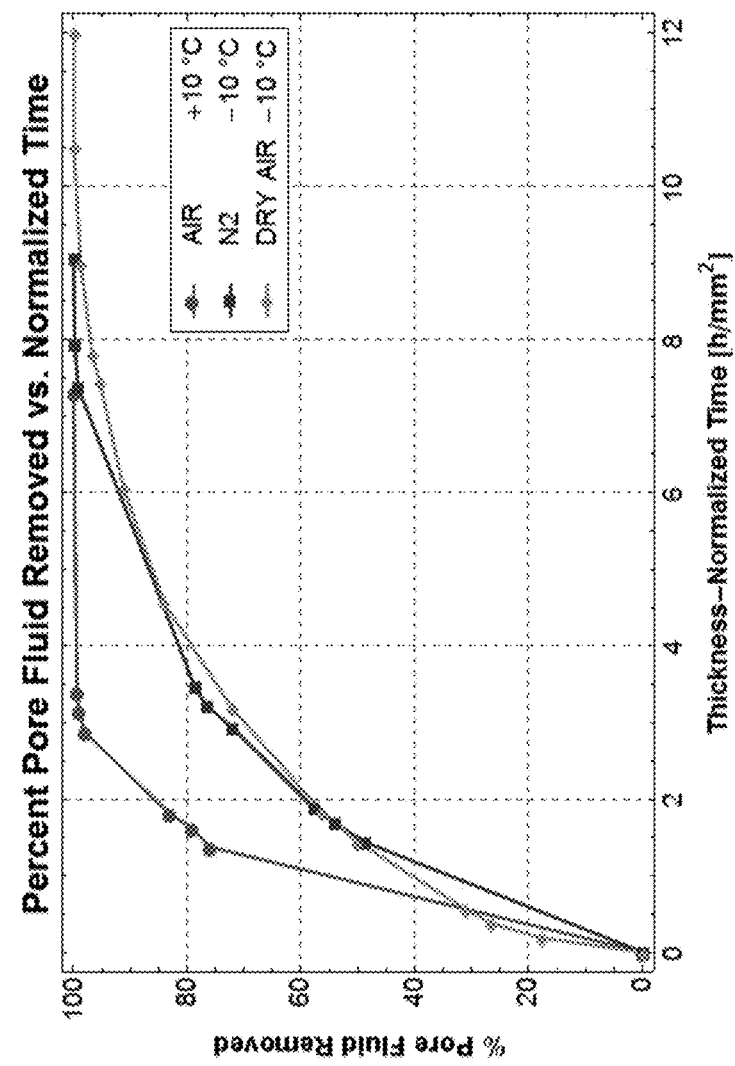
FIG. 6 is a graph showing percent of pore fluid removed from a gel as a function of gel-thickness-normalized time in accordance with some embodiments.

FIG. 6 depicts a graph showing the percent of pore fluid removed from a gel as a function of thickness normalized time in h divided by thickness squared. In some embodiments, the temperature of the gas is within about 1° C., within about 2° C., within about 5° C., within about 10° C., within about 20° C., within about 30° C., within about 40° C., within about 50° C., within about 60° C., or another appropriate amount, of the freezing point of the bulk form of the frozen pore fluid. In some embodiments, the gel is substantially thermally isolated with respect to conduction, e.g., conductive transport. In some embodiments, less than about 50%, less than about 10%, or less than about 1% of the heat that would be transferred to the gel via conduction if it were in direct contact with walls of the surrounding chamber is transferred to the gel via conduction. In some embodiments, the gel is substantially thermally isolated with respect to radiation, e.g., radiative transport. In some embodiments, the gel may be shielded from light and/or heat that enters the surrounding chamber by an opaque foil, layer, material, shield, or coating. In some embodiments, the gel receives less than about 1 W/cc, less than about 0.1 W/cc, less than about 0.01 W/cc, less than about 0.001 W/cc, less than about 0.001 W/cc, or less heat from radiation. In some embodiments, the pore fluid is removed.

In some preferred embodiments, the temperature of the gel material is changed during the drying process. In some embodiments, pore fluid in the larger pores of the gel is frozen first. In some embodiments, this frozen pore fluid is then sublimated. In some embodiments, remaining unfrozen pore fluid in smaller pores of the gel is frozen second. In some embodiments, this frozen pore fluid is then sublimated. In some embodiments, an amount of frozen pore fluid greater than about 50%, greater than about 90%, greater than about 95%, greater than about 99%, or more of the volume of mesopores and macropores in the gel is removed in the first step. In some embodiments, an amount of frozen pore fluid greater than about 50%, greater than about 90%, greater than about 95%, greater than about 99%, or more of the remaining volume of frozen pore fluid is removed in the second step.

Figure 7:
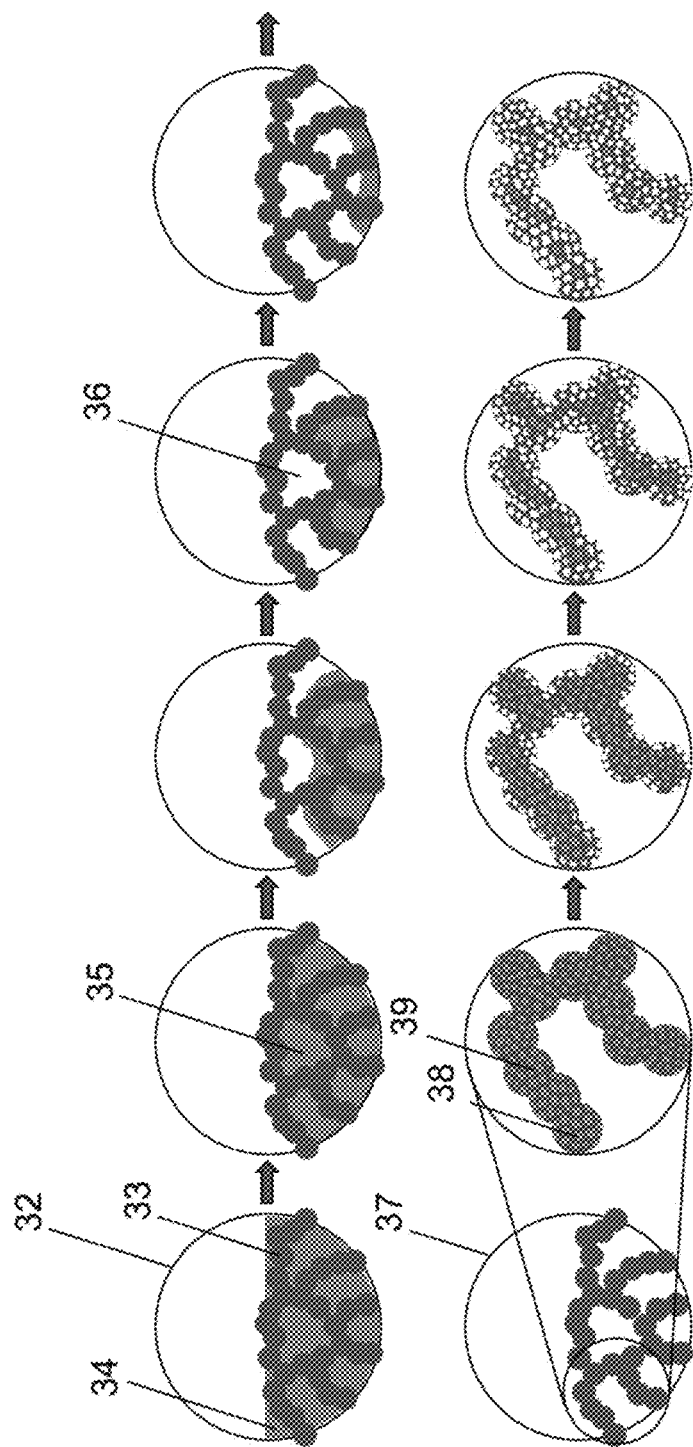
FIG. 7 depicts removal of pore fluid in accordance with some embodiments.

FIG. 7 shows a magnified view of a gel 32 comprising a porous solid network 33 with frozen pore fluid 34 as the frozen fluid is removed by sublimation and the frozen pore fluid front 35 recedes into mesopores 36 until it is substantially removed from the mesopores 37 at which point remaining pore fluid 38 is present in micropores 39 of the solid network which is then frozen and sublimated.

In some embodiments, the temperature of the gel is adjusted during the drying process. In some embodiments, the temperature of the gel is adjusted by changing the temperature of a gas flowing around the gel. In some embodiments, the pore fluid in the gel is frozen by changing the pressure around the gel. In some embodiments, the temperature of the gel is lowered during the drying process. In some embodiments, pore fluid is sublimated at a temperature within about 10° C. of the unconfined freezing point of the pore fluid. In some embodiments, pore fluid is sublimated at a temperature within about 50° C. of the unconfined freezing point of the pore fluid. In some embodiments, pore fluid is sublimated a temperature within about 100° C. of the unconfined freezing point of the pore fluid. In some embodiments, pore fluid is first removed at one temperature and then additional pore fluid is removed at a second temperature. In some embodiments, the pore fluid is first removed at a temperature within about 10° C. below the unconfined freezing point of the pore fluid and then removed at a lower temperature within about 60° C. below the unconfined freezing point of the pore fluid.

Figure 8:
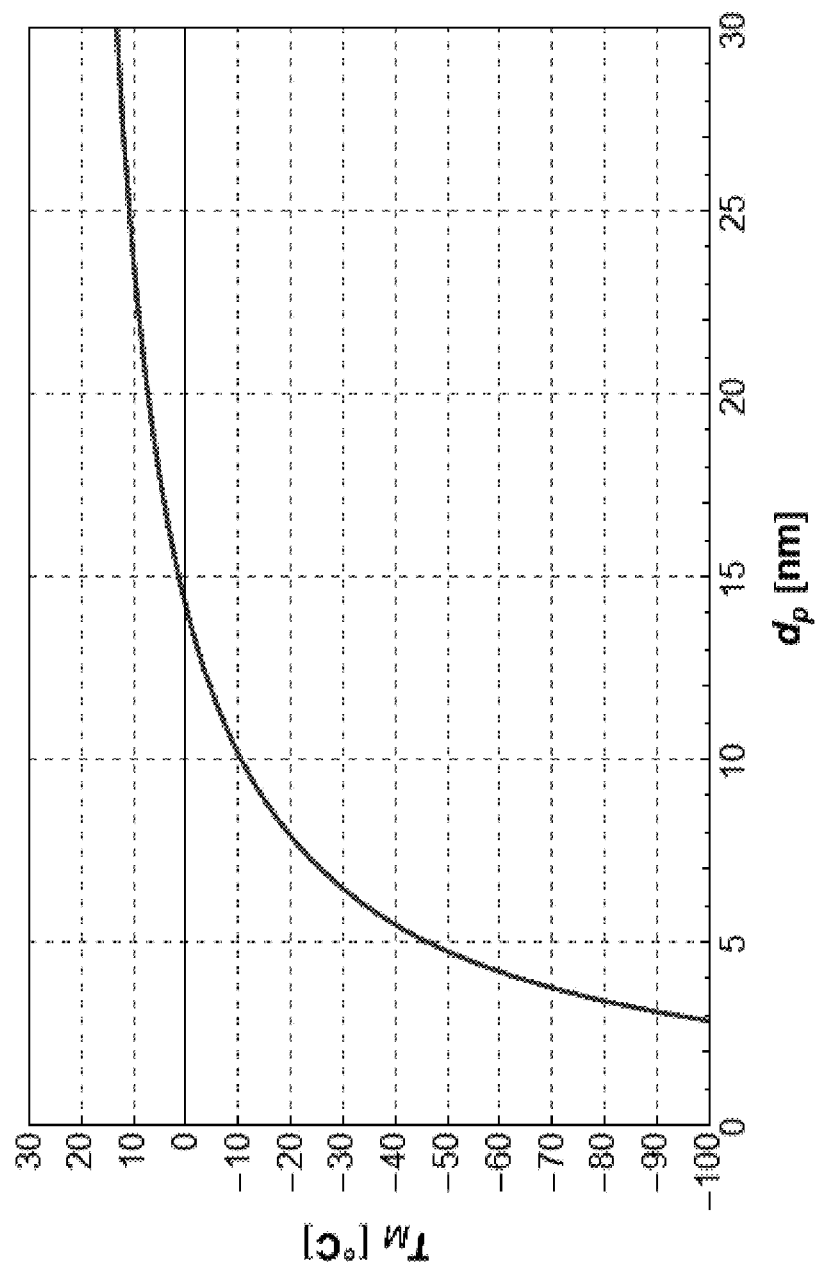
FIG. 8 is a graph showing the melting temperature of tert-butanol as a function of the diameter of the pore in which it is confined as predicted by the Gibbs-Thomson effect in accordance with some embodiments.

FIG. 8 is a graph that depicts an example of freezing point of tert-butanol in a confined pore as a function of pore width in accordance with some embodiments. The freezing point of the solvent in this example is depressed due to the Gibbs-Thompson effect. However, in some embodiments, the freezing point depression of a solvent in the pore of a gel may be different due to a number of factors including solvent purity, pore geometry, and other factors.

Figure 9:
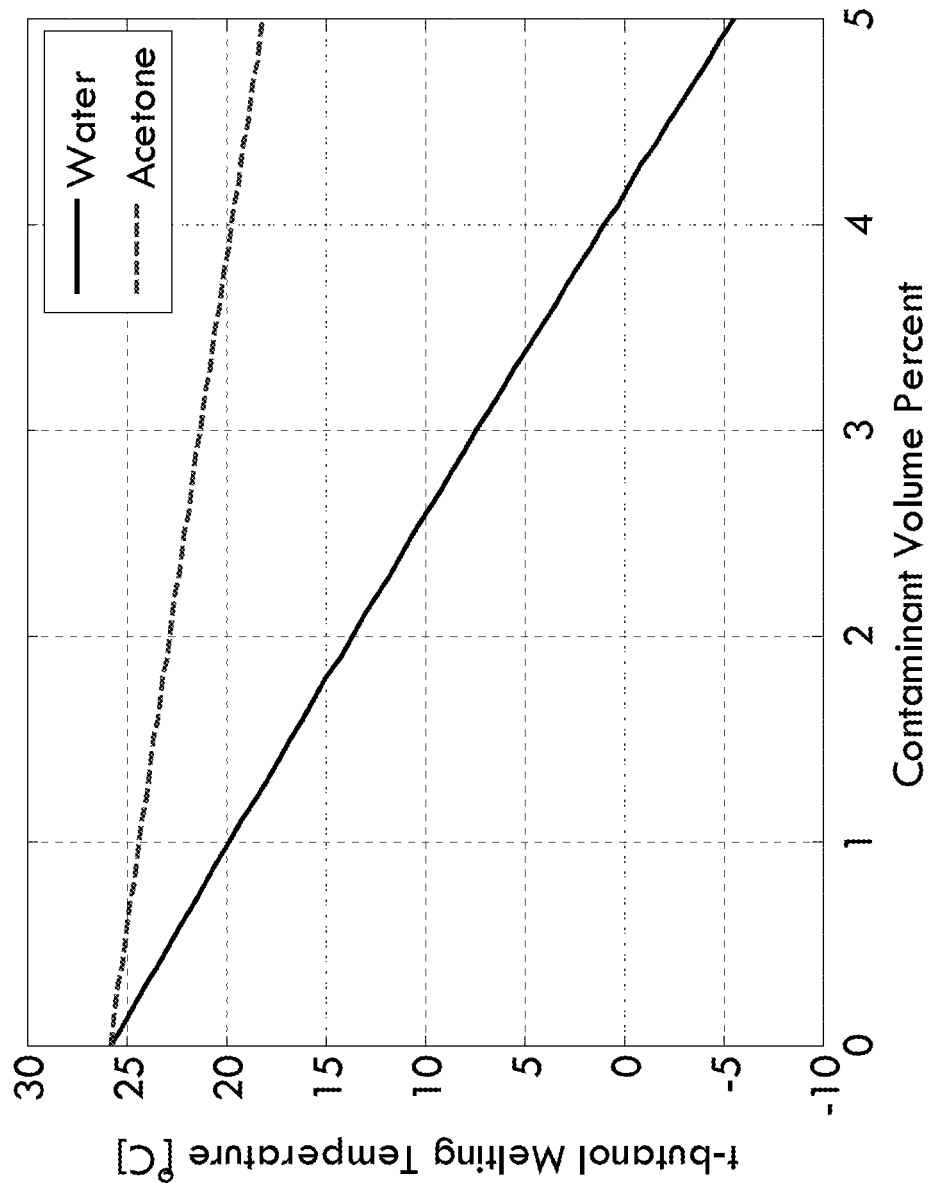
FIG. 9 is a graph showing the melting point of tert-butanol containing a contaminant solute of acetone or water as a function of contaminant volume percent in accordance with some embodiments.

FIG. 9 is a graph that depicts an example of how the melting point of bulk tert-butanol that contains acetone or water impurities changes as a function of percent impurity in accordance with some embodiments. However, in some embodiments, the melting point of tert-butanol or other solvent as a function of impurity concentration may differ due to a number of factors including dissolved gases, temperature, pressure, and other factors, and the melting point of tert-butanol or other solvent may differ from that the melting point of the bulk solvent in a gel due to a number of factors, including pore size, pore geometry, and other factors.

Figure 10:
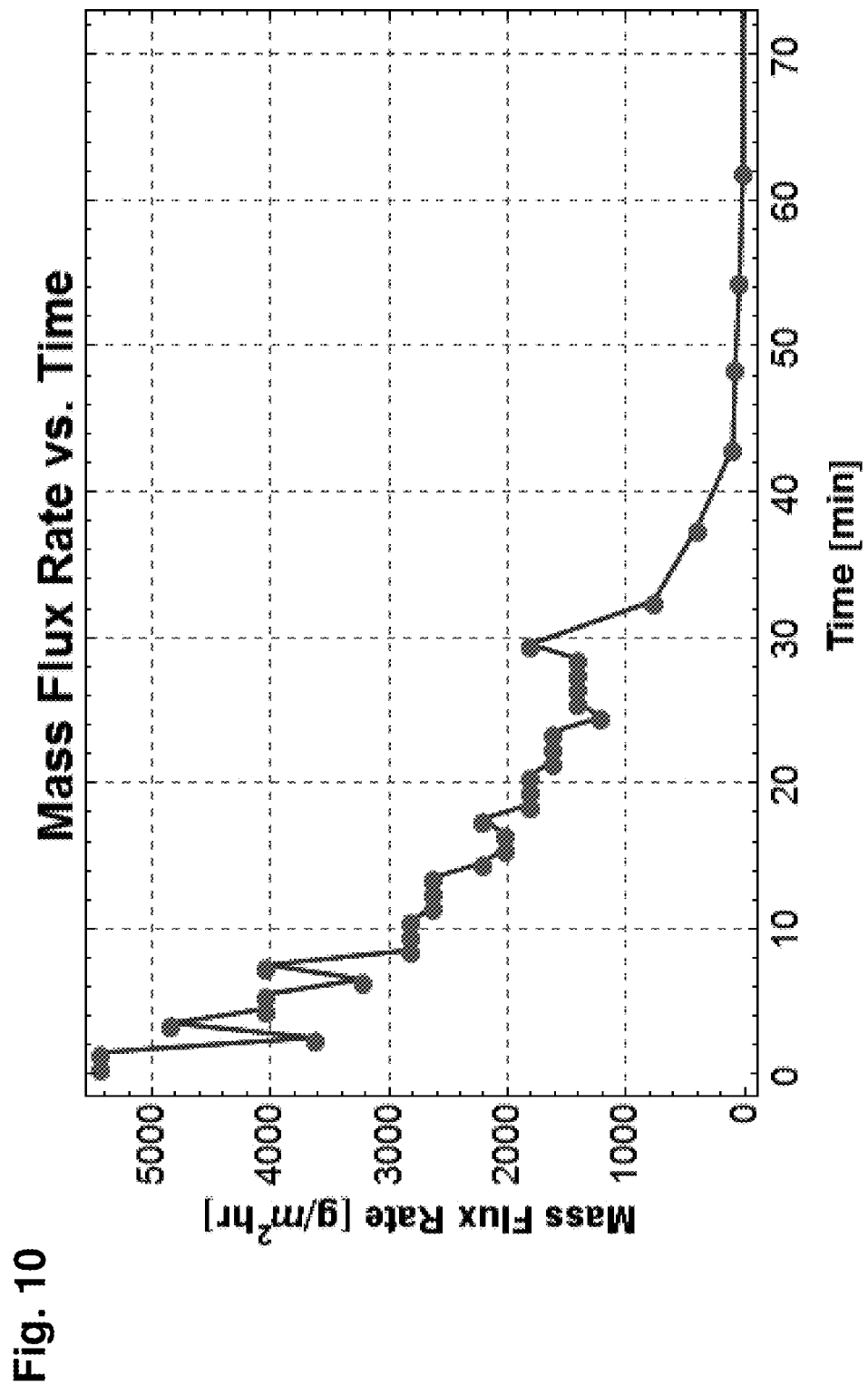
FIG. 10 is a graph showing the mass flux as a function of time during sublimation drying from carbon dioxide at atmospheric pressure in accordance with some embodiments.

FIG. 10 is a graph that depicts an example of mass flux of frozen carbon dioxide removed from a polyurea gel as a function of time as it is sublimated at atmospheric pressure in accordance with some embodiments. In this example, the frozen pore fluid of a polyurea gel with dimensions of about 2"×3"×0.4" is substantially removed within 70 min of the beginning of sublimation.

Figure 11:
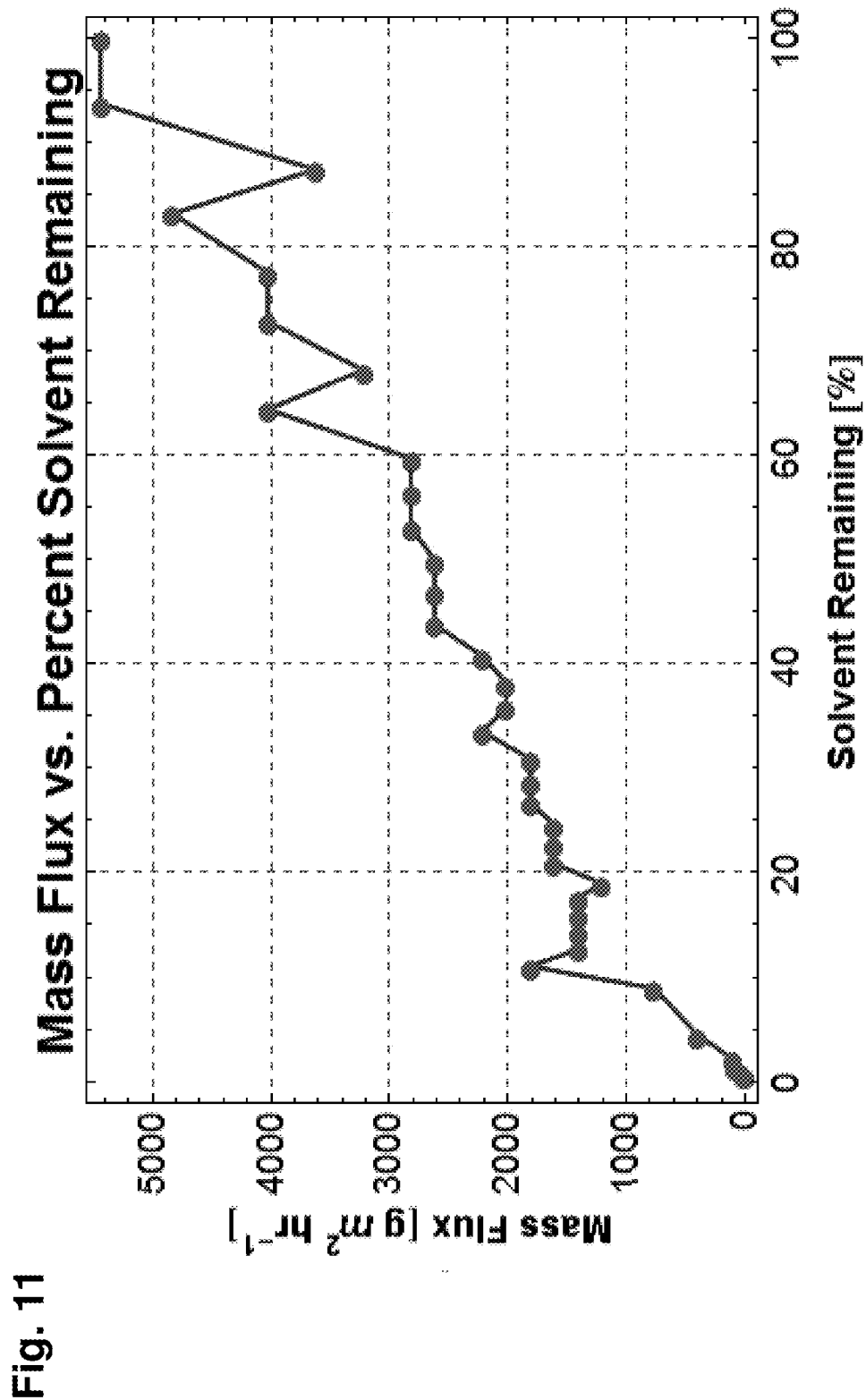
FIG. 11 is a graph showing the mass flux as a function of percent mass remaining in the gel during sublimation drying from carbon dioxide at atmospheric pressure in accordance with some embodiments.

FIG. 11 is a graph that depicts an example of mass flux as a function of percent mass remaining in the gel during sublimation drying from carbon dioxide at atmospheric pressure in accordance with some embodiments. In this example, the rate at which the frozen pore fluid of a polyurea gel with dimensions of about 2"×3"×0.4" decreases as the frozen pore fluid is removed.

Figure 12:
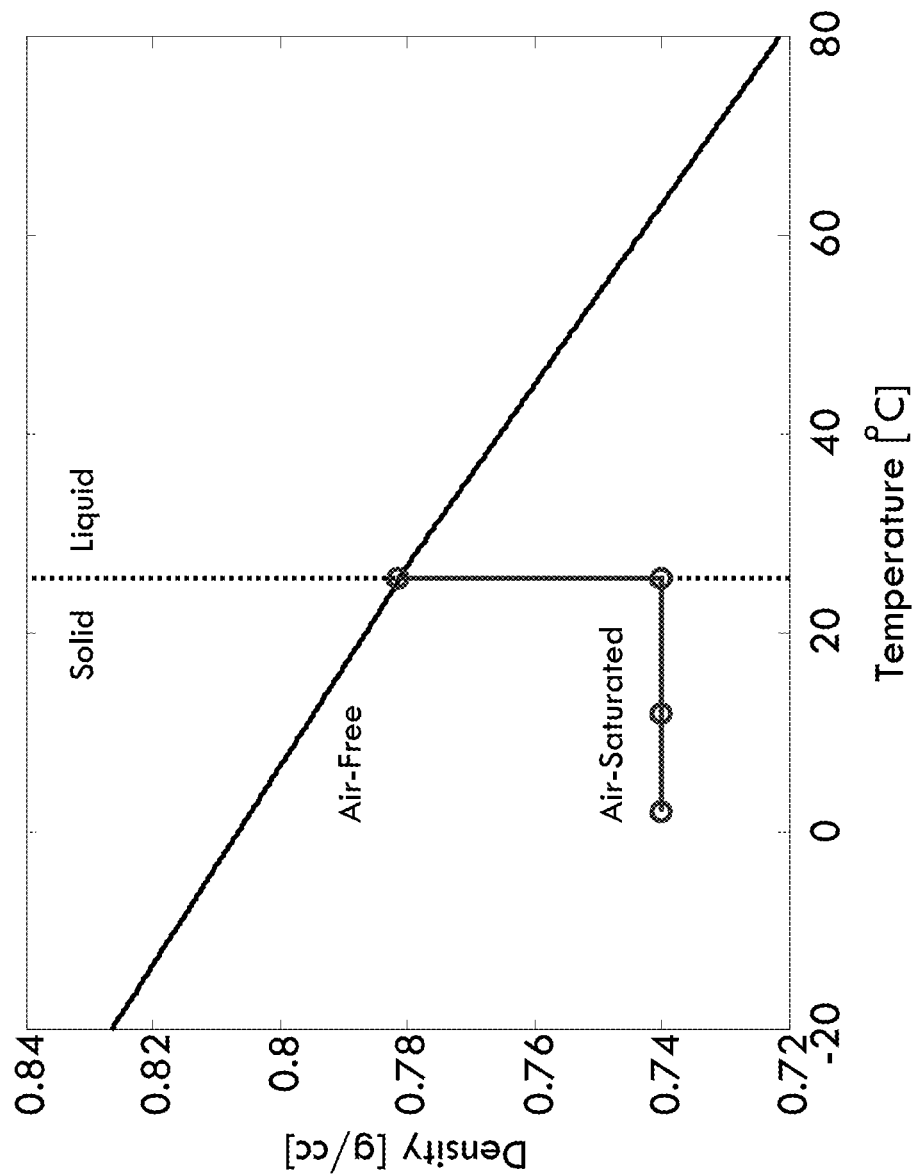
FIG. 12 is a graph showing the density of tert-butanol vs. temperature which illustrates the discontinuity in density which occurs during freezing of non-degassed, air-saturated tert-butanol in contrast to the continuous density change which degassed, air-free tert-butanol undergoes during freezing in accordance with some embodiments.

FIG. 12 is a graph that depicts the bulk density of bulk tert-butanol vs. temperature in accordance with some embodiments and illustrates a discontinuity in the bulk density of the solvent that occurs during freezing of non-degassed, air-saturated tert-butanol contrasted against the otherwise the continuous density change that degassed, air-free tert-butanol undergoes during freezing. A continuous density change across the freezing point may be advantageous as it prevents abrupt volume changes when the solvent in the pores of a gel is frozen, which may cause damage to the pore structure of the gel.

Figure 13:
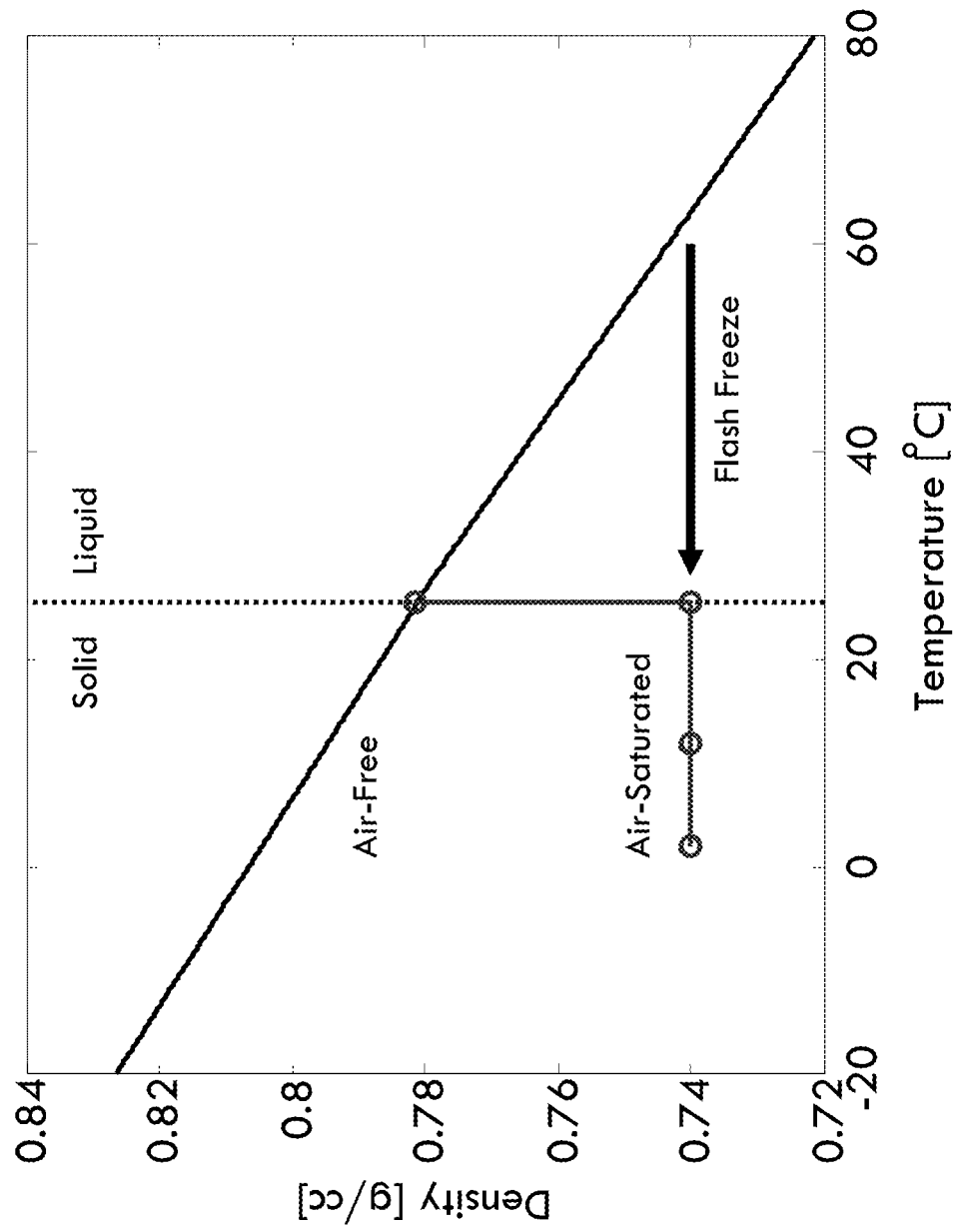
FIG. 13 is a graph depicting the density of tert-butanol vs. temperature which shows that the discontinuity in density undergone by undegassed, air-free tert-butanol as it freezes can be avoided by first heating the solvent to a temperature at which the density is equivalent to that of undegassed, air-free tert-butanol after freezing, then subjecting it to a flash-freezing process in accordance with some embodiments.

FIG. 13 is a graph that depicts the bulk density of tert-butanol vs. temperature in accordance with some embodiments and illustrates that the discontinuity in the bulk density of the solvent that occurs during freezing of non-degassed, air-free tert-butanol as it freezes may be avoided by first heating the solvent to a temperature at which the density is equivalent to that of undegassed, air-free tert-butanol after freezing, then subjecting it to a flash-freezing process. This may be advantageous as it may permit a simplified freeze drying process that does not involve degassing of solvent and/or gels.

Figure 14:
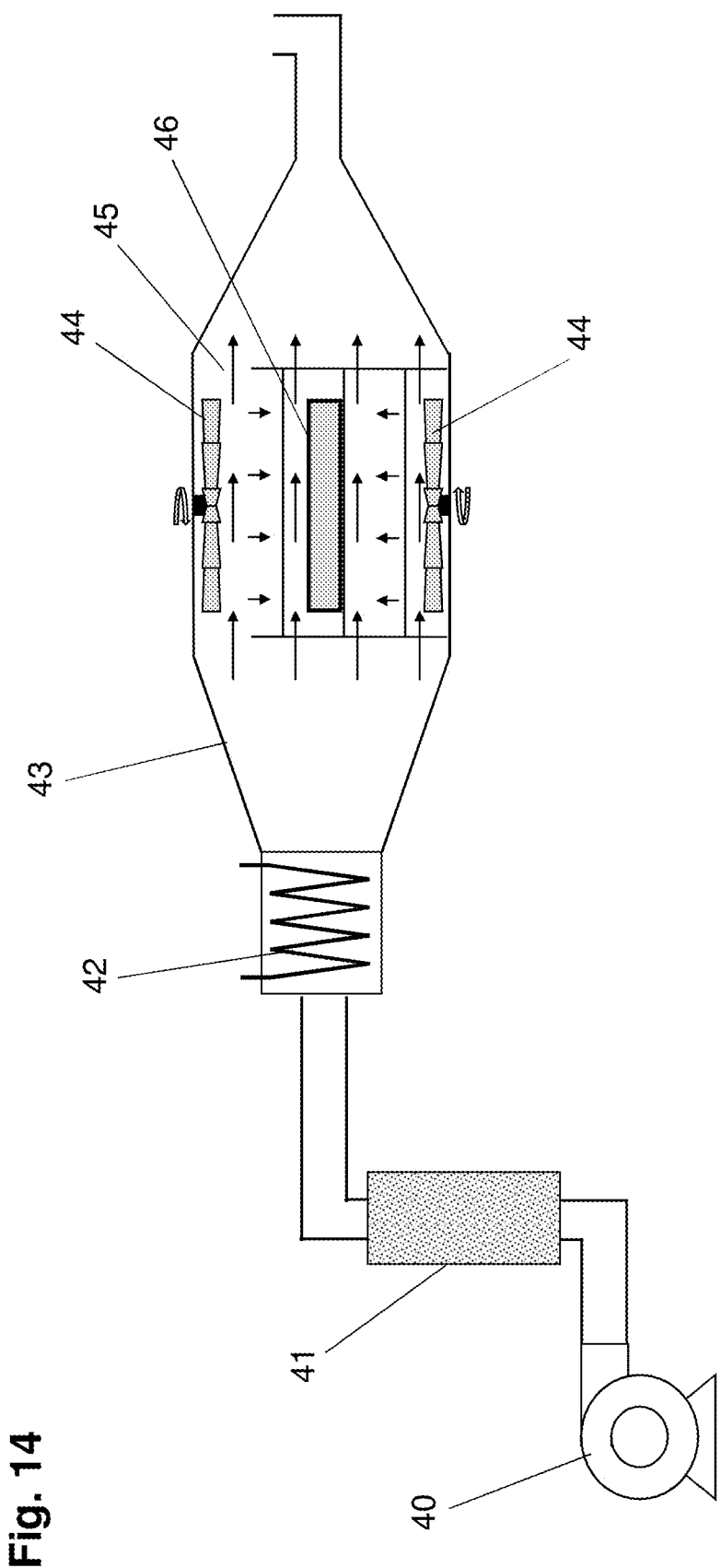
FIG. 14 depicts a schematic of a system for drying gels in accordance with some embodiments.

FIG. 14 depicts a system for drying gels in accordance with some embodiments that is equipped with fans to accelerate drying. A variable speed blower 40 pushes dry air through an inline dessicator 41 and over a condenser to dehumidify and cool the air to the desired process temperature, the cool, dry air 45 then being pushed into a chamber 43, in which fans 44 mix the incoming dry air with sublimating frozen solvent being removed from gel 46.

Figure 15:
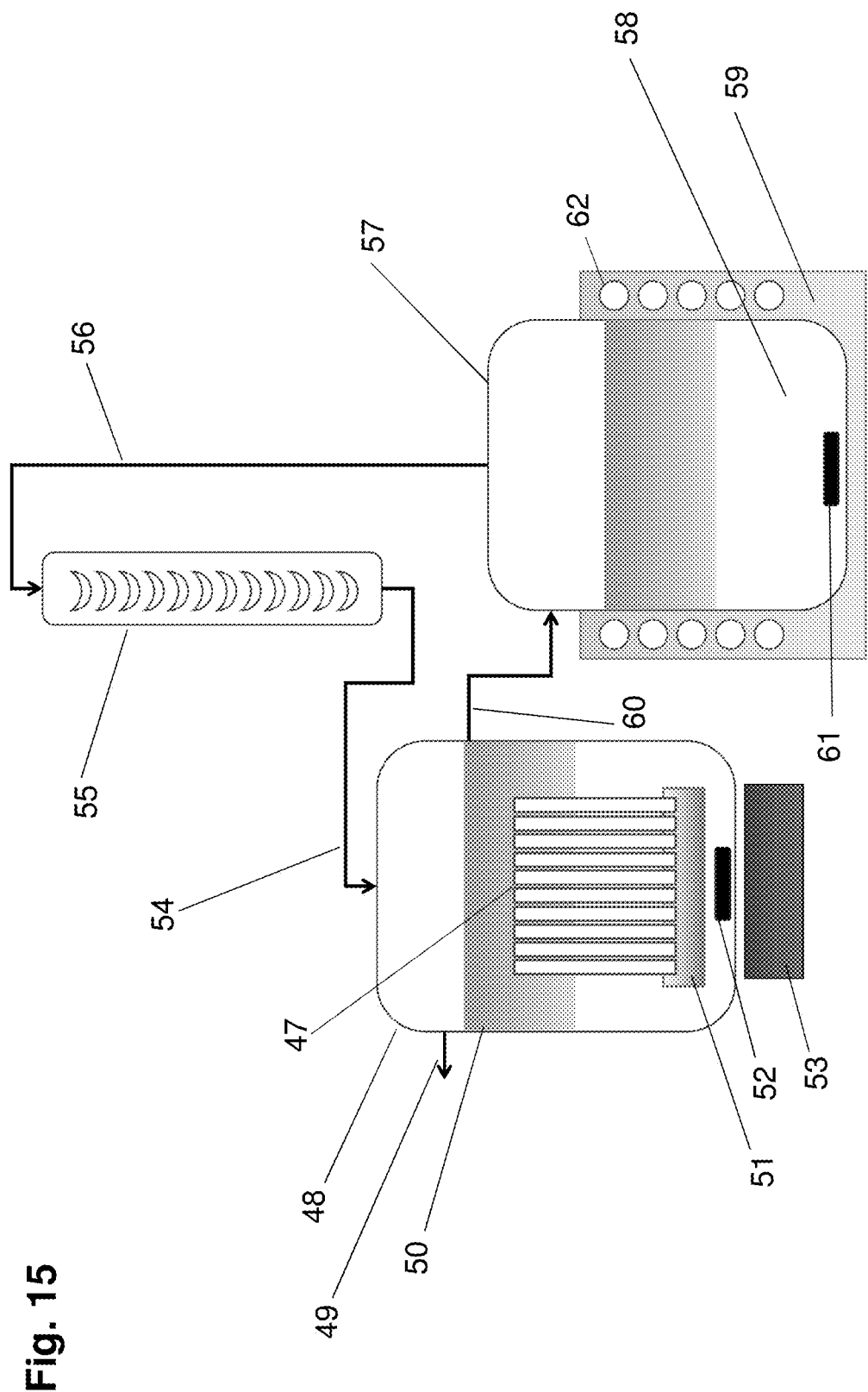
FIG. 15 depicts a schematic of a system for continuously exchanging the solvent of gels in preparation for freeze drying in accordance with some embodiments.

FIG. 15 depicts a system for solvent exchanging the pore fluid in gels in a continuous fashion as opposed to serial soakings in baths in preparation for freeze drying in accordance with some embodiments. Gels 47 containing a solvent that needs to be replaced by a target solvent for freeze drying are mounted on a rack 51 in a sample tank 48 equipped with a pressure release valve 49, which contains a bath of solvent 50 that comprises a mixture of the target solvent (e.g., tert-butanol) and a higher-boiling-point solvent (e.g., N-methylpyrrolidone) that is diffusing out of gels 47. The sample tank 48 has a magnetic impeller 52 driven by a magnetic stir plate 53 to facilitate solvent mixing. The solvent mixture then can drain through a manifold 60 into a distillation tank 57 containing a mixture of solvents 58 including the target solvent and solvent removed from the pores of gels. The distillation tank 57 is heated by a heating element 62 and insulated by thermal insulation 59, and equipped with an impeller 61 to facilitate mixing of the solvent mixture 58. The solvent may then be heated to distill the target solvent from the solvent removed from the pores of the gel. The target solvent vapor then travels through manifold 58 into a condenser (e.g., a water-cooled condenser) 55, which condenses purified liquid target solvent that travels through a manifold 54 back into the sample tank 48. As this process continues, the concentration of the target solvent in the sample tank 48 increases and the concentration of the higher-boiling-point solvent diffusing out of the gels 47 decreases, until the pore fluid in the gels 47 in sample tank 48 comprises a suitable level of purity of the target solvent.

As noted above, for various embodiments, holes or channels are present in the gel. In some embodiments, these holes or channels are spaced at approximately regular intervals. In some embodiments, the diameter of the holes or channels is greater than about 0.1 mm. In some embodiments, the presence of holes or channels may result in faster removal of solvent from the gel than would otherwise be the case without the holes or channels.

It can be particularly advantageous to form large, monolithic aerogels according to certain embodiments of the present disclosure as described in more detail above, however in some embodiments chunks, granules, aggregates, particles, and other non-monolithic forms of aerogel may be produced. In some embodiments, the gel is provided in the form of chunks, granules, aggregates, or particles. In some of these embodiments, drying of these gel chunks, granules, or particles results in aerogel particles. In some embodiments, the gel particles may be dried faster than gel monoliths. In some preferred embodiments, the gel particles comprise silica. In some of these embodiments, the resulting aerogel particles have a thermal conductivity lower than approximately 20 mW/m-K. In some embodiments, the resulting aerogel particles are transparent. In some embodiments, the resulting aerogel particles are hydrophobic.

While sublimation has been described as a primary mechanism for pore fluid removal, it should be understood that sublimation can be supplemented by evaporation, in certain embodiments. Thus, various of the embodiments described herein do not necessarily involve removing all or a large percentage of the solvent via sublimation, although such removal can often be advantageous, as described elsewhere herein.

In some preferred embodiments, an aerogel may be produced having at least one dimension (e.g., thickness, length, width, etc.) greater than 1 cm, greater than 10 cm, greater than 30 cm, greater than 100 cm, greater than 2 m, greater than 5 m, or greater than 10 m. In some preferred embodiments, an aerogel with at least two dimensions greater than 1 cm, greater than 10 cm, greater than 30 cm, greater than 100 cm, greater than 2 m, greater than 5 m, or greater than 10 m may be produced. In some preferred embodiments, an aerogel with a thickness, e.g., height, of greater than 1 mm, greater than 5 mm, greater than 1 cm, greater than 2 cm, greater than 5 cm, greater than 10 cm may be produced.

In some preferred embodiments, the frozen pore fluid from the gel is recaptured after it is removed, optionally purified, and used again to prepare another gel for freeze drying. In some embodiments, more than 10%, more than 20%, more than 30%, more than 40%, more than 50%, more than 60%, more than 70%, more than 80%, more than 90%, more than 95%, more than 99% of the frozen pore fluid is recaptured and recycled.

In some embodiments, a gel for producing an aerogel is made according to methods known in the art. In some embodiments, the gel is an organic gel and/or an organic polymer gel. In some embodiments, the gel is an inorganic gel and/or an inorganic polymer gel. In some embodiments, the gel is a hybrid organic/inorganic gel. In some preferred embodiments, the gel comprises polyurea, polyisocyanurate, polyisocyanate, polyurethane, polyimide, polyamide, polymer-reinforced oxide, silica, silica-polysaccharide hybrid. In some embodiments, holes or channels are present in the gel. These holes or channels may facilitate diffusion of pore fluid out of the gel. In some embodiments, these channels are less than approximately 1 mm in width (e.g., diameter). In some embodiments, these channels are greater than approximately 1 mm in width. In some embodiments, these channels extend through the thickness of the gel. In some embodiments, these channels are spaced approximately every 0.1 cm, 0.5 cm, 1 cm, 2 cm, 5 cm, 10 cm apart over the area of the gel. In some embodiments, the pore fluid provided throughout the gel may be exchanged for a solvent, such as tert-butanol. In some of these embodiments, the pore fluid (e.g., tert-butanol, other solvent) of the gel contains less than 0.05 v/v % impurities. Impurities may include solubilized substances other than the primary solvent, for example, quantities of other solvents from prior solvent exchanges, leftover catalyst, water, metal ions, or other impurities.

In some embodiments, the temperature of the gel is decreased to a temperature within about 10 degrees C. below the freezing point of the pore fluid, that is, the temperature at which the pore fluid freezes when left unconfined. In some of these embodiments, at this temperature, a portion of the pore fluid in the gel freezes. For example, the majority of the pore fluid in the macropores and mesopores of the material may freeze at this temperature. Though, in some cases, pore fluid located within very small interstices (e.g., micropores) of the gel may remain in a liquid state, despite the low temperature.

The frozen pore fluid may then be allowed to sublimate at approximately atmospheric pressure. In some cases, this sublimation of pore fluid from a solid state occurs, without substantial evaporation, or any evaporation at all, of pore fluid in a liquid state. In some embodiments, a flow of dry gas is provided around the gel (having frozen pore fluid located throughout) to aid in removal of the frozen pore fluid as it sublimates from the gel, thereby minimizing local vapor pressure of pore fluid in the atmosphere around the gel. In some instances, most of the frozen pore fluid is sublimated. In some embodiments, the amount of frozen pore fluid sublimated is at least about 50%, at least about 70%, at least about 90%, at least about 95%, at least about 99%, or more.

In preferred embodiments, the amount of frozen pore fluid sublimated is at least about 99%.

Though, for some embodiments, a portion of the pore fluid in the gel continues to remain in a liquid state. Such liquid pore fluid may be present within micropores of the gel. In some embodiments, this pore fluid exhibits freezing point depression relative to the pore fluid in the mesopores and/or macropores. That is, the pore fluid located within micropores of the gel may require exposure to an even lower temperature in order to solidify. In some preferred embodiments, this pore fluid is frozen to a solid state by cooling the gel to a lower temperature, for example, within about 50 degrees C. below the freezing point of the pore fluid, or the temperature at which the pore fluid freezes when left unconfined. In some preferred embodiments, this pore fluid is frozen to a solid state by cooling the gel to a temperature that is within about 60 degrees C. below the freezing point of the pore fluid, or the temperature at which the pore fluid freezes when left unconfined. That is, by lowering the temperature sufficiently further, the remaining pore fluid located within small interstices (e.g., micropores) of the gel may be frozen to a solid state. Hence, this remaining portion of frozen pore fluid may then sublimated. In some preferred embodiments, most of the pore fluid in the gel is frozen and sublimated. In some preferred embodiments, the gel does not shrink or crack significantly more than if it were supercritically dried.

In some embodiments, the pore fluid removed from a gel is recovered, that is, not vented to atmosphere. In some embodiments, the pore fluid is recovered by condensation and/or freezing. In some embodiments, greater than approximately 10%, greater than approximately 20%, greater than approximately 30%, greater than approximately 40%, greater than approximately 50%, greater than approximately 60%, greater than approximately 70%, greater than approximately 80%, greater than approximately 90%, greater than approximately 95%, greater than approximately 99%, or more of the solvent is recovered. In some embodiments, the recovered solvent is used to prepare a gel and/or aerogel.

In some embodiments, the pore fluid in the gel does not substantially expand or contract as it frozen in preparation for freeze drying. In some preferred embodiments, the pore fluid comprises an organic solvent, e.g., tert-butanol. In some embodiments, the pore fluid is substantially degassed to prevent expansion or contraction of the pore fluid as it is frozen. In some embodiments, the gel is degassed. In some embodiments, the pore fluid in the gel is degassed. In some embodiments, the gel and/or the pore fluid in the gel is/are degassed by placing the gel in a bath of bulk solvent and using the same methods used to degas bulk solvent. In some embodiments, impurities in the pore fluid may cause the pore fluid to expand or contract when the pore fluid is frozen. In some preferred embodiments, the pore fluid is purified to a suitable level such that it does not substantially expand or contract when frozen. In some embodiments, the pore fluid contains impurities of less than about 2 v/v %, less than about 1 v/v %, less than about 0.1 v/v %, less than about 0.05 v/v %, less than about 0.01 v/v %, less than about 0.005 v/v %, less than about 0.001 v/v %. One of ordinary skill in the art would know how to determine the purity of the pore fluid. For example, techniques such as Fourier-transform infrared spectroscopy, gas chromatography, gas chromatography/mass spectrometry, liquid chromatography, and nuclear magnetic resonance spectroscopy may be used.

In some embodiments, gels may be processed through a series of solvent exchanges prior to freeze drying. For example, the pore fluid in a gel may be exchanged for another fluid by soaking the gel in a bath containing the target solvent. The solvent in the bath may diffuse into the pores of the gel, and the pore fluid in the gel may diffuse into the bath. In some embodiments, the gel comprises an organic polymer. In some preferred embodiments, the gel comprises a polyurea, a polyurethane, a polyisocyanate, a polyimide, and/or a polyamide. In some preferred embodiments, the pore fluid in the gel comprises N-methylpyrrolidone, N,N'-dimethylformamide, and/or dimethylacetamide. In some preferred embodiments, the pore fluid in the gel is exchanged with water. In some preferred embodiments, the water in the pores of the gel is exchanged with an organic solvent. In some embodiments, the organic solvent in the pores of the gel is exchanged with another organic solvent. In some embodiments, the organic solvent is frozen. In some embodiments, the frozen organic solvent is removed by freeze drying. In some embodiments, greater than about 50%, greater than about 60%, greater than about 70%, greater than about 80%, greater than about 90%, greater than about 99%, or more of the frozen organic solvent is removed. In some preferred embodiments, greater than about 99% of the frozen organic solvent is removed. As an example, a polyimide gel containing N-methylpyrrolidone in its pores may be exchanged into water, then acetone, then methanol, then tert-butanol prior to freeze drying. As another example, a polyimide gel containing N-methylpyrrolidone in its pores may be exchanged into water then tert-butanol prior to freeze drying. As an additional example, a polyimide gel containing N,N'-dimethylformamide in its pores may be exchanged into water, then acetone, then methanol, then tert-butanol prior to freeze drying. As yet another example, a polyimide gel containing N,N'-dimethylformamide in its pores may be exchanged into water then tert-butanol prior to freeze drying.

In some preferred embodiments, the solvent in the pores of the gel may be miscible with other organic solvents, such as methanol, ethanol, propanol, isopropanol, butanol, sec-butanol, tert-butanol, pentanol, neopentanol, amyl alcohol, acetone, methyl ethyl ketone, acetonitrile, N-methylpyrrolidone, dimethylacetamide, N,N'-dimethylformamide, dimethylsulfoxide, ethyl acetate, amyl acetate, cyclohexanol, cyclohexane, pentane, hexane, heptane, alcohols, ketones, pyrrolidones, or other appropriate solvents. In some preferred embodiments, the solvent may be miscible with methanol. In some preferred embodiments, the solvent may be miscible with acetone. In some preferred embodiments, the solvent may be miscible with N-methylpyrrolidone. Generally, a solvent may be considered miscible with a second solvent if it can be displaced in a gel by the second solvent through sufficient diffusive soaking.

U.S. Provisional Patent Application Ser. No. 62/112,241, filed Feb. 5, 2015, and entitled "Systems and Methods for Producing Aerogel Materials," is incorporated herein by reference in its entirety for all purposes.

EXAMPLES

The following examples are intended to illustrate certain embodiments of the present invention, but do not exemplify the full scope of the invention.

Example 1: Synthesis of Polyamide Aerogel Via Atmospheric Sublimation of $CO_2$

A polyamide gel is synthesized by reaction of an amine and an acyl chloride. The synthesis takes place in an inert nitrogen atmosphere. 2.35 g m-phenylenediamine is dissolved in 83.04 g N-methyl-2-pyrrolidone. The mixture is stirred until the m-phenylenediamine is fully dissolved (i.e., no particulates visible). The mixture is cooled to 5° C. in an ice water bath. After the mixture reaches target temperature 4.26 g terephthaloyl chloride is added. The mixture is stirred for 20 minutes (remaining in ice bath for continued cooling). After 20 minutes 0.124 g 1,3,5-benzene tricarbonyl chloride is added to the mixture, which is then stirred for 5 additional minutes. The resulting sol is then poured into a mold. The mold is sealed and placed in an air-tight container, and left for 24 hours at room temperature. After 24 hours the gel is removed from its mold and transferred to a solvent exchange bath.

The volume of the solvent bath is approximately 5 times that of the gel. The first solvent exchange has a volume ratio of 3:1 N-methyl-2-pyrrolidone:acetone. The gel is in this bath for 24 hours before being transferred to a bath which has a volume ratio of 1:3 N-methyl-2-pyrrolidone:acetone. The gel is in this bath for 24 hours before being transferred to a pure acetone bath for 72 hours, during which time the acetone is replaced twice.

After solvent exchange is complete the gel is transferred to a pressure vessel and submerged in excess acetone. The pressure vessel is then sealed and liquid $CO_2$ is introduced into the pressure vessel. The $CO_2$-acetone mixture is drained periodically while simultaneously supplying fresh liquid $CO_2$ until all the acetone has been removed. Then, the pressure vessel is isolated from the $CO_2$ supply, though it is still filled with liquid $CO_2$.

The pressure vessel is then rapidly depressurized by opening the drain valve, allowing the pressure in the vessel to decrease from the saturation pressure of $CO_2$ at room temperature (800-1000 psi) to atmospheric pressure over the course of approximately 5-10 minutes. As a result of the decompression, the temperature within the vessel drops dramatically, and some of the liquid $CO_2$ (specifically the $CO_2$ confined within the gel) freezes. After decompression is complete, the gels are filled with solid $CO_2$, and surrounded by atmospheric pressure gas. The solid $CO_2$ trapped within the gel sublimates over the course of approximately 3-12 hours at atmospheric pressure and temperature. After sublimation is complete the intact aerogels are removed from the pressure vessel.

The resulting aerogel is a light gray monolith with a bulk density of 0.3 g/cc. The material has a compressive modulus of 312 MPa and a compressive yield strength of 3 MPa. It has a specific surface area of 275 $m^2/g$ and a skeletal density of 1.4 g/cc.

Example 2. Synthesis of Polyamide Aerogel Via Atmospheric Sublimation of $CO_2$

A polyamide gel is synthesized using a procedure identical to that given in example 1 until solvent exchange. The volume of the solvent bath is approximately 5 times that of the gel. The gel is first solvent exchanged into N-methyl-2-pyrrolidone for 48 hours, the N-methyl-2-pyrrolidone being replaced once after 24 hours. The gel is the exchanged into a mixture which is 4 parts N-methyl-2-pyrrolidone and one part water (by volume) for 24 hours. Finally the gel is exchanged into acetone 3 times for 24 hours each. The subsequent drying process is identical to that which was outlined in Example 1.

The resulting aerogel is a light gray monolith with a bulk density of 0.3 g/cc.

Example 3. Synthesis of Polyamide Aerogel Via Atmospheric Sublimation of $CO_2$

A polyamide gel is synthesized by reaction of an amine and an acyl chloride. The synthesis takes place in an inert nitrogen atmosphere. 2.02 g anhydrous calcium chloride is dissolved in 83.05 g N-methyl-2-pyrrolidone and stirred until fully dissolved (no particulates visible). 2.35 g p-phenylenediamine is added to the mixture and stirred until fully dissolved (no particulates visible). The mixture is cooled to 5° C. in an ice water bath. After the mixture reaches target temperature 4.25 g terephthaloyl chloride is added. The mixture is stirred for 2 minutes (remaining in the ice bath for continued cooling). After mixing for 2 minutes the sol is poured into a mold. The mold is sealed and placed in an air-tight container, and left for 24 hours at room temperature. After 24 hours the gel is removed from its mold and transferred to a solvent exchange bath. The volume of the solvent exchange bath is approximately 5 times that of the gel, and is composed of 200 proof absolute ethanol. The ethanol is replaced seven times with clean ethanol (once every 24 hours). The gel is dried using the same process as outline in Example 1 with the exception that the solvent within the gels and in which the gels are initially submerged is ethanol, not acetone, and therefore the mixture drained from the pressure vessel is $CO_2$-ethanol rather than $CO_2$-acetone.

The resulting aerogel is a light gray monolith with a bulk density of 0.26 g/cc and compressive modulus of 165 MPa.

Example 4. Synthesis of a Polyimide Aerogel Produced from Reaction of an Amine and an Anhydride Via Atmospheric Sublimation of $CO_2$ A polyimide gel is synthesized by reaction of an amine and an anhydride. The synthesis takes place in an inert nitrogen atmosphere. 3.47 g p-phenylenediamine is dissolved in 90 mL N-methyl-2-pyrrolidone. The mixture is stirred until p-phenylenediamine is fully dissolved (no particulates visible). While continuously stirring 9.85 g of 3,3',4,4'-benzophenonetetracarboxylic dianhydride to this mixture. Immediately a mixture of 0.91 g Desmodur RE (triisocyanatophenylmethane, 27 wt % in ethyl acetate) in 30 mL N-methyl-2-pyrrolidone is added to the first mixture, and stirred for 10 minutes. After 10 minutes of stirring 23.06 g acetic anhydride and 33.97 g triethylamine are added in rapid succession. The resulting sol is stirred for 2-5 minutes until well mixed, then poured into molds. The molds are closed and placed in air-tight containers, and left for 24 hours at room temperature. After 24 hours the gels are removed from their molds and transferred to a solvent exchange bath.

The subsequent solvent exchange and drying processes are identical to those which were outlined in Example 1.

The resulting aerogel is a yellow monolith with a bulk density of 0.125 g/cc. The material has compressive modulus of 10.5 MPa, compressive yield strength of 0.5 MPa, and thermal conductivity of 25 mW/m-K. It has a specific surface area of 600 m²/g.

Example 5. Synthesis of Polyimide Aerogel Produced from Reaction of Isocyanate and Anhydride Via Atmospheric Sublimation of $CO_2$ A polyimide gel is synthesized by reaction of isocyanate and anhydride. The synthesis takes place in an inert nitrogen atmosphere. 17.44 g 3,3',4,4'-Benzophenonetetracarboxylic dianhydride is combined with 380 g N,N'-dimethylformamide and stirred until 3,3',4,4'-Benzophenonetetracarboxylic dianhydride is fully dissolved, approximately 10 minutes. To this mixture 49.21 g Demodur RE solution (27 wt % triisocyanatophenylmethane in ethyl acetate) is added, and the combined mixture is stirred for 10 minutes. After 10 minutes 1.7 g polydimethylsiloxane is added and the mixture is stirred for an additional 5 minutes. The mixture is them poured into molds which are covered but not completely gas-tight (to avoid pressurization during heating), and placed in a temperature controlled environment in which the air temperature is kept at 70° C. for 3.5 hours. The gels are then allowed to sit for 12 hours at room temperature. After 12 hours the gels are transferred to a solvent exchange bath.

The volume of the solvent bath is approximately 5 times that of the gel. The gel is first solvent exchanged into N,N'-dimethylformamide for 48 hours, the N,N'-dimethylformamide being replaced once after 24 hours. Finally the gel is exchanged into acetone 4 times for 24 hours each.

The subsequent drying process is identical to that which is outlined in Example 1.

The resulting aerogel is a light green monolith with a bulk density of 0.2 g/cc. The material has a compressive modulus of 2 MPa and a compressive yield strength of 0.19 MPa.

Example 6. Synthesis of a Polyimide Aerogel Produced from Reaction of Isocyanate and Anhydride Via Atmospheric Sublimation of $CO_2$ A polyimide gel is synthesized by reaction of isocyanate and anhydride. The synthesis takes place in an inert nitrogen atmosphere. 17.44 g 3,3',4,4'-Benzophenonetetracarboxylic dianhydride is combined with 380 g N,N'-dimethylformamide and stirred until 3,3',4,4'-benzophenonetetracarboxylic dianhydride is fully dissolved, approximately 10 minutes. To this mixture 49.21 g Desmodur RE solution (27 wt % triisocyanatophenylmethane in ethyl acetate) is added, and the combined mixture is stirred for 10 minutes. After 10 minutes 1.7 g polydimethylsiloxane is added and the mixture is stirred for an additional 5 minutes. The mixture is them poured into molds which are covered but not completely gas-tight (to avoid pressurization during heating), and placed in a temperature controlled environment in which the air temperature is kept at 70° C. for 3.5 hours. The gels are then allowed to sit for 12 hours at room temperature. After 12 hours the gels are transferred to a solvent exchange bath.

The volume of the solvent bath is approximately 5 times that of the gel. The gel is first solvent exchanged into N,N'-dimethylformamide for 48 hours, the N,N'-dimethylformamide being replaced once after 24 hours. The gel is the exchanged into a mixture which is 4 parts N,N'-dimethylformamide and one part water (by volume) for 24 hours. Finally the gel is exchanged into acetone 3 times for 24 hours each.

The subsequent drying process is identical to that which is outlined in Example 1.

The resulting aerogel is a light green monolith with a bulk density of 0.22 g/cc. The material has a compressive modulus of 27 MPa and a compressive yield strength of 1.3 MPa.

Example 7. Synthesis of Aromatic Polyurea Aerogel Via Atmospheric Sublimation of $CO_2$ A polyurea gel is synthesized by reaction of an amine and an isocyanate. 1.8 g oligomeric methylene diphenyl diisocyanate (Lupranat® M20) is dissolved in 12 g ethyl acetate in a glass beaker while stirring at 20° C. In another beaker 1.6 g 3,3',5,5'-tetramethyl-4,4'-diaminophenylmethane and 0.1 g N,N',N"-tris(dimethylaminopropyl)-s-hexahydrotriazine are dissolved in 12.5 g ethyl acetate. The contents of the two beakers are mixed, and allowed to rest at room temperature for 24 hours. After 24 hours the gel is removed from its mold and transferred to a solvent exchange bath.

The volume of the solvent exchange bath is approximately 5 times that of the gel, and is ACS Reagent Grade acetone. The acetone is replaced two times with clean acetone (once every 24 hours).

The subsequent drying process is identical to that which is outlined in Example 1.

The resulting aerogel is a white/beige monolith with a bulk density of 0.2 g/cc, thermal conductivity of 18 mW/m-K, and specific surface area of 304 $m^2/g$.

Example 8. Synthesis of Polyurea Aerogel Produced from Reaction of Isocyanate with In-Situ-Formed Amines Via Atmospheric Sublimation of $CO_2$ A polyurea gel is synthesized from an isocyanate. 158.12 g Desmodur N3300 (isocyanurate trimer of hexamethylene diisocyanate) is dissolved in 592.3 g acetone and stirred until homogenous (approximately 15 minutes). To this mixture 11.14 g deionized water is added, and stirred for 5 minutes. Finally 0.762 g triethylamine is added to the mixture, and stirred an additional 5 minutes. An HDPE mold is prepared by applying wax demolding agent in a thin layer where the mold will be wetted. The sol is poured into the mold, which is then sealed in a gas tight container, and transferred to a controlled-temperature environment which is set to 15° C. The gel is allowed to sit for 24 hours, during which time gelation occurs. After 24 hours the gel is removed from the mold and transferred to a solvent exchange bath.

The volume of the solvent exchange bath is approximately 5 times that of the gel, and is ACS Reagent Grade methanol. The acetone is replaced two times with clean methanol (once every 24 hours).

The gel is dried using the same process as outline in Example 1 with the exception that the solvent within the gels and in which the gels are initially submerged is methanol, not acetone, and therefore the mixture drained from the pressure vessel is $CO_2$-methanol rather than $CO_2$-acetone.

The resulting aerogel is a white monolith with a bulk density of 0.2 g/cc. The material has a compressive modulus of 40 MPa, and a compressive yield strength of 2 MPa. It has a thermal conductivity of 26 mW/m-K, specific surface area of 150 $m^2/g$, and skeletal density of about 1.35 g/cc.

Example 9. Synthesis of a Polyurethane Aerogel Via Atmospheric Sublimation of $CO_2$ A polyurethane gel is synthesized from an isocyanate and a polyol. 43.4 g Desmodur RE (triisocyanate aminophenylmethane), a solution of 80.6 wt % in ethyl acetate, is mixed with 513.78 g acetone and stirred until well mixed (approximately 5 minutes). To this mixture 29.88 g 1,1,1-tris(4-hydroxyphenyl)ethane is added, and stirred for 5 minutes. Finally 1.03 g dibutyltin dilaurate is added, and the mixture is stirred an addition 5 minutes. An HDPE mold is prepared by applying wax demolding agent in a thin layer where the mold will be wetted. The sol is poured into the mold, which is then sealed in a gas tight container containing acetone vapor, and transferred to a controlled-temperature environment which is set to 15° C. The gel is left at these conditions for 12 hours. After 24 hours the gel is removed from the mold and transferred to a solvent exchange bath.

The volume of the solvent exchange bath is approximately 5 times that of the gel, and is ACS Reagent Grade acetone. The acetone is replaced two times with clean acetone (once every 24 hours).

The subsequent drying process is identical to that which is outlined in Example 1.

The resulting aerogel is a light pink/purple monolith with a bulk density of 0.12 g/cc. The material has a compressive modulus of 20 MPa and a compressive yield strength of 0.4 MPa. It has a specific surface area of 150 $m^2/g$, and a skeletal density of 1.25 g/cc.

Example 10. Synthesis of Polymer-Crosslinked Silica Aerogel by Atmospheric Sublimation of $CO_2$ A gel is made by reinforcing the oxide backbone of a silica gel with a conformal polyisocyanate network. A solution referred to as part A is made by mixing 36.23 g acetonitrile, 7.77 g tetramethoxysilane, and 2.38 g (3-aminopropyl)triethoxysilane. A solution referred to as part B is made by mixing 36.23 g acetonitrile and 16.15 g deionized water. Both solutions are then cooled by placing their mixing beakers in an acetone-dry ice bath until the temperature equilibrates. Part B (which at this point is a slush) is then added to Part A, and the combined mixture is stirred aggressively. After the two parts are well mixed (<1 minute of aggressive stirring) the sol is poured into a mold, which is sealed in a closed, gas-tight container. The gel is allowed to sit for 2 hours in this environment. After two hours the gel (in its mold, with cover removed) is transferred to a bath of acetonitrile (approximately 10× the gel volume). The gel remains in acetonitrile for 72 hours, during which time the acetonitrile is replaced with clean acetonitrile two times (at 24 and 48 hours). After 72 hours the gel is transferred to a second bath containing a well-mixed solution of 314.4 g acetonitrile and 80.57 g Desmodur N3200 (biuret of hexamethylene diisocyanate), in which it soaks for 24 hours. The gel is then subjected to another three solvent exchanges into acetonitrile, identical to the first three. The gel is dried using the same process as outline in Example 1 with the exception that the solvent within the gels and in which the gels are initially submerged is acetonitrile, not acetone, and therefore the mixture drained from the pressure vessel is $CO_2$-acetonitrile rather than $CO_2$-acetone.

The resulting aerogel is a translucent white monolith with a bulk density of 0.21 g/cc. The material has a compressive yield strength of 25.5 MPa and a compressive modulus of 0.4 MPa. It has a specific surface area of 270 $m^2/g$ and a skeletal density of 1.3 g/cc.

Example 11. Synthesis of Polyamide Aerogel Via Vacuum-Assisted Freeze Drying from Organic Solvent A polyamide gel is synthesized by reaction of amine and an acyl chloride. The procedure is identical to Example 1 up until the gel is transferred to the solvent exchange bath. The volume of the solvent bath is approximately 5 times that of the gel. The first solvent exchange has a volume ratio of 3:1 N-methyl-2-pyrrolidone:tert-butanol. The gel is in this bath for 24 hours before being transferred to a bath which has a volume ratio of 1:3 N-methyl-2-pyrrolidone:tert-butanol. The gel is in this bath for 24 hours before being transferred to a pure tert-butanol bath for five days. The tert-butanol is refreshed every 24 hours. The pure tert-butanol baths are all carried out at 40° C.

Once solvent exchange is complete, the gel is submerged in a bath of fresh tert-butanol in a vacuum-tight container. The bath is gently heated to 50° C. while pulling a vacuum of <1 torr so as to remove dissolved gasses. During the degassing process, the bath is kept on a magnetic stir plate and agitated by a Teflon-coated stir bar. The bath and gel are degassed for approximately 1-2 hours. The gel is subsequently removed from the bath and quickly transferred to a polypropylene bag which is evacuated and subsequently heat-sealed to prevent air from redissolving in the tert-butanol within the pores.

After being vacuum sealed in a bag the gel is placed in a temperature controlled environment set to 0° C. (significantly below the freezing temperature of the tert-butanol), and allowed to reach thermal equilibrium with its surroundings. Once the gel has reached thermal equilibrium with its surroundings it is assumed that the majority (if not all) of solvent within the gel has frozen.

After the wet gel was completely frozen, it is removed from the vacuum bag and transferred to a temperature-controlled plate inside a vacuum chamber. The vacuum chamber is connected to a vacuum pump capable of achieving an ultimate pressure of <1 mtorr, with a speed sufficient to reduce the chamber to target operating pressure within 20 minutes or less. Between the product chamber and the vacuum pump is a liquid-nitrogen cooled condenser which is maintained at −196° C. by periodically adding liquid nitrogen to the coolant dewar flask. After sealing the product chamber the pump is used to evacuate the chamber. Once the pressure in the chamber is <1 torr the coolant dewar flask was filled with liquid nitrogen (not filled until the chamber was evacuated so as to mitigate the chance of condensing liquid oxygen).

The primary drying phase is monitored by measuring the pressure in the product chamber and the pressure at the vacuum pump using a Pirani gauge type pressure transducer. When the pressure in the product chamber (which is initially higher than that at the pump) has decreased to approximately the same pressure as that measured at the pump the sample is assumed to be completely dried. The system is then gently returned to atmospheric pressure by turning off the vacuum pump and opening a valve allowing air to enter the chamber.

The resulting aerogel is a light gray monolith with a bulk density of 0.3 g/cc. The material has a compressive modulus of 312 MPa and a compressive yield strength of 3 MPa. It has a specific surface area of 275 $m^2$/g and a skeletal density of 1.4 g/cc.

Example 12. Synthesis of Polyamide Aerogel Via Vacuum-Assisted Freeze Drying from Organic Solvent A polyamide gel is synthesized by reaction of amine and an acyl chloride. The synthesis takes place in an inert nitrogen atmosphere. 2.35 g m-phenylenediamine is dissolved in 83.04 g N-methyl-2-pyrrolidone. The mixture is stirred until the m-phenylenediamine is fully dissolved (no particulates visible). The mixture is cooled to 5° C. in an ice water bath. After the mixture reaches target temperature 4.26 g terephthaloyl chloride is added. The mixture is stirred for 20 minutes (remaining in ice bath for continued cooling). After 20 minutes 0.124 g 1,3,5-benzene tricarbonyl chloride is added to the mixture, which is then stirred for 5 additional minutes. The resulting sol is then poured into a mold. The mold is sealed and placed in an air-tight container, and left for 24 hours at room temperature. After 24 hours the gel is removed from its mold and transferred to a solvent exchange bath.

The volume of the solvent bath is approximately 5 times that of the gel. The gel is first solvent exchanged into N-methyl-2-pyrrolidone for 48 hours, the N-methyl-2-pyrrolidone being replaced once after 24 hours. The gel is the exchanged into a mixture which is 4 parts N-methyl-2-pyrrolidone and one part water (by volume) for 24 hours. The gel is then exchanged into acetone 3 times for 24 hours each. The gel is then transferred to a pure tert-butanol bath for five days. The tert-butanol is refreshed every 24 hours. The tert-butanol baths are all carried out at 40° C.

After tert-butanol solvent exchange is complete the sample follows the same processing steps as Example 11.

The resulting aerogel is a light gray monolith with a bulk density of 0.3 g/cc.

Example 13. Synthesis of Polyamide Aerogel Via Vacuum-Assisted Freeze Drying from Organic Solvent A polyamide gel is synthesized and solvent exchanged into ethanol as described in Example 3. The gel is in then transferred to a pure tert-butanol bath for five days. The tert-butanol is refreshed every 24 hours. The tert-butanol baths are all carried out at 40° C. After tert-butanol solvent exchange is complete the sample follows the same processing steps as Example 11.

The resulting aerogel is a light gray monolith with a bulk density of 0.26 g/cc and compressive modulus of 165 MPa.

Example 14. Synthesis of Polyimide Aerogel from Reaction of Amine and Anhydride Via Vacuum-Assisted Freeze Drying from Organic Solvent A polyimide gel is synthesized by reaction of an amine and an anhydride. The procedure is identical to Example 4 up until the gel is transferred to the solvent exchange bath. The volume of the solvent exchange bath is approximately 5 times that of the gel, and is ACS Reagent Grade acetone. The acetone is replaced two times with clean acetone (once every 24 hours). The gel is in then transferred to a pure tert-butanol bath for five days. The tert-butanol is refreshed every 24 hours. The tert-butanol baths are all carried out at 40° C. After tert-butanol solvent exchange is complete the sample follows the same processing steps as Example 11.

The resulting aerogel is a yellow monolith with a bulk density of 0.125 g/cc. The material has compressive modulus of 10.5 MPa, compressive yield strength of 0.5 MPa, and thermal conductivity of 25 mW/m-K. It has a specific surface area of 600 $m^2$/g.

Example 15. Synthesis of Polyimide Aerogel from Reaction of Isocyanate and Anhydride Via Vacuum-Assisted Freeze Drying from Organic Solvent A polyimide gel is synthesized by reaction of an isocyanate and an anhydride. The procedure is identical to Example 5 through the solvent exchange into acetone. The gel is in then transferred to a pure tert-butanol bath for five days. The tert-butanol is refreshed every 24 hours. The tert-butanol baths are all carried out at 40° C. After tert-butanol solvent exchange is complete the sample follows the same processing steps as Example 11.

The resulting aerogel is a light green monolith with a bulk density of 0.2 g/cc. The material has a compressive modulus of 2 MPa and a compressive yield strength of 0.19 MPa.

Example 16. Synthesis of Polyimide Aerogel Produced from Isocyanate and Anhydride Via Vacuum-Assisted Freeze Drying from Organic Solvent A polyimide gel is synthesized by reaction of an isocyanate and an anhydride. The procedure is identical to Example 6 though the solvent exchange into acetone. The gel is in then transferred to a pure tert-butanol bath for five days. The tert-butanol is refreshed every 24 hours. The tert-butanol baths are all carried out at 40° C. After tert-butanol solvent exchange is complete the sample follows the same processing steps as Example 11.

The resulting aerogel is a light green monolith with a bulk density of 0.22 g/cc. The material has a compressive modulus of 27 MPa and a compressive yield strength of 1.3 MPa.

Example 17. Synthesis of Aromatic Polyurea Aerogel Via Vacuum-Assisted Freeze Drying from Organic Solvent A polyurea gel is made by reaction of an amine and an isocyanate. The procedure is identical to Example 7 up until the gel is transferred to the solvent exchange bath. The volume of the solvent exchange bath is approximately 5 times that of the gel, and is ACS Reagent Grade tert-butanol. The gel is kept in tert-butanol for 5 days. The tert-butanol is refreshed every 24 hours. The tert-butanol baths are all carried out at 40° C. After tert-butanol solvent exchange is complete the sample follows the same processing steps as Example 11.

The resulting aerogel is a white/beige monolith with a bulk density of 0.2 g/cc, thermal conductivity of 18 mW/m-K, and specific surface area of 304 $m^2/g$.

Example 18. Synthesis of Polyurea Aerogel Produced from Reaction of Isocyanate with In-Situ-Formed Amines Via Vacuum-Assisted Freeze Drying from Organic Solvent A polyurea gel is made from an isocyanate. The procedure is identical to Example 8 up until the gel is transferred to the solvent exchange bath. The volume of the solvent exchange bath is approximately 5 times that of the gel, and is ACS Reagent Grade tert-butanol. The gel is kept in tert-butanol for 5 days. The tert-butanol is refreshed every 24 hours. The tert-butanol baths are all carried out at 40° C. After tert-butanol solvent exchange is complete the sample follows the same processing steps as Example 11.

The resulting aerogel is a white monolith with a bulk density of 0.2 g/cc. The material has a compressive modulus of 40 MPa, and a compressive yield strength of 2 MPa. It has a thermal conductivity of 26 mW/m-K, specific surface area of 150 $m^2/g$, and skeletal density of about 1.35 g/cc.

Example 19. Synthesis of Polyurethane Aerogel Via Vacuum-Assisted Freeze Drying from Organic Solvent A polyurethane gel is synthesized from an isocyanate. The procedure is identical to Example 8 until the third solvent exchange into acetone has been completed. The gel is in then transferred to a pure tert-butanol bath for five days. The tert-butanol is refreshed every 24 hours. The tert-butanol baths are all carried out at 40° C. After tert-butanol solvent exchange is complete the sample follows the same processing steps as Example 11.

The resulting aerogel is a light pink/purple monolith with a bulk density of 0.12 g/cc. The material has a compressive modulus of 20 MPa and a compressive yield strength of 0.4 MPa. It has a specific surface area of 150 $m^2/g$, and a skeletal density of 1.25 g/cc.

Example 20. Synthesis of Polymer-Crosslinked Silica Aerogel Via Vacuum-Assisted Freeze Drying from Organic Solvent A gel is made by reinforcing the oxide backbone of a silica gel with a conformal polyisocyanate network. A solution referred to as part A is made by mixing 36.23 g acetonitrile, 7.77 g tetramethoxysilane, and 2.38 g (3-aminopropyl)triethoxysilane. A solution referred to as part B is made by mixing 36.23 g acetonitrile and 16.15 g deionized water. Both solutions are then cooled by placing their mixing beakers in an acetone-dry ice bath until the temperature equilibrates. Part B (which at this point is a slush) is then added to Part A, and the combined mixture is stirred aggressively. After the two parts are well mixed (<1 minute of aggressive stirring) the sol is poured into a mold, which is sealed in a closed, gas-tight container. The gel is allowed to sit for 2 hours in this environment. After two hours the gel (in its mold, with cover removed) is transferred to a bath of acetonitrile (approximately 10× the gel volume). The gel remains in acetonitrile for 72 hours, during which time the acetonitrile is replaced with clean acetonitrile two times (at 24 and 48 hours). After 72 hours the gel is transferred to a second bath containing a well-mixed solution of 314.4 g acetonitrile and 80.57 g Desmodur N3200 (biuret of hexamethylene diisocyanate), in which it soaks for 24 hours. The gel is then subjected to another three solvent exchanges into acetonitrile, identical to the first three. The gel is in then transferred to a pure tert-butanol bath for five days. The tert-butanol is refreshed every 24 hours. The pure tert-butanol baths are all carried out at 40° C. After tert-butanol solvent exchange is complete the sample follows the same processing steps as Example 11.

The resulting aerogel is a translucent white monolith with a bulk density of 0.21 g/cc. The material has a compressive yield strength of 25.5 MPa and a compressive modulus of 0.4 MPa. It has a specific surface area of 270 $m^2/g$ and a skeletal density of 1.3 g/cc.

Example 21. Synthesis of Polyamide Aerogel Via Atmospheric Pressure Freeze Drying from Organic Solvent with Nitrogen A polyamide gel is synthesized and solvent exchanged into tert-butanol as described in Example 11. After solvent exchange is complete, the gel is submerged in a bath of fresh tert-butanol in a vacuum-tight container. The bath is gently heated to 50° C. while pulling a vacuum of <1 torr so as to remove dissolved gases. During the degassing process, the bath is kept on a magnetic stir plate and agitated by a Teflon-coated stir bar. The bath and gel are degassed for approximately 1-2 hours. The gel is subsequently removed from the bath and quickly transferred to a polypropylene bag which is evacuated and subsequently heat-sealed to prevent air from redissolving in the tert-butanol within the pores. After being vacuum sealed in a bag the gel is placed in a temperature controlled environment set to 0° C. (significantly below the freezing temperature of the tert-butanol), and allowed to reach thermal equilibrium with its surroundings. Once the gel has reached thermal equilibrium with its surroundings it is assumed that the majority (if not all) of solvent within the gel has frozen.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is industrial grade nitrogen, supplied from a high-pressure cylinder equipped with a regulator which maintains a maximum outlet pressure of 5 psi. The regulated gas flow rate was controlled using a needle valve and the resultant flow rate of 10 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of 0° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

Fans are used within the chamber to increase drying rate and ensure drying uniformity by preventing solvent vapor buildup near the gel. The fans operate at 1200 RPM, have capacity of 38.2 SCFM, and are positioned above and below the gel such that they force air to impinge on both sides of the gel.

Over the course of the drying process the gel is periodically removed from the drying chamber and its mass is measured before quickly returning it to the drying chamber (before remaining tert-butanol within the gel can begin to melt). The mass of the gel is thus tracked over time and when this mass ceases to change from one measurement to the next, the gel is considered to be completely dry.

The resulting aerogel is a light gray monolith with a bulk density of 0.3 g/cc. The material has a compressive modulus of 312 MPa and a compressive yield strength of 3 MPa. It has a specific surface area of 275 m²/g and a skeletal density of 1.4 g/cc.

Example 22. Synthesis of Polyamide Aerogel Via Atmospheric Pressure Freeze Drying from Organic Solvent with Nitrogen A polyamide gel is synthesized and solvent exchanged into tert-butanol exactly as described in Example 12. After solvent exchange is complete, the gel is submerged in a bath of fresh tert-butanol in a vacuum-tight container. The bath is gently heated to 50° C. while pulling a vacuum of <1 torr so as to remove dissolved gases. During the degassing process, the bath is kept on a magnetic stir plate and agitated by a Teflon-coated stir bar. The bath and gel are degassed for approximately 1-2 hours. The gel is subsequently removed from the bath and quickly transferred to a polypropylene bag which is evacuated and subsequently heat-sealed to prevent air from redissolving in the tert-butanol within the pores. After being vacuum sealed in a bag the gel is placed in a temperature controlled environment set to 0° C. (significantly below the freezing temperature of the tert-butanol), and allowed to reach thermal equilibrium with its surroundings. Once the gel has reached thermal equilibrium with its surroundings it is assumed that the majority (if not all) of solvent within the gel has frozen. After the gel has reached thermal equilibrium with its surroundings in the freezing chamber it is cooled further by decreasing the set temperature of the enclosure to −10° C. and waiting for the gel to equilibrate again.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is industrial grade nitrogen, supplied from a high-pressure cylinder equipped with a regulator which maintains a maximum outlet pressure of 5 psi. The regulated gas flow rate was controlled using a needle valve and the resultant flow rate of 50 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of 0° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system. The endpoint of the drying process is determined the same way as is described in Example 21.

The resulting aerogel is a light gray monolith with a bulk density of 0.3 g/cc.

Example 23. Synthesis of Polyamide Aerogel Via Atmospheric Pressure Freeze Drying from Organic Solvent with Nitrogen A polyamide gel is synthesized and solvent exchanged into tert-butanol exactly as described in Example 13. After solvent exchange is complete, the gel is submerged in a bath of fresh tert-butanol in a vacuum-tight container. The bath is gently heated to 50° C. while pulling a vacuum of <1 torr so as to remove dissolved gases. During the degassing process, the bath is kept on a magnetic stir plate and agitated by a Teflon-coated stir bar. The bath and gel are degassed for approximately 1-2 hours. The gel is subsequently removed from the bath and quickly transferred to a polypropylene bag which is evacuated and subsequently heat-sealed to prevent air from redissolving in the tert-butanol within the pores. After being vacuum sealed in a bag the gel is placed in a temperature controlled environment set to 0° C. (significantly below the freezing temperature of the tert-butanol), and allowed to reach thermal equilibrium with its surroundings. Once the gel has reached thermal equilibrium with its surroundings it is assumed that the majority (if not all) of solvent within the gel has frozen. After the gel has reached thermal equilibrium with its surroundings in the freezing chamber it is cooled further by decreasing the set temperature of the enclosure to −5° C. and waiting for the gel to equilibrate again.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is industrial grade nitrogen, supplied from a high-pressure cylinder equipped with a regulator which maintains a maximum outlet pressure of 5 psi. The regulated gas flow rate was controlled using a needle valve and the resultant flow rate of 10 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of 0° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

Fans are used within the chamber to increase drying rate and ensure drying uniformity by preventing solvent vapor buildup near the gel. There are two fans which operate at 1200 RPM, have capacity of 38.2 SCFM, and are positioned at opposite edges of the gel, one slightly above and the other slightly below, so that they force gas across the top and bottom surfaces of the gel in opposite directions.

The endpoint of the drying process is determined the same way as is described in Example 21.

The resulting aerogel is a light gray monolith with a bulk density of 0.26 g/cc and compressive modulus of 165 MPa.

Example 24. Synthesis of Polyimide Aerogel from Reaction of Amine and Anhydride Via Atmospheric Pressure Freeze Drying from Organic Solvent with Nitrogen A polyimide gel in synthesized and solvent exchanged into tert-butanol exactly as described in Example 14. After solvent exchange is complete the gel is degassed and frozen following the procedure from Example 21.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is industrial grade nitrogen, supplied from a high-pressure cylinder equipped with a regulator which maintains a maximum outlet pressure of 5 psi. Air is supplied by a compressor at 100 psi. The regulated gas flow rate was controlled using a needle valve and the resultant flow rate of 10 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of 5° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

Fans are used within the chamber to increase drying rate and ensure drying uniformity by preventing solvent vapor buildup near the gel. There are two fans which operate at 1200 RPM, have capacity of 38.2 SCFM, and are positioned above and below the gel such that they force air to impinge on both sides of the gel.

The endpoint of the drying process is determined the same way as is described in Example 21.

The resulting aerogel is a yellow monolith with a bulk density of 0.125 g/cc. The material has compressive modulus of 10.5 MPa, compressive yield strength of 0.5 MPa, and thermal conductivity of 25 mW/m-K. It has a specific surface area of 600 m$^2$/g.

Example 25. Synthesis of Polyimide Aerogel Produced from Reaction of Isocyanate and Anhydride Via Atmospheric Pressure Freeze Drying from Organic Solvent with Nitrogen A polyimide gel is synthesized and solvent exchanged into tert-butanol as described in Example 15. The gel is degassed, frozen, and further cooled as described in Example 22.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is industrial grade nitrogen, supplied from a high-pressure cylinder equipped with a regulator which maintains a maximum outlet pressure of 5 psi. Air is supplied by a compressor at 100 psi. The regulated gas flow rate was controlled using a needle valve and the resultant flow rate of 50 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of 5° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

The endpoint of the drying process is determined the same way as is described in Example 21.

The resulting aerogel is a light green monolith with a bulk density of 0.2 g/cc. The material has a compressive modulus of 2 MPa and a compressive yield strength of 0.19 MPa.

Example 26. Synthesis of Polyimide Aerogel Exchanged from Reaction of Isocyanate and Anhydride Via Atmospheric Pressure Freeze Drying from Organic Solvent with Nitrogen A polyimide gel is synthesized and solvent exchanged into tert-butanol as described in Example 16. The gel is degassed and frozen as described in Example 21. After freezing the gel is dried as described in Example 23.

The resulting aerogel is a light green monolith with a bulk density of 0.22 g/cc. The material has a compressive modulus of 27 MPa and a compressive yield strength of 1.3 MPa.

Example 27. Synthesis of Aromatic Polyurea Aerogel Via Atmospheric Pressure Freeze Drying from Organic Solvent with Nitrogen A polyurea gel is synthesized and solvent exchanged into tert-butanol as described in Example 17. The gel is degassed, frozen, and further cooled as described in Example 22.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is industrial grade nitrogen, supplied from a high-pressure cylinder equipped with a regulator which maintains a maximum outlet pressure of 5 psi. The regulated gas flow rate was controlled using a needle valve and the resultant flow rate of 10 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of −5° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

Fans are used within the chamber to increase drying rate and ensure drying uniformity by preventing solvent vapor buildup near the gel. There are two fans which operate at 1200 RPM, have capacity of 38.2 SCFM, and are positioned at opposite edges of the gel, one slightly above and the other slightly below, so that they force gas across the top and bottom surfaces of the gel in opposite directions.

The endpoint of the drying process is determined the same way as is described in Example 21.

The resulting aerogel is a white/beige monolith with a bulk density of 0.2 g/cc, thermal conductivity of 18 mW/m-K, and specific surface area of 304 m$^2$/g.

Example 28. Synthesis of Polyurea Aerogel Produced from Reaction of Isocyanate with In-Situ-Formed Amines Via Atmospheric Pressure Freeze Drying from Organic Solvent with Nitrogen A polyurea gel in synthesized and solvent exchanged into tert-butanol as described in example 18. The gel is degassed, frozen, and further cooled as described in Example 22.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is industrial grade nitrogen, supplied from a high-pressure cylinder equipped with a regulator which maintains a maximum outlet pressure of 5 psi. Air is supplied by a compressor at 100 psi. The regulated gas flow rate was controlled using a needle valve and the resultant flow rate of 20 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of 0° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

Fans are used within the chamber to increase drying rate and ensure drying uniformity by preventing solvent vapor buildup near the gel. The fans operate at 1200 RPM, have capacity of 38.2 SCFM, and are positioned above and below the gel such that they force air to impinge on both sides of the gel.

Over the course of the drying process the gel is periodically removed from the drying chamber and its mass is measured before quickly returning it to the drying chamber (before remaining tert-butanol within the gel can begin to melt). The mass of the gel is thus tracked over time and when this mass ceases to change from one measurement to the next, the gel is considered to be completely dry.

The resulting aerogel is a white monolith with a bulk density of 0.2 g/cc. The material has a compressive modulus of 40 MPa, and a compressive yield strength of 2 MPa. It has

Example 29. Synthesis of Polyurethane Aerogel Via Atmospheric Pressure Freeze Drying from Organic Solvent with Nitrogen A polyurethane gel is synthesized and solvent exchanged into tert-butanol as described in Example 19. The gel is then degassed and frozen as described in Example 21.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is industrial grade nitrogen, supplied from a high-pressure cylinder equipped with a regulator which maintains a maximum outlet pressure of 5 psi. The regulated gas flow rate was controlled using a needle valve and the resultant flow rate of 10 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of −0° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

Fans are used within the chamber to increase drying rate and ensure drying uniformity by preventing solvent vapor buildup near the gel. The fans operate at 1200 RPM, have capacity of 38.2 SCFM, and are positioned above and below the gel such that they force air to impinge on both sides of the gel.

Over the course of the drying process the gel is periodically removed from the drying chamber and its mass is measured before quickly returning it to the drying chamber (before remaining tert-butanol within the gel can begin to melt). The mass of the gel is thus tracked over time and when this mass ceases to change from one measurement to the next, the gel is considered to be completely dry.

The resulting aerogel is a light pink/purple monolith with a bulk density of 0.12 g/cc. The material has a compressive modulus of 20 MPa and a compressive yield strength of 0.4 MPa. It has a specific surface area of 150 m$^2$/g, and a skeletal density of 1.25 g/cc.

Example 30. Synthesis of Polymer-Crosslinked Silica Aerogel Via Atmospheric Pressure Freeze Drying with Nitrogen A polymer-reinforced silica gel is synthesized and solvent exchanged into tert-butanol as described in Example 20. The gel is degassed and frozen as described in Example 21.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is industrial grade nitrogen, supplied from a high-pressure cylinder equipped with a regulator which maintains a maximum outlet pressure of 5 psi. Air is supplied by a compressor at 100 psi. The regulated gas flow rate was controlled using a needle valve and the resultant flow rate of 25 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of 0° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

Over the course of the drying process the gel is periodically removed from the drying chamber and its mass is measured before quickly returning it to the drying chamber (before remaining tert-butanol within the gel can begin to melt). The mass of the gel is thus tracked over time and when this mass ceases to change from one measurement to the next, the gel is considered to be completely dry.

The resulting aerogel is a translucent white monolith with a bulk density of 0.21 g/cc. The material has a compressive yield strength of 25.5 MPa and a compressive modulus of 0.4 MPa. It has a specific surface area of 270 m$^2$/g and a skeletal density of 1.3 g/cc.

Example 31. Synthesis of Polyamide Aerogel Via Atmospheric Pressure Freeze Drying from Organic Solvent with Dry Air A polyamide gel is synthesized and solvent exchanged into tert-butanol as described in Example 11. After solvent exchange is complete, the gel is submerged in a bath of fresh tert-butanol in a vacuum-tight container. The bath is gently heated to 50° C. while pulling a vacuum of <1 torr so as to remove dissolved gases. During the degassing process, the bath is kept on a magnetic stir plate and agitated by a Teflon-coated stir bar. The bath and gel are degassed for approximately 1-2 hours. The gel is subsequently removed from the bath and quickly transferred to a polypropylene bag which is evacuated and subsequently heat-sealed to prevent air from redissolving in the tert-butanol within the pores. After being vacuum sealed in a bag the gel is placed in a temperature controlled environment set to 0° C. (significantly below the freezing temperature of the tert-butanol), and allowed to reach thermal equilibrium with its surroundings. Once the gel has reached thermal equilibrium with its surroundings it is assumed that the majority (if not all) of solvent within the gel has frozen.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is desiccated compressed air. Air is supplied by a compressor at 100 psi. The regulated gas flow rate was controlled using a needle valve and the resultant flow rate of 10 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of 0° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

Fans are used within the chamber to increase drying rate and ensure drying uniformity by preventing solvent vapor buildup near the gel. The fans operate at 1200 RPM, have capacity of 38.2 SCFM, and are positioned above and below the gel such that they force air to impinge on both sides of the gel.

Over the course of the drying process the gel is periodically removed from the drying chamber and its mass is measured before quickly returning it to the drying chamber (before remaining tert-butanol within the gel can begin to melt). The mass of the gel is thus tracked over time and when this mass ceases to change from one measurement to the next, the gel is considered to be completely dry.

The resulting aerogel is a light gray monolith with a bulk density of 0.3 g/cc. The material has a compressive modulus of 312 MPa and a compressive yield strength of 3 MPa. It has a specific surface area of 275 $m^2$/g and a skeletal density of 1.4 g/cc.

Example 32. Synthesis of Polyamide Aerogel Via Atmospheric Pressure Freeze Drying from Organic Solvent with Dry Air A polyamide gel is synthesized and solvent exchanged into tert-butanol exactly as described in Example 12. After solvent exchange is complete, the gel is submerged in a bath of fresh tert-butanol in a vacuum-tight container. The bath is gently heated to 50° C. while pulling a vacuum of <1 torr so as to remove dissolved gases. During the degassing process, the bath is kept on a magnetic stir plate and agitated by a Teflon-coated stir bar. The bath and gel are degassed for approximately 1-2 hours. The gel is subsequently removed from the bath and quickly transferred to a polypropylene bag which is evacuated and subsequently heat-sealed to prevent air from redissolving in the tert-butanol within the pores. After being vacuum sealed in a bag the gel is placed in a temperature controlled environment set to 0° C. (significantly below the freezing temperature of the tert-butanol), and allowed to reach thermal equilibrium with its surroundings. Once the gel has reached thermal equilibrium with its surroundings it is assumed that the majority (if not all) of solvent within the gel has frozen. After the gel has reached thermal equilibrium with its surroundings in the freezing chamber it is cooled further by decreasing the set temperature of the enclosure to −10° C. and waiting for the gel to equilibrate again.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is desiccated compressed air. Air is supplied by a compressor at 100 psi. The regulated gas flow rate was controlled using a needle valve and the resultant flow rate of 50 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of 0° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system. The endpoint of the drying process is determined the same way as is described in Example 21.

The resulting aerogel is a light gray monolith with a bulk density of 0.3 g/cc.

Example 33. Synthesis of Polyamide Aerogel Via Atmospheric Pressure Freeze Drying from Organic Solvent with Dry Air A polyamide gel is synthesized and solvent exchanged into tert-butanol exactly as described in Example 13. After solvent exchange is complete, the gel is submerged in a bath of fresh tert-butanol in a vacuum-tight container. The bath is gently heated to 50° C. while pulling a vacuum of <1 torr so as to remove dissolved gases. During the degassing process, the bath is kept on a magnetic stir plate and agitated by a Teflon-coated stir bar. The bath and gel are degassed for approximately 1-2 hours. The gel is subsequently removed from the bath and quickly transferred to a polypropylene bag which is evacuated and subsequently heat-sealed to prevent air from redissolving in the tert-butanol within the pores. After being vacuum sealed in a bag the gel is placed in a temperature controlled environment set to 0° C. (significantly below the freezing temperature of the tert-butanol), and allowed to reach thermal equilibrium with its surroundings. Once the gel has reached thermal equilibrium with its surroundings it is assumed that the majority (if not all) of solvent within the gel has frozen. After the gel has reached thermal equilibrium with its surroundings in the freezing chamber it is cooled further by decreasing the set temperature of the enclosure to −5° C. and waiting for the gel to equilibrate again.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is desiccated compressed air. Air is supplied by a compressor at 100 psi. The regulated gas flow rate was controlled using a needle valve and the resultant flow rate of 10 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of 0° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

Fans are used within the chamber to increase drying rate and ensure drying uniformity by preventing solvent vapor buildup near the gel. There are two fans which operate at 1200 RPM, have capacity of 38.2 SCFM, and are positioned at opposite edges of the gel, one slightly above and the other slightly below, so that they force gas across the top and bottom surfaces of the gel in opposite directions.

The endpoint of the drying process is determined the same way as is described in Example 21.

The resulting aerogel is a light gray monolith with a bulk density of 0.26 g/cc and compressive modulus of 165 MPa.

Example 34. Synthesis of Polyimide Aerogel from Reaction of Amine and Anhydride Via Atmospheric Pressure Freeze Drying from Organic Solvent with Dry Air A polyimide gel is synthesized and solvent exchanged into tert-butanol exactly as described in Example 14. After solvent exchange is complete the gel is degassed and frozen following the procedure from Example 21.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is desiccated compressed air. Air is supplied by a compressor at 100 psi. Air is supplied by a compressor at 100 psi. The regulated gas flow rate was controlled using a needle valve and the resultant flow rate of 10 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of 5° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

Fans are used within the chamber to increase drying rate and ensure drying uniformity by preventing solvent vapor buildup near the gel. There are two fans which operate at 1200 RPM, have capacity of 38.2 SCFM, and are positioned above and below the gel such that they force air to impinge on both sides of the gel.

The endpoint of the drying process is determined the same way as is described in Example 21.

The resulting aerogel is a yellow monolith with a bulk density of 0.125 g/cc. The material has compressive modulus of 10.5 MPa, compressive yield strength of 0.5 MPa, and thermal conductivity of 25 mW/m-K. It has a specific surface area of 600 m$^2$/g.

Example 35. Synthesis of Polyimide Aerogel Produced from Reaction of Isocyanate and Anhydride Via Atmospheric Pressure Freeze Drying from Organic Solvent with Dry Air A polyimide gel is synthesized and solvent exchanged into tert-butanol as described in Example 15. The gel is degassed, frozen, and further cooled as described in Example 22.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is desiccated compressed air. Air is supplied by a compressor at 100 psi. Air is supplied by a compressor at 100 psi. The regulated gas flow rate was controlled using a needle valve and the resultant flow rate of 50 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of 5° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

The endpoint of the drying process is determined the same way as is described in Example 21.

The resulting aerogel is a light green monolith with a bulk density of 0.2 g/cc. The material has a compressive modulus of 2 MPa and a compressive yield strength of 0.19 MPa.

Example 36. Synthesis of Polyimide Aerogel Produced from Reaction of Isocyanate and Anhydride Via Atmospheric Pressure Freeze Drying from Organic Solvent with Dry Air A polyimide gel is synthesized and solvent exchanged into tert-butanol as described in Example 16. The gel is degassed and frozen as described in Example 21. After freezing the gel is dried as described in Example 33.

The resulting aerogel is a light green monolith with a bulk density of 0.22 g/cc. The material has a compressive modulus of 27 MPa and a compressive yield strength of 1.3 MPa.

Example 37. Synthesis of Aromatic Polyurea Aerogel Via Atmospheric Pressure Freeze Drying from Organic Solvent with Dry Air A polyurea gel is synthesized and solvent exchanged into tert-butanol as described in Example 17. The gel is degassed, frozen, and further cooled as described in Example 22.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is desiccated compressed air. Air is supplied by a compressor at 100 psi. The regulated gas flow rate was controlled using a needle valve and the resultant flow rate of 10 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of $-5°$ C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

Fans are used within the chamber to increase drying rate and ensure drying uniformity by preventing solvent vapor buildup near the gel. There are two fans which operate at 1200 RPM, have capacity of 38.2 SCFM, and are positioned at opposite edges of the gel, one slightly above and the other slightly below, so that they force gas across the top and bottom surfaces of the gel in opposite directions.

The endpoint of the drying process is determined the same way as is described in Example 21.

The resulting aerogel is a white/beige monolith with a bulk density of 0.2 g/cc, thermal conductivity of 18 mW/m-K, and specific surface area of 304 $m^2$/g.

Example 38. Synthesis of Polyurea Aerogel Produced from Reaction of Isocyanate with In-Situ-Formed Amines Via Atmospheric Pressure Freeze Drying from Organic Solvent with Dry Air A polyurea gel in synthesized and solvent exchanged into tert-butanol as described in example 18. The gel is degassed, frozen, and further cooled as described in Example 22.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is desiccated compressed air. Air is supplied by a compressor at 100 psi. Air is supplied by a compressor at 100 psi. The regulated gas flow rate was controlled using a needle valve and the resultant flow rate of 20 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of 0° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

Fans are used within the chamber to increase drying rate and ensure drying uniformity by preventing solvent vapor buildup near the gel. The fans operate at 1200 RPM, have capacity of 38.2 SCFM, and are positioned above and below the gel such that they force air to impinge on both sides of the gel.

Over the course of the drying process the gel is periodically removed from the drying chamber and its mass is measured before quickly returning it to the drying chamber (before remaining tert-butanol within the gel can begin to melt). The mass of the gel is thus tracked over time and when this mass ceases to change from one measurement to the next, the gel is considered to be completely dry.

The resulting aerogel is a white monolith with a bulk density of 0.2 g/cc. The material has a compressive modulus of 40 MPa, and a compressive yield strength of 2 MPa. It has a thermal conductivity of 26 mW/m-K, specific surface area of 150 $m^2$/g, and skeletal density of about 1.35 g/cc.

Example 39. Synthesis of Polyurethane Aerogel Via Atmospheric Pressure Freeze Drying from Organic Solvent with Dry Air A polyurethane gel is synthesized and solvent exchanged into tert-butanol as described in Example 19. The gel is then degassed and frozen as described in Example 21.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is desiccated compressed air. Air is supplied by a compressor at 100 psi. The regulated gas flow rate was controlled using a needle valve and the resultant flow rate of 10 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of –0° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

Fans are used within the chamber to increase drying rate and ensure drying uniformity by preventing solvent vapor buildup near the gel. The fans operate at 1200 RPM, have capacity of 38.2 SCFM, and are positioned above and below the gel such that they force air to impinge on both sides of the gel.

Over the course of the drying process the gel is periodically removed from the drying chamber and its mass is measured before quickly returning it to the drying chamber (before remaining tert-butanol within the gel can begin to melt). The mass of the gel is thus tracked over time and when this mass ceases to change from one measurement to the next, the gel is considered to be completely dry.

The resulting aerogel is a light pink/purple monolith with a bulk density of 0.12 g/cc. The material has a compressive modulus of 20 MPa and a compressive yield strength of 0.4 MPa. It has a specific surface area of 150 m$^2$/g, and a skeletal density of 1.25 g/cc.

Example 40. Synthesis of Polymer-Crosslinked Silica Aerogel Via Atmospheric Pressure Freeze Drying with Dry Air A polymer-reinforced silica gel is synthesized and solvent exchanged into tert-butanol as described in Example 20. The gel is degassed and frozen as described in Example 21.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is desiccated compressed air. Air is supplied by a compressor at 100 psi. Air is supplied by a compressor at 100 psi. The regulated gas flow rate was controlled using a needle valve and the resultant flow rate of 25 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of 0° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

Over the course of the drying process the gel is periodically removed from the drying chamber and its mass is measured before quickly returning it to the drying chamber (before remaining tert-butanol within the gel can begin to melt). The mass of the gel is thus tracked over time and when this mass ceases to change from one measurement to the next, the gel is considered to be completely dry.

The resulting aerogel is a translucent white monolith with a bulk density of 0.21 g/cc. The material has a compressive yield strength of 25.5 MPa and a compressive modulus of 0.4 MPa. It has a specific surface area of 270 m$^2$/g and a skeletal density of 1.3 g/cc.

Example 41. Drying of a Polyimide Aerogel by Atmospheric Sublimation of $CO_2$

In this example, a gel was prepared using acetonitrile according to methods known in the art for preparing a polyimide aerogel, for example, methods described in US2014/0322122, entitled "Porous Nanostructured Polyimide Networks and Methods of Manufacture," which is incorporated herein by reference in its entirety for disclosure related to the preparation of polyimide aerogels and related aerogel materials. The sol was poured into a polypropylene mold and placed on an elevated stage in a sealed container. The container was partially filled with acetonitrile to saturate the gas phase within the container in order to prevent evaporation of solvent from the sol during gelation. The sol was allowed to stand at room temperature for 1 to 12 hours until gelation was able to occur. To undergo solvent exchange, the resulting gel was then transferred in its mold to a bath of pure acetonitrile with a volume 5-10 times that of the gel. The sample was kept in the bath for three days. The bath was replaced twice during this time with virgin acetonitrile.

After three days, the gel was transferred to a pressure vessel and submerged in excess acetonitrile. The pressure vessel was then sealed and liquid $CO_2$ was introduced into the pressure vessel. The $CO_2$-acetonitrile mixture was drained periodically while simultaneously supplying fresh liquid $CO_2$ until all the acetonitrile had been removed. Then, the pressure vessel was isolated from the $CO_2$ supply, though was still filled with liquid $CO_2$.

The pressure vessel was then rapidly depressurized by opening the drain valve, allowing the pressure in the vessel to decrease from the saturation pressure of $CO_2$ at room temperature (800-1000 psi) to atmospheric pressure over the course of approximately 5-10 minutes. As a result of the decompression, the temperature within the vessel dropped dramatically, and some of the liquid $CO_2$ (specifically the $CO_2$ confined within the gel) froze. After decompression was complete, the gels were filled with solid $CO_2$, and surrounded by atmospheric pressure gas. The solid $CO_2$ trapped within the gel sublimated over the course of approximately 3-12 hours at atmospheric pressure and temperature. After sublimation was complete the intact aerogels were removed from the pressure vessel.

Example 42. Drying of Polyurea Aerogel Via Vacuum-Assisted Freeze Drying

In this example, a gel was prepared according to methods known in the art for preparing a polyurea aerogel, for example, methods described in US2012/0152846, entitled "Three-Dimensional Porous Polyurea Networks and Methods of Manufacture," which is incorporated herein by reference in its entirety for disclosure related to the preparation of polyurea aerogels and related aerogel materials. The solution was stirred for approximately one minute and then dispensed into a PTFE mold and placed on an elevated stage in a sealed container. The container was partially filled with acetone to saturate the gas phase within the container in order to prevent evaporation of solvent from the sol during gelation. The sol was allowed to stand at room temperature for approximately 24 hours. After gelation had occurred, the gel was then subject to solvent exchange. Accordingly, the gel was removed from its mold and transferred to an acetone bath 5-10 times the volume of the gel, which was exchanged twice over the course of three days so as to remove unreacted precursor, catalyst, etc. The gel was then transferred into a bath of de-ionized water having a volume about five times that of the gel. The bath was exchanged five times, once every 24 hours.

After solvent exchange was complete, the gel was then transferred to a small bath of fresh deionized water in a vacuum-tight container. The bath was gently heated to 70° C. while pulling a vacuum of <1 torr so as to remove dissolved gasses. During the degassing process, the bath was kept on a magnetic stir plate and agitated by a Teflon-coated stir bar. The bath was then degassed for approximately 1-2 hours. The gel was subsequently removed from the bath and quickly transferred to a polypropylene bag which was vacuum-sealed to prevent air from redissolving in the water within the pores. The gel was then rapidly frozen by submerging the bag in a slurry of dry ice and ethanol at −78° C.

After the wet gel was completely frozen, it was removed from the vacuum bag and transferred to a temperature-controlled plate inside a vacuum chamber. The vacuum chamber was connected to a vacuum pump capable of achieving an ultimate pressure of <1 mtorr, with a speed sufficient to reduce the chamber to target operating pressure within 20 minutes or less. Between the product chamber and the vacuum pump was a liquid-nitrogen cooled condenser which was maintained at −196° C. by periodically adding liquid nitrogen to the coolant dewar. After sealing the product chamber the pump was used to evacuate the chamber. Once the pressure in the chamber was <1 torr the coolant dewar was filled with liquid nitrogen (not filled until the chamber was evacuated so as to mitigate the chance of condensing liquid oxygen).

The primary drying phase was monitored by measuring the pressure in the product chamber and the pressure at the vacuum pump using a Pirani gauge type pressure transducer. When the pressure in the product chamber (which was initially higher than that at the pump) had decreased to approximately the same pressure as that measured at the pump the sample was assumed to be completely dried. The system was then gently returned to atmospheric pressure by turning off the vacuum pump and opening a valve allowing air to enter the chamber.

Example 43. Drying of Polyurethane Aerogel Via Atmospheric Pressure Freeze Drying Using Nitrogen For this example, a gel was prepared according to methods known in the art for preparing a polyurethane aerogel, for example, methods described in U.S. Pat. No. 8,927,079, entitled "Porous Polyurethane Networks and Methods of Preparation," which is incorporated herein by reference in its entirety for disclosure related to the preparation of polyurethane aerogels and related aerogel materials. The sol was poured into a polypropylene mold and placed on an elevated stage in a sealed container. The container was partially filled with acetone to saturate the gas phase within the container in order to prevent evaporation of solvent from the sol during gelation. The sol was allowed to stand at room temperature for approximately 1-12 hours until gelation had occurred. The resulting gel was then transferred in its mold to a bath of pure methanol with a volume 5-10 times that of the gel.

The solvent of the gel was subsequently exchanged with tert-butanol to such a degree that the concentration of initial pore fluid was diminished to below 0.01% vol/vol. The gel was transferred to a degassing apparatus similar to that used in Example 42. However, rather than operating at 70° C., the bath was maintained at 30° C. to 40° C. Following degassing of the solvent contained within the gel, the gel was vacuum-sealed in a polypropylene bag, and frozen gently by placing it in a refrigerated environment between −20° C. and 5° C. for 12 to 24 hours to ensure the complete freezing (and solidification) of the tert-butanol.

The frozen sample was removed from the freezing chamber and the mass of the gel and frozen solvent contained therein was measured. The gel was then transferred to a drying chamber, which included a gas-tight transparent tube with removable end caps. The gel was placed in the drying chamber on a scaffold including low-thermal conductivity material such as foam or plastic in order to ensure the sample to be thermally isolated from its surroundings. Gas was supplied through one end of the tube and exhausted at the opposite end causing gas to constantly flow over and around the gel. Temperature of the inlet gas was measured inside the drying chamber by a thermocouple placed directly downstream from the inlet port.

The gas in this case was industrial grade nitrogen, supplied from a high-pressure cylinder equipped with a regulator which maintains a maximum outlet pressure of 5 psi. The regulated gas flow rate was controlled using a needle valve and the resultant flow rate measured using a gas-flow rotameter. After passing through the rotameter the gas was flowed through a liquid-cooled finned heat exchanger. The heat exchanger was cooled using a recirculating chiller which pumped a cooled mixture of water and ethylene glycol, and was operated at a temperature and flow rate sufficient to maintain a drying chamber temperature of <0° C. as measured by the thermocouple at the inlet of the drying chamber. The effluent gas from the drying chamber (a mixture of nitrogen and tert-butanol) passed through a cold trap or desiccant chamber designed to capture tert-butanol vapor. The remaining nitrogen gas was then vented to the atmosphere through a standard air exhaust system.

Over the course of the drying process the gel was periodically removed from the drying chamber and its mass was measured before quickly returning it to the drying chamber (before remaining tert-butanol within the gel could begin to melt). The mass of the gel was thus tracked over time and when this mass ceased to change from one measurement to the next, the gel was considered to be completely dry.

Example 44. Drying of Polymer-Crosslinked Silica Aerogel Via Atmospheric Pressure Freeze Drying Using Air For this example, a gel was prepared according to methods known in the art for preparing a cross-linked aerogel, for example, methods described in U.S. Pat. No. 7,771,609, entitled "Methods and Compositions for Preparing Silica Aerogels," which is incorporated herein by reference in its entirety for disclosure related to the preparation of cross-linked aerogels and related aerogel materials. After casting, gelation, and polymer crosslinking, the gel was placed in a bath of virgin ACS Reagent Grade tert-butanol with a volume at least five times that of the gel. The tert-butanol was refreshed five times, once every 24 hours. The solvent of the gel was then exchanged into tert-butanol to such a degree that the concentration of initial pore fluid was ~0.01% vol/vol. The gel was then transferred to a degassing apparatus similar to that used in Example 42. However in this case rather than operating at 70° C. the bath was maintained at 30° C. to 40° C. Following degassing of the solvent contained within the gel, the gel was vacuum-sealed in a polypropylene bag, and frozen gently by placing it in a refrigerated environment between −20° C. and 5° C. for 12 to 24 hours to ensure complete freezing of the tert-butanol.

After the gel was completely frozen, it was removed from the freezing chamber and the mass of the gel and frozen solvent contained therein was measured. The gel was then transferred to the drying chamber, rectangular in cross section and at least twice as large as the sample in each dimension. The sample was thermally isolated from the chamber walls by a scaffold, e.g., a rack, having low thermal conductivity, that permitted flow on all sides of the gel, and that minimized surface area not directly in contact with flowing gas, as in previous examples. Inlet and outlet for air flow were at opposite sides of the chamber, oriented such that air flowed over and parallel to the major faces of the gel plate. The gas inlet and outlet ports were connected to the main section of the drying chamber by expansion and contraction cones, respectively, such that air flow through the supply and exhaust ducting (having a smaller cross sectional area than the chamber) was distributed across the entirety of the gel, to avoid uneven drying (i.e., drying more along the centerline).

The gas supplied in this case was simply atmospheric pressure air. Air was pulled into the system by a variable speed blower which was used to control gas flow rate. The untreated air was then passed through a regenerating desiccator packed with silica gel, anhydrous calcium sulfate (e.g., Drierite®) desiccant, or molecular sieves. Dried air was then pre-cooled using a heat exchanger as described in the previous example before entering the drying chamber. The effluent gas from the drying chamber (a mixture of air and tert-butanol) was vented through an exhaust system equipped to handle small concentrations of organic solvent vapor. Over the course of the drying process the gel was periodically removed from the drying chamber and its mass was measured before quickly returning it to the drying chamber (before remaining tert-butanol within the gel could begin to melt). The mass of the gel was thus tracked over time, and when this mass ceased to change from one measurement to the next, the gel was considered to be completely dry.

Example 45. Drying of Graphene Aerogel Via Atmospheric Sublimation of $CO_2$ A graphene aerogel is synthesized. An aqueous solution of 1 wt % graphene oxide is prepared using Hummers' method, and dispersed by ultrasonication for 4-24 hours. After dispersion, 75.65 g solution is obtained. After the graphene oxide solution is dispersed 1.235 g resorcinol, 1.791 g formaldehyde, and 5.95 g mg sodium carbonate are added. The resultant sol is then poured into a glass mold. The mold is sealed, and placed in an oven set to 85° C. for 72 hours. After 72 hours the gels are removed from the oven and transferred to a solvent exchange bath. The volume of the solvent exchange bath is approximately 5 times that of the gel, and is ACS reagent grade acetone. The acetone is replaced two times with clean acetone (once every 24 hours). The subsequent drying process to obtain a dried aerogel is identical to that which was outlined in Example 1. After the dried aerogel is obtained, it is pyrolyzed under nitrogen at 1050° C. for 3 hours. The result is a graphene aerogel, which appears a black monolith. The material has a bulk density of 0.1 g/cc, modulus of 25 MPa, and specific surface area of 580 $m^2/g$.

Example 46. Drying of Graphene Aerogel Via Vacuum-Assisted Freeze Drying from Organic Solvent A graphene aerogel is synthesized. An aqueous solution of 1 wt % graphene oxide is prepared using Hummers' method, and dispersed by ultrasonication for 4-24 hours. After dispersion, 75.65 g solution is obtained. After the graphene oxide solution is dispersed 1.235 g resorcinol, 1.791 g formaldehyde, and 5.95 g mg sodium carbonate are added. The resultant sol is then poured into a glass mold. The mold is sealed, and placed in an oven set to 85° C. for 72 hours. After 72 hours the gels are removed from the oven and transferred to a solvent exchange bath. The volume of the solvent exchange bath is approximately 5 times that of the gel, and is ACS reagent grade acetone. The acetone is replaced two times with clean acetone (once every 24 hours). The gel is in then transferred to a pure tert-butanol bath for five days. The tert-butanol is refreshed every 24 hours. The pure tert-butanol baths are all carried out at 40° C.

After tert-butanol solvent exchange is complete the sample follows the same processing steps as Example 11 to obtain a dried aerogel. After the dried aerogel is obtained, it is pyrolyzed under nitrogen at 1050° C. for 3 hours. The result is a graphene aerogel, which appears a black monolith. The material has a bulk density of 0.1 g/cc, modulus of 25 MPa, and specific surface area of 580 $m^2/g$.

Example 47. Drying of Graphene Aerogel Via Atmospheric Pressure Freeze Drying Using Nitrogen A graphene aerogel is synthesized. An aqueous solution of 1 wt % graphene oxide is prepared using Hummers' method, and dispersed by ultrasonication for 4-24 hours. After dispersion, 75.65 g solution is obtained. After the graphene oxide solution is dispersed 1.235 g resorcinol, 1.791 g formaldehyde, and 5.95 g mg sodium carbonate are added. The resultant sol is then poured into a glass mold. The mold is sealed, and placed in an oven set to 85° C. for 72 hours. After 72 hours the gels are removed from the oven and transferred to a solvent exchange bath. The volume of the solvent exchange bath is approximately 5 times that of the gel, and is ACS reagent grade acetone. The acetone is replaced two times with clean acetone (once every 24 hours). The gel is in then transferred to a pure tert-butanol bath for five days. The tert-butanol is refreshed every 24 hours. The pure tert-butanol baths are all carried out at 40° C.

The gel is degassed, frozen, and further cooled as described in Example 22.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is industrial grade nitrogen, supplied from a high-pressure cylinder equipped with a regulator which maintains a maximum outlet pressure of 5 psi. Air is supplied by a compressor at 100 psi. The regulated gas flow rate was controlled using a needle valve and the resultant flow rate of 20 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of 0° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

Fans are used within the chamber to increase drying rate and ensure drying uniformity by preventing solvent vapor buildup near the gel. The fans operate at 1200 RPM, have capacity of 38.2 SCFM, and are positioned above and below the gel such that they force air to impinge on both sides of the gel.

Over the course of the drying process the gel is periodically removed from the drying chamber and its mass is measured before quickly returning it to the drying chamber (before remaining tert-butanol within the gel can begin to melt). The mass of the gel is thus tracked over time and when this mass ceases to change from one measurement to the next, the gel is considered to be completely dry.

After the dried aerogel is obtained, it is pyrolyzed under nitrogen at 1050° C. for 3 hours. The result is a graphene aerogel, which appears a black monolith. The material has a bulk density of 0.1 g/cc, modulus of 25 MPa, and specific surface area of 580 $m^2/g$.

Example 48. Drying of Graphene Aerogel Via Atmospheric Pressure Freeze Drying Using Dry Air A graphene aerogel is synthesized. An aqueous solution of 1 wt % graphene oxide is prepared using Hummers' method, and dispersed by ultrasonication for 4-24 hours. After dispersion, 75.65 g solution is obtained. After the graphene oxide solution is dispersed 1.235 g resorcinol, 1.791 g formaldehyde, and 5.95 g mg sodium carbonate are added. The resultant sol is then poured into a glass mold. The mold is sealed, and placed in an oven set to 85° C. for 72 hours. After 72 hours the gels are removed from the oven and transferred to a solvent exchange bath. The volume of the solvent exchange bath is approximately 5 times that of the gel, and is ACS reagent grade acetone. The acetone is replaced two times with clean acetone (once every 24 hours). The gel is then transferred to a pure tert-butanol bath for five days. The tert-butanol is refreshed every 24 hours. The pure tert-butanol baths are all carried out at 40° C.

The gel is degassed, frozen, and further cooled as described in Example 22.

After the wet gel is sufficiently frozen, it is removed from the vacuum bag and the mass of the gel and frozen solvent contained therein is measured. The gel is then transferred to a temperature-controlled drying chamber, a transparent chamber with a gas-tight door for loading and unloading material. The gel is placed in the drying chamber on a scaffold which thermally isolates it from the walls of the chamber and allows unimpeded gas flow on all sides of the gel. Gas is supplied at one end of the chamber and exhausted at the opposite end causing gas to constantly flow over and around the gel. Temperature of the inlet gas is measured inside the drying chamber by a thermocouple placed directly downstream from the inlet port.

The gas in this case is desiccated compressed air. Air is supplied by a compressor at 100 psi. Air is supplied by a compressor at 100 psi. The regulated gas flow rate was controlled using a needle valve and the resultant flow rate of 20 SCFH measured using a gas-flow rotameter. After passing through the rotameter the gas flows through a liquid-cooled finned heat exchanger. The heat exchanger is cooled using a recirculating chiller which pumps a cooled mixture of water and ethylene glycol, and was operated at a temperature and flow rate sufficient to maintain a drying chamber temperature of 0° C. as measured by the thermocouple at the inlet of the drying chamber. The effluent gas from the drying chamber (a mixture of nitrogen and tert-butanol) passes through a cold trap or desiccant chamber designed to capture tert-butanol vapor. The remaining nitrogen gas is then vented to the atmosphere through a standard air exhaust system.

Fans are used within the chamber to increase drying rate and ensure drying uniformity by preventing solvent vapor buildup near the gel. The fans operate at 1200 RPM, have capacity of 38.2 SCFM, and are positioned above and below the gel such that they force air to impinge on both sides of the gel.

Over the course of the drying process the gel is periodically removed from the drying chamber and its mass is measured before quickly returning it to the drying chamber (before remaining tert-butanol within the gel can begin to melt). The mass of the gel is thus tracked over time and when this mass ceases to change from one measurement to the next, the gel is considered to be completely dry.

After the dried aerogel is obtained, it is pyrolyzed under nitrogen at 1050° C. for 3 hours. The result is a graphene aerogel, which appears a black monolith. The material has a bulk density of 0.1 g/cc, modulus of 25 MPa, and specific surface area of 580 m$^2$/g.

Example 49. Drying of Carbon Nanotube Aerogel Via Atmospheric Sublimation of $CO_2$ A carbon nanotube aerogel is synthesized from multi-walled carbon nanotubes (MWCNTs). Pristine MWCNTs are combined with chloroform and poly(3-hexylthiophene)-b-poly(3-(trimethoxysilyl)-propyl methacrylate) (P3HT-b-PTMSPMA). The solution is sonicated for 13 minutes to create a dispersion of individual nanotubes. The ratio of MWCNTs to P3HT-b-PTMSPMA is 1 mg to $8.85 \times 10^{-5}$ mmol. Within minutes to hours the dispersion forms a gel. This gel is aged at room temperature for 12 hours. The gel is then solvent exchanged into methanol to replace the chloroform. After fully exchanged into methanol an aqueous ammonia solution is added to the methanol bath to cross-link the gel via hydrolysis and condensation of PTMSPMA. After 12 hours in the methanol-ammonia solution the gel is solvent exchanged into water. The volume of the water solvent exchange bath is approximately 5 times that of the gel. The water is replaced two times with clean water (once every 24 hours). The subsequent drying process is identical to that which was outlined in Example 1.

The resulting carbon nanotube aerogel is a black monolith with a bulk density of 0.004 g/cc, and can withstand a compressive stress of 16 kPa.

Example 50. Drying of Carbon Nanotube Aerogel Via Vacuum-Assisted Freeze Drying from Organic Solvent A carbon nanotube aerogel is synthesized from multi-walled carbon nanotubes (MWCNTs). Pristine MWCNTs are combined with chloroform and poly(3-hexylthiophene)-b-poly(3-(trimethoxysilyl)-propyl methacrylate) (P3HT-b-PTMSPMA). The solution is sonicated for 13 minutes to create a dispersion of individual nanotubes. The ratio of MWCNTs to P3HT-b-PTMSPMA is 1 mg to $8.85 \times 10^{-5}$ mmol. Within minutes to hours the dispersion forms a gel. This gel is aged at room temperature for 12 hours. The gel is then solvent exchanged into methanol to replace the chloroform. After fully exchanged into methanol an aqueous ammonia solution is added to the methanol bath to cross-link the gel via hydrolysis and condensation of PTMSPMA. After 12 hours in the methanol-ammonia solution the gel is solvent exchanged into water. The volume of the water solvent exchange bath is approximately 5 times that of the gel. The water is replaced two times with clean water (once every 24 hours). The gel is in then transferred to a pure tert-butanol bath for five days. The tert-butanol is refreshed every 24 hours. The pure tert-butanol baths are all carried out at 40° C.

After tert-butanol solvent exchange is complete the sample follows the same processing steps as Example 11 to obtain a dried aerogel.

The resulting carbon nanotube aerogel is a black monolith with a bulk density of 0.004 g/cc, and can withstand a compressive force stress of 16 kPa.

Example 51. Drying of Carbon Nanotube Aerogel Via Atmospheric Pressure Freeze Drying Using Nitrogen A carbon nanotube aerogel is synthesized from multi-walled carbon nanotubes (MWCNTs). Pristine MWCNTs are combined with chloroform and poly(3-hexylthiophene)-b-poly(3-(trimethoxysilyl)-propyl methacrylate) (P3HT-b-PTMSPMA). The solution is sonicated for 13 minutes to create a dispersion of individual nanotubes. The ratio of MWCNTs to P3HT-b-PTMSPMA is 1 mg to $8.85 \times 10^{-5}$ mmol. Within minutes to hours the dispersion forms a gel. This gel is aged at room temperature for 12 hours. The gel is then solvent exchanged into methanol to replace the chloroform. After fully exchanged into methanol an aqueous ammonia solution is added to the methanol bath to cross-link the gel via hydrolysis and condensation of PTMSPMA. After 12 hours in the methanol-ammonia solution the gel is solvent exchanged into water. The volume of the water solvent exchange bath is approximately 5 times that of the gel. The water is replaced two times with clean water (once every 24 hours). The gel is in then transferred to a pure tert-butanol bath for five days. The tert-butanol is refreshed every 24 hours. The pure tert-butanol baths are all carried out at 40° C.

After solvent exchange the gel is degassed, frozen, further cooled, and dried as described in Example 28.

The resulting carbon nanotube aerogel is a black monolith with a bulk density of 0.004 g/cc, and can withstand a compressive stress of 16 kPa.

Example 52. Drying of Carbon Nanotube Aerogel Via Atmospheric Pressure Freeze Drying Using Dry Air A carbon nanotube aerogel is synthesized from multi-walled carbon nanotubes (MWCNTs). Pristine MWCNTs are combined with chloroform and poly(3-hexylthiophene)-b-poly(3-(trimethoxysilyl)-propyl methacrylate) (P3HT-b-PTMSPMA). The solution is sonicated for 13 minutes to create a dispersion of individual nanotubes. The ratio of MWCNTs to P3HT-b-PTMSPMA is 1 mg to $8.85 \times 10^{-5}$ mmol. Within minutes to hours the dispersion forms a gel. This gel is aged at room temperature for 12 hours. The gel is then solvent exchanged into methanol to replace the chloroform. After fully exchanged into methanol an aqueous ammonia solution is added to the methanol bath to cross-link the gel via hydrolysis and condensation of PTMSPMA. After 12 hours in the methanol-ammonia solution the gel is solvent exchanged into water. The volume of the water solvent exchange bath is approximately 5 times that of the gel. The water is replaced two times with clean water (once every 24 hours). The gel is in then transferred to a pure tert-butanol bath for five days. The tert-butanol is refreshed every 24 hours. The pure tert-butanol baths are all carried out at 40° C.

After solvent exchange the gel is degassed, frozen, further cooled, and dried as described in Example 38.

The resulting carbon nanotube aerogel is a black monolith with a bulk density of 0.004 g/cc, and can withstand a compressive stress of 16 kPa.

Example 53. Drying of Cellulose Aerogel Via Atmospheric Sublimation of $CO_2$ A cellulose aerogel is synthesized from recycled cellulose fiber. An aqueous solution of 2 wt % cellulose, 1.9 wt % sodium hydroxide, 10 wt % urea is prepared by sonicating the mixture for 6 minutes. The mixture is then frozen by placing it in a refrigerator for 24 hours, during which time gelation occurs. After 24 hours the gel is removed from the refrigerator and allowed to thaw at room temperature. Once thawed the gel is placed in a bath of 99% ethanol to induce coagulation. The coagulated gel is solvent exchanged into DI water for three days. The volume of the water solvent exchange bath is approximately 5 times that of the gel. The water is replaced two times with clean water (once every 24 hours). The subsequent drying process is identical to that which was outlined in Example 1.

The resulting aerogel is a white monolith with a bulk density of 0.04 g/cc.

Example 54. Drying of Cellulose Aerogel Via Vacuum-Assisted Freeze Drying from Organic Solvent A cellulose aerogel is synthesized from recycled cellulose fiber. An aqueous solution of 2 wt % cellulose, 1.9 wt % sodium hydroxide, 10 wt % urea is prepared by sonicating the mixture for 6 minutes. The mixture is then frozen by placing it in a refrigerator for 24 hours, during which time gelation occurs. After 24 hours the gel is removed from the refrigerator and allowed to thaw at room temperature. Once thawed the gel is placed in a bath of 99% ethanol to induce coagulation. The coagulated gel is solvent exchanged into DI water for three days. The volume of the water solvent exchange bath is approximately 5 times that of the gel. The water is replaced two times with clean water (once every 24 hours). The gel is in then transferred to a pure tert-butanol bath for five days. The tert-butanol is refreshed every 24 hours. The pure tert-butanol baths are all carried out at 40° C.

After tert-butanol solvent exchange is complete the sample follows the same processing steps as Example 11 to obtain a dried aerogel. The resulting aerogel is a white monolith with a bulk density of 0.04 g/cc.

Example 55. Drying of Cellulose Aerogel Via Atmospheric Pressure Freeze Drying Using Nitrogen A cellulose aerogel is synthesized from recycled cellulose fiber. An aqueous solution of 2 wt % cellulose, 1.9 wt % sodium hydroxide, 10 wt % urea is prepared by sonicating the mixture for 6 minutes. The mixture is then frozen by placing it in a refrigerator for 24 hours, during which time gelation occurs. After 24 hours the gel is removed from the refrigerator and allowed to thaw at room temperature. Once thawed the gel is placed in a bath of 99% ethanol to induce coagulation. The coagulated gel is solvent exchanged into DI water for three days. The volume of the water solvent exchange bath is approximately 5 times that of the gel. The water is replaced two times with clean water (once every 24 hours). The gel is in then transferred to a pure tert-butanol bath for five days. The tert-butanol is refreshed every 24 hours. The pure tert-butanol baths are all carried out at 40° C.

After solvent exchange the gel is degassed, frozen, further cooled, and dried as described in Example 28. The resulting aerogel is a white monolith with a bulk density of 0.04 g/cc.

Example 56. Drying of Cellulose Aerogel Via Atmospheric Pressure Freeze Drying Using Dry Air A cellulose aerogel is synthesized from recycled cellulose fiber. An aqueous solution of 2 wt % cellulose, 1.9 wt % sodium hydroxide, 10 wt % urea is prepared by sonicating the mixture for 6 minutes. The mixture is then frozen by placing it in a refrigerator for 24 hours, during which time gelation occurs. After 24 hours the gel is removed from the refrigerator and allowed to thaw at room temperature. Once thawed the gel is placed in a bath of 99% ethanol to induce coagulation. The coagulated gel is solvent exchanged into DI water for three days. The volume of the water solvent exchange bath is approximately 5 times that of the gel. The water is replaced two times with clean water (once every 24 hours). The gel is in then transferred to a pure tert-butanol bath for five days. The tert-butanol is refreshed every 24 hours. The pure tert-butanol baths are all carried out at 40° C.

After solvent exchange the gel is degassed, frozen, further cooled, and dried as described in Example 38. The resulting aerogel is a white monolith with a bulk density of 0.04 g/cc.

Example 57. Synthesis of Polyamide Aerogel Via Atmospheric Sublimation of $CO_2$ A polyamide aerogel is synthesized by reaction of an isocyanate and a carboxylic acid. 41.9 g N,N'-dimethylformamide, 13.3 g Demodur RE (a solution of 3.67 g triisocyanatophenylmethane in ethyl acetate), and 2.1 g trimesic acid are combined in a beaker. The mixture is stirred continuously for one hour under a nitrogen atmosphere while being heated to 90° C. The resulting sol is poured into a polypropylene mold which is then sealed and, while still under nitrogen, heated at 90° C. for 24 hours, during which time gelation occurs. After 24 hours the gel is removed from its mold and transferred to a solvent exchange bath.

The volume of the solvent exchange bath is approximately 4 times that of the gel. The gel is first exchanged into N,N'-dimethylformamide four times, for 24 hours each time. The gel is then exchanged into acetone 4 times, for 24 hours each time.

The subsequent drying process is identical to that which was outlined in Example 1.

The resulting aerogel is a white monolith with a bulk density of 0.288 g/cc. The material has a compressive modulus of 33 MPa, and a thermal conductivity of 28 mW/m-K. It has a skeletal density of 1.27 g/cc, and specific surface area of 354 m$^2$/g.

Example 58. Synthesis of Polyamide Aerogel Via Vacuum-Assisted Freeze Drying from Organic Solvent A polyamide aerogel is synthesized by reaction of an isocyanate and a carboxylic acid. 41.9 g N,N'-dimethylformamide, 13.3 g Demodur RE (a solution of 3.67 g triisocyanatophenylmethane in ethyl acetate), and 2.1 g trimesic acid are combined in a beaker. The mixture is stirred continuously for one hour under a nitrogen atmosphere while being heated to 90° C. The resulting sol is poured into a polypropylene mold which is then sealed and, while still under nitrogen, heated at 90° C. for 24 hours, during which time gelation occurs. After 24 hours the gel is removed from its mold and transferred to a solvent exchange bath.

The volume of the solvent exchange bath is approximately 4 times that of the gel. The gel is first exchanged into N,N'-dimethylformamide four times, for 24 hours each time. The gel is then exchanged into acetone 4 times, for 24 hours each time. The gel is in then transferred to a pure tert-butanol bath for five days. The tert-butanol is refreshed every 24 hours. The pure tert-butanol baths are all carried out at 40° C.

After tert-butanol solvent exchange is complete the sample follows the same processing steps as Example 11 to obtain a dried aerogel.

The resulting aerogel is a white monolith with a bulk density of 0.288 g/cc. The material has a compressive modulus of 33 MPa, and a thermal conductivity of 28 mW/m-K. It has a skeletal density of 1.27 g/cc, and specific surface area of 354 m$^2$/g.

Example 59. Synthesis of Polyamide Aerogel Via Atmospheric Pressure Freeze Drying from Organic Solvent with Nitrogen A polyamide aerogel is synthesized by reaction of an isocyanate and a carboxylic acid. 41.9 g N,N'-dimethylformamide, 13.3 g Demodur RE (a solution of 3.67 g triisocyanatophenylmethane in ethyl acetate), and 2.1 g trimesic acid are combined in a beaker. The mixture is stirred continuously for one hour under a nitrogen atmosphere while being heated to 90° C. The resulting sol is poured into a polypropylene mold which is then sealed and, while still under nitrogen, heated at 90° C. for 24 hours, during which time gelation occurs. After 24 hours the gel is removed from its mold and transferred to a solvent exchange bath.

The volume of the solvent exchange bath is approximately 4 times that of the gel. The gel is first exchanged into N,N'-dimethylformamide four times, for 24 hours each time. The gel is then exchanged into acetone 4 times, for 24 hours each time. The gel is in then transferred to a pure tert-butanol bath for five days. The tert-butanol is refreshed every 24 hours. The pure tert-butanol baths are all carried out at 40° C.

After solvent exchange the gel is degassed, frozen, further cooled, and dried as described in Example 28.

The resulting aerogel is a white monolith with a bulk density of 0.288 g/cc. The material has a compressive modulus of 33 MPa, and a thermal conductivity of 28 mW/m-K. It has a skeletal density of 1.27 g/cc, and specific surface area of 354 m$^2$/g.

Example 60. Synthesis of Polyamide Aerogel Via Atmospheric Pressure Freeze Drying from Organic Solvent with Dry Air A polyamide aerogel is synthesized by reaction of an isocyanate and a carboxylic acid. 41.9 g N,N'-dimethylformamide, 13.3 g Demodur RE (a solution of 3.67 g triisocyanatophenylmethane in ethyl acetate), and 2.1 g trimesic acid are combined in a beaker. The mixture is stirred continuously for one hour under a nitrogen atmosphere while being heated to 90° C. The resulting sol is poured into a polypropylene mold which is then sealed and, while still under nitrogen, heated at 90° C. for 24 hours, during which time gelation occurs. After 24 hours the gel is removed from its mold and transferred to a solvent exchange bath.

The volume of the solvent exchange bath is approximately 4 times that of the gel. The gel is first exchanged into N,N'-dimethylformamide four times, for 24 hours each time. The gel is then exchanged into acetone 4 times, for 24 hours each time. The gel is in then transferred to a pure tert-butanol bath for five days. The tert-butanol is refreshed every 24 hours. The pure tert-butanol baths are all carried out at 40° C.

After solvent exchange the gel is degassed, frozen, further cooled, and dried as described in Example 38.

The resulting aerogel is a white monolith with a bulk density of 0.288 g/cc. The material has a compressive modulus of 33 MPa, and a thermal conductivity of 28 mW/m-K. It has a skeletal density of 1.27 g/cc, and specific surface area of 354 m$^2$/g.

Example 61. Synthesis of Polyimide Aerogel Prepared for Freeze Drying by Continuous Solvent Exchanged Via Atmospheric Pressure Freeze Drying from Organic Solvent with Nitrogen A polyimide gel is synthesized by reaction of amine and an anhydride. The synthesis takes place in an intern nitrogen atmosphere. 3.47 g p-phenylenediamine is dissolved in 90 mL N-methyl-2-pyrrolidone. The mixture is stirred until p-phenylenediamine is fully dissolved (no particulates visible). While continuously stirring 9.85 g of 3,3',4,4'-benzophenonetetracarboxylic dianhydride to this mixture. Immediately a mixture of 0.91 g Desmodur RE (triisocyanatophenylmethane, 27 wt % in ethyl acetate) in 30 mL N-methyl-2-pyrrolidone is added to the first mixture, and stirred for 10 minutes. After 10 minutes of stirring 23.06 g acetic anhydride and 33.97 g triethylamine are added in rapid succession. The resulting sol is stirred for 2-5 minutes until well mixed, then poured into molds. The molds are closed and placed in air-tight containers, and left for 24 hours at room temperature. After 24 hours the gels are removed from their molds and transferred to a solvent exchange tank. The volume of the solvent exchange bath is approximately five times that of the gels. The gels are solvent exchanged into N-methyl-2-pyrrolidone three times for 24 hours each. They are then transferred to a continuous solvent exchange system.

The continuous solvent exchange system consists of two tanks: a product tank, and a distillation tank. The product tank is heated above the melting temperature of tert-butanol, contains the wet gels, submerged in fresh tert-butanol. The tank is not completely full, but has sufficient tert-butanol in it to keep the materials submerged. The distillation tank is also partially filled with tert-butanol. Attached to the top of the distillation tank is a distillation column with a condenser attached to the top end of it. The distillation tank is heated, increasing the vapor pressure of tert-butanol above it. The temperature of the tank is controlled such that the condensate at from the distillation column and condenser is pure tert-butanol. The condensate drains into the sample tank, thus adding fresh tert-butanol to the tank. The sample tank is stirred continuously by impeller so the fluid within it is assumed to be well mixed. The sample tank is connected to the distillation tank by a hose which attaches to the side of the sample tank above the level needed to submerge the materials, and below the top of the tank, such that as more tert-butanol drains into it from the distillate condenser, the liquid level rises. Once the liquid level reaches the level of the hose, liquid begins to flow from the sample tank to the distillation tank. As the system is operated in this fashion, N-methyl-2-pyrrolidone begins to accumulate in the distillation tank as it comes over from the sample tank through the hose but, because it has a boiling point significantly above that of tert-butanol, does not return through distillation. Eventually, all of the N-methyl-2-pyrrolidone which was initially in the gels diffuses out of the gels, and by the mechanism described accumulates in the distillation tank. The system is run until the pore fluid within the gels is pure tert-butanol, about 24 hours.

After solvent exchange the gel is degassed, frozen, further cooled, and dried as described in Example 38.

The resulting aerogel is a yellow monolith with a bulk density of 0.125 g/cc. The material has compressive modulus of 10.5 MPa, compressive yield strength of 0.5 MPa, and thermal conductivity of 25 mW/m-K. It has a specific surface area of 600 m$^2$/g.

Having thus described several aspects of various embodiments of the present disclosure, it is to be appreciated various alterations, modifications, and improvements will readily occur to those skilled in the art. Such alterations, modification, and improvements are intended to be part of this disclosure, and are intended to be within the spirit and scope of the present disclosure. Accordingly, the foregoing description and drawings are by way of example only.

What is claimed is:

1. A method of manufacturing an aerogel, comprising:
  freezing a solvent within a precursor gel material comprising the solvent; and
  sublimating the solvent at about atmospheric pressure to produce the aerogel;
  wherein:
    the solvent comprises tert-butanol,
    the aerogel has at least one dimension greater than or equal to about 1 m,
    the aerogel exhibits a compressive modulus greater than or equal to about 100 kPa,
    the aerogel exhibits a compressive yield strength greater than or equal to about 20 kPa, and
    the aerogel has at least one dimension having a length that is within about 20% of the length of a corresponding dimension of the precursor gel material of the aerogel immediately prior to the sublimating.

2. The method of claim 1, wherein the aerogel comprises a polyimide, a polyurea, and/or a polymer-crosslinked oxide.

3. The method of claim 1, wherein the aerogel is reinforced with a fiber.

4. The method of claim 1, wherein the aerogel is reinforced with a fibrous batting.

5. The method of claim 1, wherein the aerogel comprises mesopores.

6. The method of claim 1, wherein at least about 50% of the solvent originally contained within the precursor gel material is recovered.

7. The method of claim 6, wherein the recovered solvent is used to prepare a second aerogel.

8. The method of claim 1, wherein the aerogel exhibits a compressive ultimate strength of greater than 1 MPa.

9. The method of claim 1, wherein the aerogel has a second dimension corresponding to a thickness of greater than 1 mm.

10. The method of claim 1, wherein the aerogel has a bulk density of between about 0.05 g/cc and about 0.3 g/cc.

11. The method of claim 1, wherein the aerogel has a compressive modulus of greater than about 1 MPa.

12. The method of claim 1, wherein the aerogel has a compressive modulus of greater than about 10 MPa.

13. The method of claim 1, wherein the aerogel has a compressive yield strength of greater than about 1 MPa.

14. The method of claim 1, wherein sublimating the solvent comprises providing a flow of gas.

15. The method of claim 14, wherein the temperature of the flowing gas is within about 50° C. of the melting temperature of the solvent.

16. The method of claim 1, wherein the aerogel is substantially crack-free.

17. The method of claim 1, wherein the aerogel is monolithic.

18. The method of claim 1, wherein the solvent has less than about 1.5 v/v % impurities.

19. The method of claim 1, wherein the aerogel has at least one dimension greater than or equal to about 5 m.

* * * * *

UNITED STATES PATENT AND TRADEMARK OFFICE
CERTIFICATE OF CORRECTION

PATENT NO. : 11,111,354 B2
APPLICATION NO. : 16/724811
DATED : September 7, 2021
INVENTOR(S) : Stephen A. Steiner, III et al.

Page 1 of 1

It is certified that error appears in the above-identified patent and that said Letters Patent is hereby corrected as shown below:

In the Specification

At Column 1, Line 9, the words "Application No. PCT/US2016/016,823" should read --Application No. PCT/US2016/016823--

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*